(12) United States Patent
Beck et al.

(10) Patent No.: US 10,096,043 B2
(45) Date of Patent: Oct. 9, 2018

(54) SYSTEMS AND METHODS TO FORMULATE OFFERS VIA MOBILE DEVICES AND TRANSACTION DATA

(71) Applicant: Visa International Service Association, San Francisco, CA (US)

(72) Inventors: Andrew Beck, San Francisco, CA (US); Sebastian Badea, Sunnyvale, CA (US); Vanita Pandey, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 675 days.

(21) Appl. No.: 13/747,770

(22) Filed: Jan. 23, 2013

(65) Prior Publication Data

US 2013/0191213 A1    Jul. 25, 2013

Related U.S. Application Data

(60) Provisional application No. 61/589,792, filed on Jan. 23, 2012, provisional application No. 61/706,882, filed on Sep. 28, 2012.

(51) Int. Cl.
*G06Q 30/02* (2012.01)
*G07F 19/00* (2006.01)
*G06Q 20/32* (2012.01)

(52) U.S. Cl.
CPC ..... *G06Q 30/0267* (2013.01); *G06Q 20/3224* (2013.01); *G07F 19/201* (2013.01)

(58) Field of Classification Search
CPC ................ G06Q 30/0207–30/0277
See application file for complete search history.

(56) References Cited

U.S. PATENT DOCUMENTS

| | | | |
|---|---|---|---|
| 6,018,723 A | 1/2000 | Siegel et al. | |
| 6,119,103 A | 9/2000 | Basch et al. | |
| 6,298,330 B1 | 10/2001 | Gardenswartz et al. | |
| 6,505,168 B1 | 1/2003 | Rothman et al. | |
| 6,598,030 B1 | 7/2003 | Siegel et al. | |
| 6,658,393 B1 | 12/2003 | Basch et al. | |
| 7,035,855 B1 | 4/2006 | Kilger et al. | |
| 7,227,950 B2 | 6/2007 | Faith et al. | |
| 7,444,658 B1 | 10/2008 | Matz et al. | |
| 8,061,602 B1 * | 11/2011 | Oakes, III | 235/383 |

(Continued)

FOREIGN PATENT DOCUMENTS

WO    2008067543 A2    6/2008

*Primary Examiner* — David J Stoltenberg
(74) *Attorney, Agent, or Firm* — The Webb Law Firm

(57) ABSTRACT

A computing apparatus is configured to formulate and adjust offers to users of mobile devices that are configured to capture identification information of products, such as UPC codes. The transaction data of the user, the activities of the user capturing the identification information of products, the location of the user, and the user's reactions to the offers are used to incrementally adjust the offers according to offer rules specified by the merchants. The mobile devices can be used to initiate a checkout process for purchasing items identified by the captured identification information of the products from the physical retail store at which the user is currently located, or via an online store associated with an offer presented via the mobile device.

10 Claims, 32 Drawing Sheets

Example: Shopping Proximity Revisals component when user refuses an offer

(56) References Cited

U.S. PATENT DOCUMENTS

| | | | |
|---|---|---|---|
| 8,577,734 B2* | 11/2013 | Treyz et al. | 705/26.1 |
| 8,590,786 B2* | 11/2013 | Schueller et al. | 235/383 |
| 2004/0054581 A1 | 3/2004 | Redford et al. | |
| 2005/0055275 A1 | 3/2005 | Newman et al. | |
| 2007/0055597 A1 | 3/2007 | Patel et al. | |
| 2007/0100691 A1 | 5/2007 | Patterson | |
| 2007/0136140 A1* | 6/2007 | Smith, Jr. | 705/26 |
| 2008/0059302 A1 | 3/2008 | Fordyce, III et al. | |
| 2008/0059303 A1 | 3/2008 | Fordyce | |
| 2008/0059306 A1 | 3/2008 | Fordyce et al. | |
| 2008/0059307 A1 | 3/2008 | Fordyce, III et al. | |
| 2008/0071587 A1 | 3/2008 | Granucci et al. | |
| 2008/0082418 A1 | 4/2008 | Fordyce et al. | |
| 2008/0195473 A1 | 8/2008 | Laramy et al. | |
| 2008/0201226 A1 | 8/2008 | Carlson et al. | |
| 2008/0217397 A1 | 9/2008 | Degliantoni et al. | |
| 2008/0275771 A1 | 11/2008 | Levine | |
| 2008/0300973 A1 | 12/2008 | DeWitt et al. | |
| 2008/0319843 A1 | 12/2008 | Moser et al. | |
| 2009/0030793 A1 | 1/2009 | Fordyce, III | |
| 2009/0048884 A1 | 2/2009 | Olives et al. | |
| 2009/0076896 A1 | 3/2009 | DeWitt et al. | |
| 2009/0076925 A1 | 3/2009 | DeWitt et al. | |
| 2009/0216579 A1 | 8/2009 | Zen et al. | |
| 2009/0222323 A1 | 9/2009 | Kelly et al. | |
| 2009/0271305 A1 | 10/2009 | Lal et al. | |
| 2009/0271327 A1 | 10/2009 | Lal et al. | |
| 2010/0030644 A1 | 2/2010 | Dhamodharan | |
| 2010/0049620 A1 | 2/2010 | Debow | |
| 2010/0063891 A1* | 3/2010 | Townsend et al. | 705/26 |
| 2010/0114677 A1 | 5/2010 | Carlson et al. | |
| 2010/0114686 A1 | 5/2010 | Carlson et al. | |
| 2010/0174596 A1* | 7/2010 | Gilman | G06Q 20/387 705/14.23 |
| 2010/0174623 A1 | 7/2010 | McPhie et al. | |
| 2010/0274625 A1 | 10/2010 | Carlson | |
| 2010/0274627 A1 | 10/2010 | Carlson | |
| 2010/0280882 A1 | 11/2010 | Faith et al. | |
| 2010/0306029 A1 | 12/2010 | Jolley | |
| 2010/0306032 A1 | 12/2010 | Jolley | |
| 2011/0022424 A1 | 1/2011 | VonDerheide | |
| 2011/0029362 A1* | 2/2011 | Roeding | G06Q 30/00 705/14.13 |
| 2011/0035278 A1 | 2/2011 | Fordyce, III et al. | |
| 2011/0035280 A1 | 2/2011 | Fordyce, III et al. | |
| 2011/0035288 A1 | 2/2011 | Clyne | |
| 2011/0047072 A1 | 2/2011 | Ciurea | |
| 2011/0054981 A1 | 3/2011 | Faith et al. | |
| 2011/0087530 A1 | 4/2011 | Fordyce, III et al. | |
| 2011/0093327 A1 | 4/2011 | Fordyce, III et al. | |
| 2011/0093335 A1 | 4/2011 | Fordyce, III et al. | |
| 2011/0106607 A1 | 5/2011 | Alfonso et al. | |
| 2011/0125565 A1 | 5/2011 | MacIlwaine et al. | |
| 2011/0145093 A1* | 6/2011 | Paradise et al. | 705/26.41 |
| 2011/0288918 A1 | 11/2011 | Cervenka et al. | |
| 2012/0158482 A1* | 6/2012 | Paradise | G06Q 30/0224 705/14.25 |
| 2012/0239483 A1* | 9/2012 | Yankovich | G06Q 30/0235 705/14.35 |
| 2013/0046632 A1* | 2/2013 | Grigg et al. | 705/14.58 |
| 2013/0054367 A1* | 2/2013 | Grigg | G06Q 30/0207 705/14.58 |
| 2013/0124283 A1* | 5/2013 | Kaulbach | 705/14.22 |
| 2013/0191216 A1* | 7/2013 | Predescu | G06Q 30/0241 705/14.58 |
| 2013/0191217 A1* | 7/2013 | Letca | G06Q 30/0241 705/14.58 |
| 2013/0191218 A1* | 7/2013 | Predescu | G06Q 30/0241 705/14.58 |
| 2013/0191225 A1* | 7/2013 | Predescu | G06Q 30/0241 705/14.67 |
| 2014/0006165 A1* | 1/2014 | Grigg et al. | 705/14.64 |

* cited by examiner

Example(s): Shopping Proximity Revisals

Example: Shopping Proximity Revisals after user accepts a Shopping Proximity Revisals offer Example: Shopping Proximity Revisals when user checks out products purchased with Shopping Proximity Revisals

SYSTEMS AND METHODS TO FORMULATE OFFERS VIA MOBILE DEVICES AND TRANSACTION DATA

RELATED APPLICATIONS

The present application claims priority to Prov. U.S. Pat. App. Ser. No. 61/589,792, filed Jan. 23, 2012 and entitled "Systems and Methods to Formulate Offers via Mobile Devices and Transaction Data", and priority to Prov. U.S. Pat. App. Ser. No. 61/706,882, filed Sep. 28, 2012 and entitled "Shopping Proximity Revisals Apparatuses, Methods and Systems", the entire disclosures of which applications are hereby incorporated herein by references.

FIELD OF THE TECHNOLOGY

At least some embodiments of the present disclosure relate to the processing of transactions, such as payments made via credit cards, debit cards, prepaid cards, etc., and/or providing information based on the processing of the transaction data.

BACKGROUND

Millions of transactions occur daily through the use of payment cards, such as credit cards, debit cards, prepaid cards, etc. Corresponding records of the transactions are recorded in databases for settlement and financial record keeping (e.g., to meet the requirements of government regulations). Such data can be mined and analyzed for trends, statistics, and other analyses. Sometimes such data are mined for specific advertising goals, such as to provide targeted offers to account holders, as described in PCT Pub. No. WO 2008/067543 A2, published on Jun. 5, 2008 and entitled "Techniques for Targeted Offers."

U.S. Pat. App. Pub. No. 2009/0216579, published on Aug. 27, 2009 and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," discloses a system in which a targeted advertisement is delivered to a computer in response to receiving an identifier, such as cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. App. Pub. No. 2005/0055275, published on Mar. 10, 2005 and entitled "System and Method for Analyzing Marketing Efforts," discloses a system that evaluates the cause and effect of advertising and marketing programs using card transaction data.

U.S. Pat. App. Pub. No. 2008/0217397, published on Sep. 11, 2008 and entitled "Real-Time Awards Determinations," discloses a system for facilitating transactions with real-time awards determinations for a cardholder, in which the award may be provided to the cardholder as a credit on the cardholder's statement.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIGS. 16a-16d show application user interface diagrams illustrating example features of a one-tap mobile application according to one embodiment.

FIG. 24 shows an example of a SHOPPING PROXIMITY REVISALS message to a user for selection of the merchants to check in with.

DETAILED DESCRIPTION

Introduction

Figure 1:
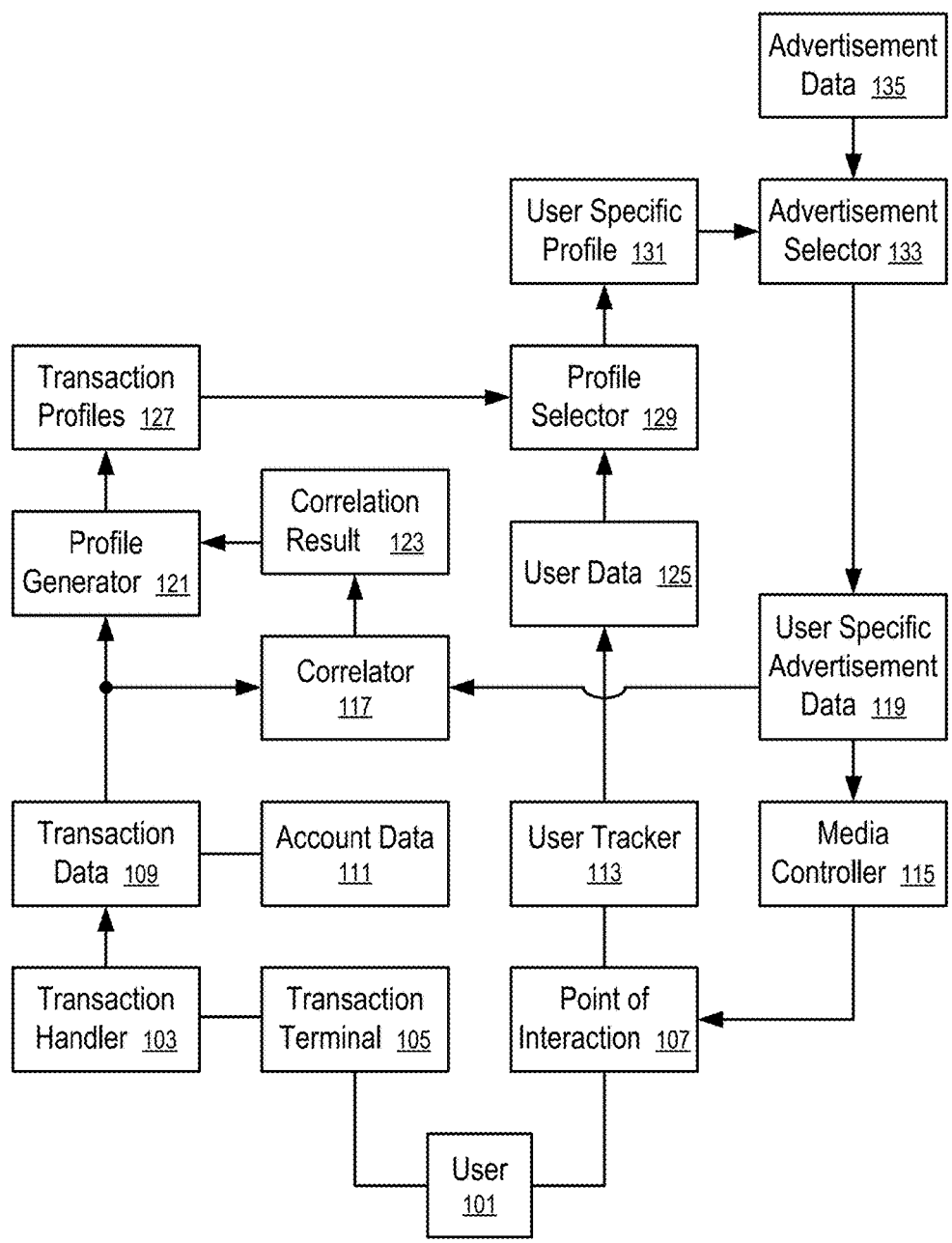
FIG. 1 illustrates a system to provide services based on transaction data according to one embodiment.

In one embodiment, transaction data, such as records of transactions made via credit accounts, debit accounts, prepaid accounts, bank accounts, stored value accounts and the like, is processed to provide information for various services, such as reporting, benchmarking, advertising, content or offer selection, customization, personalization, prioritization, etc. In one embodiment, users are required to enroll in a service program and provide consent to allow the system to use related transaction data and/or other data for the related services. The system is configured to provide the services while protecting the privacy of the users in accordance with the enrollment agreement and user consent.

In one embodiment, an advertising network is provided based on a transaction handler to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers.

In one embodiment, the computing apparatus is to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES."

In one embodiment, mobile applications are used to push offers to the users of consumer accounts, based on the location of the mobile devices (e.g., mobile phones, portable computers, tablet computers, personal digital assistants, portable media players, etc.). In one embodiment, an offer includes a merchant discount applied to a qualifying payment transaction made using the consumer account of a user and a separate loyalty reward applied to the consumer account based on the offer. For example, the loyalty reward may be provided via loyalty points or cash back credit to the user of the consumer account; and the merchant discount may be provided via chargeback, an instant discount, or statement credit. Details and examples of mobile offers in one embodiment are provided in the section entitled "MOBILE OFFER."

In one embodiment, an analytics platform is configured to use the transaction data and real-time shopping behavior to more efficiently target consumers, providing the consumers with more relevant offers, and providing merchants with incremental transactions. For example, information obtained via barcode scanning using a mobile payment device to check prices in a retail location can be combined with the transaction data to identify relevant offers; and the offers can be formulated and/or adjusted based on the real-time actions performed by the user of the mobile payment device. Details and examples of the formulation and/or adjustment of offers in one embodiment are provided in the section entitled "OFFER FORMATION."

In one embodiment, the computing apparatus correlates transactions with activities that occurred outside the context of the transaction, such as online advertisements presented to the customers that at least in part cause the offline transactions. The correlation data can be used to demonstrate the success of the advertisements, and/or to improve intelligence information about how individual customers and/or various types or groups of customers respond to the advertisements.

In one embodiment, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc.

In one embodiment, the correlation results are used in predictive models to predict transactions and/or spending patterns based on activities or events, to predict activities or events based on transactions or spending patterns, to provide alerts or reports, etc.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

System

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In one embodiment, the system further includes a correlator (117) to correlate user specific advertisement data (119) with transactions resulting from the user specific advertisement data (119). The correlation results (123) can be used by the profile generator (121) to improve the transaction profiles (127).

Figure 2:
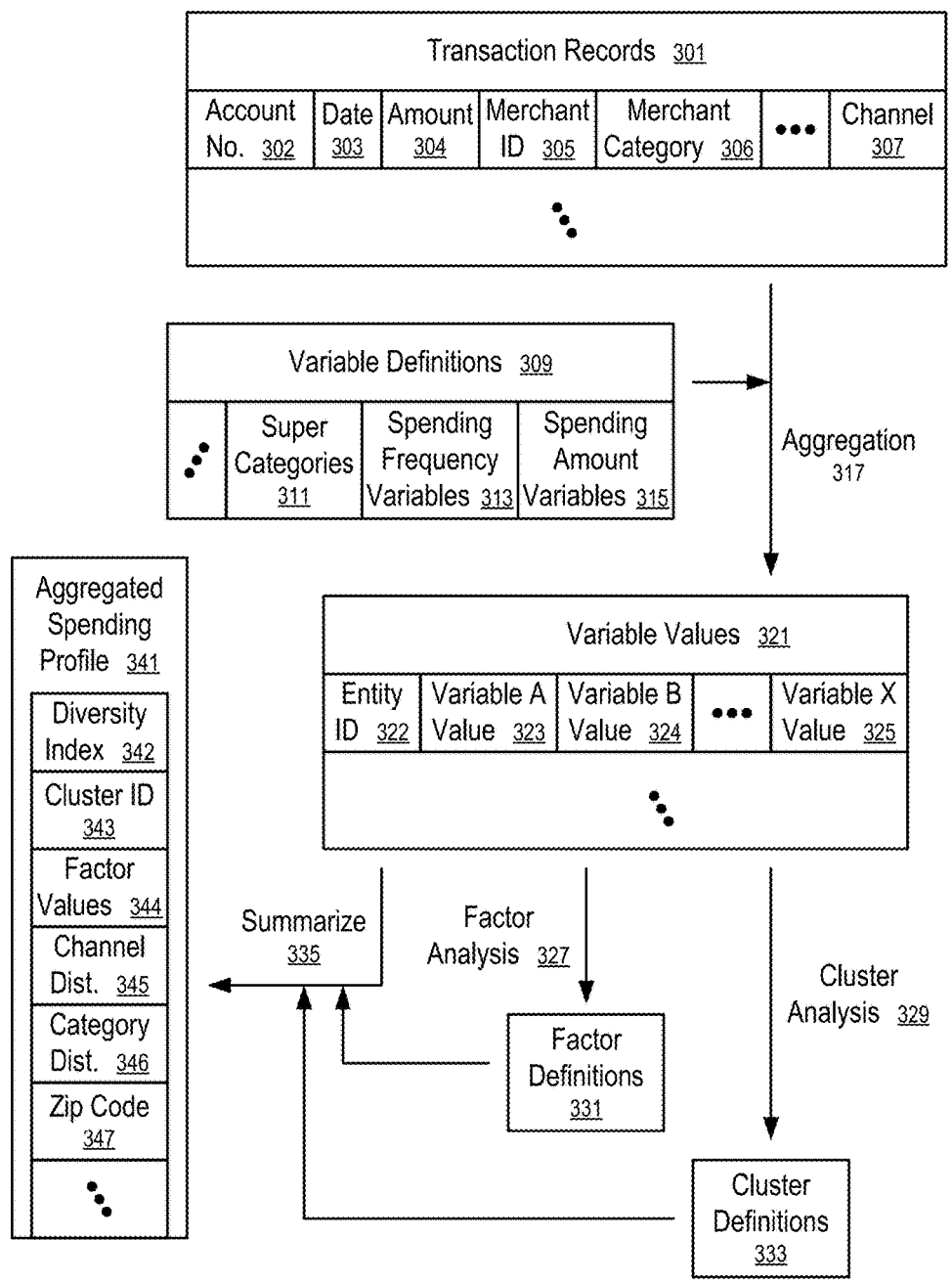
FIG. 2 illustrates the generation of an aggregated spending profile according to one embodiment.
Figure 3:
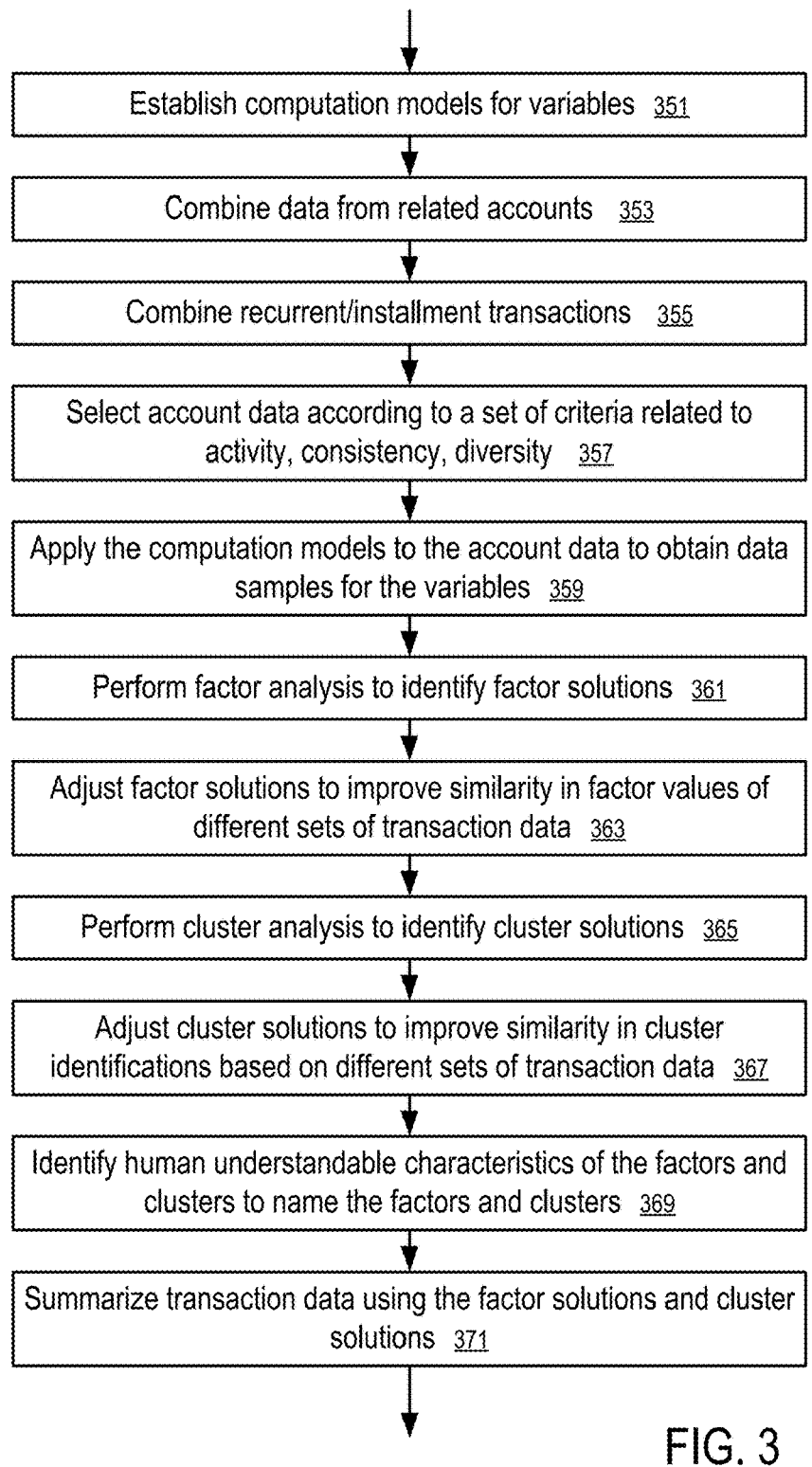
FIG. 3 shows a method to generate an aggregated spending profile according to one embodiment.

In one embodiment, the transaction profiles (127) are generated from the transaction data (109) in a way as illustrated in FIGS. 2 and 3. For example, in FIG. 3, an aggregated spending profile (341) is generated via the factor analysis (327) and cluster analysis (329) to summarize (335) the spending patterns/behaviors reflected in the transaction records (301).

Figure 4:
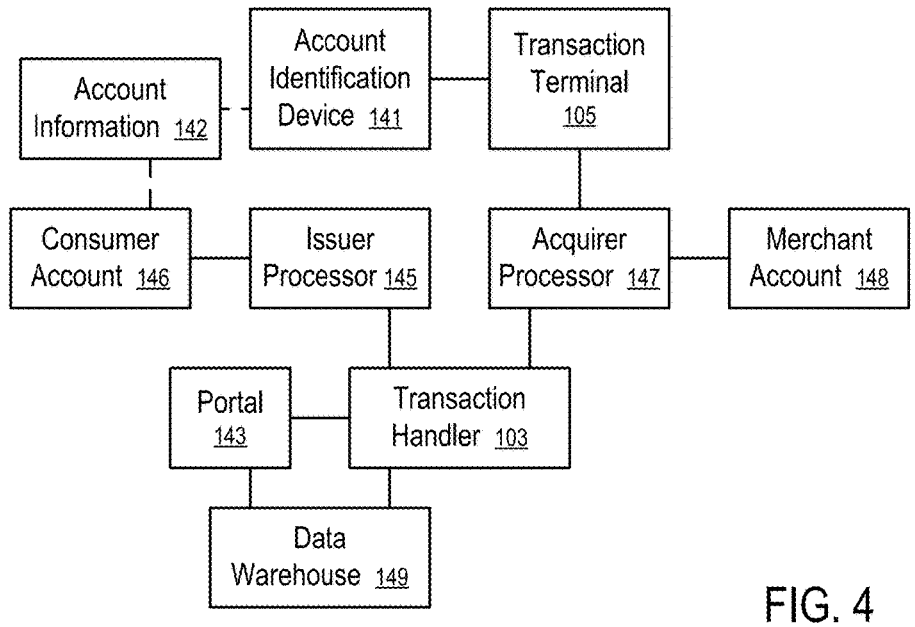
FIG. 4 shows a system to provide information based on transaction data according to one embodiment.

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
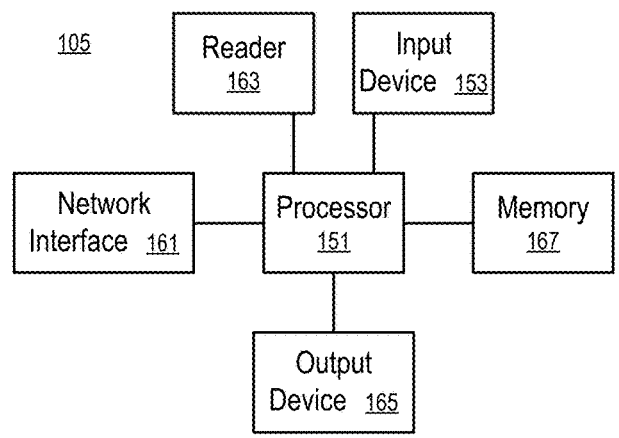
FIG. 5 illustrates a transaction terminal according to one embodiment.
Figure 6:
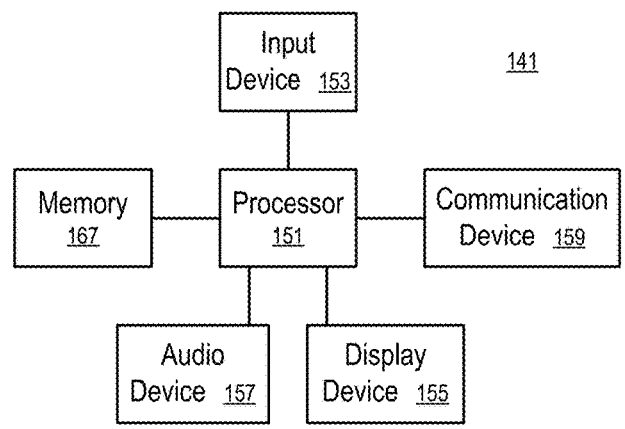
FIG. 6 illustrates an account identifying device according to one embodiment.
Figure 7:
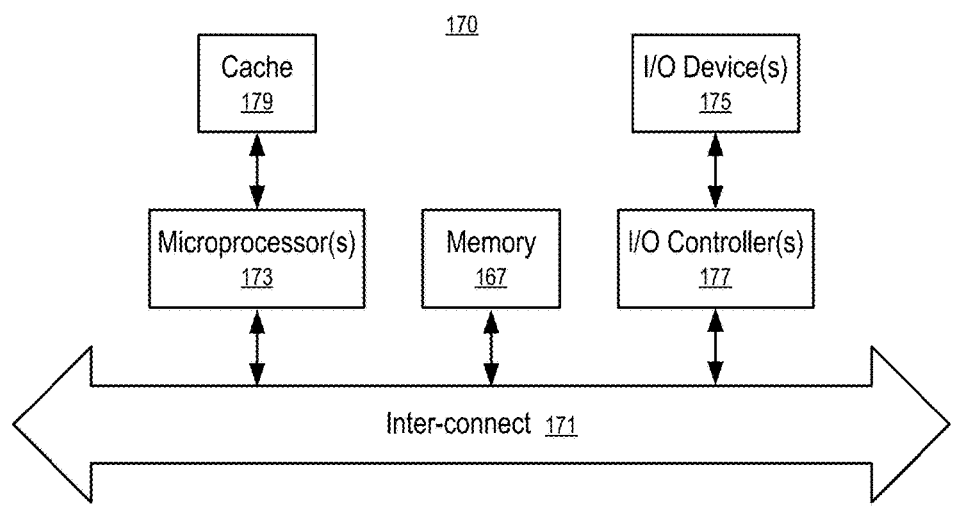
FIG. 7 illustrates a data processing system according to one embodiment.

FIGS. 5 and 6 illustrate examples of transaction terminals (105) and account identification devices (141). FIG. 7 illustrates the structure of a data processing system that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated in FIGS. 1 and 4-7, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) maintains a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) provides at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

In one embodiment, the profile generator (121) generates and updates the transaction profiles (127) in batch mode periodically. In other embodiments, the profile generator (121) generates the transaction profiles (127) in real-time, or just in time, in response to a request received in the portal (143) for such profiles.

In one embodiment, the transaction profiles (127) include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

In one embodiment, when the cause and effect relationships between the transactions and non-transactional events are known (e.g., based on prior research results, domain knowledge, expertise), the relationships can be used in predictive models to predict future transactions or spending patterns, based on events that occurred recently or are happening in real-time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction would occur. For example, the analysis of the transaction data (109) can be used to predict when a next transaction having the periodic feature would occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. patent application Ser. No. 12/773,770, filed May 4, 2010 and entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. patent application Ser. No. 11/767,218, filed Jun. 22, 2007, assigned Pub. No. 2008/0319843, and entitled "Supply of Requested Offer Based on Point-of Service to Offeree Distance," U.S. patent application Ser. No. 11/755,575, filed May 30, 2007, assigned Pub. No. 2008/0300973, and entitled "Supply of Requested Offer Based on Offeree Transaction History," U.S. patent application Ser. No. 11/855,042, filed Sep. 13, 2007, assigned Pub. No. 2009/0076896, and entitled "Merchant Supplied Offer to a Consumer within a Predetermined Distance," U.S. patent application Ser. No. 11/855,069, filed Sep. 13, 2007, assigned Pub. No. 2009/0076925, and entitled "Offeree Requested Offer Based on Point-of Service to Offeree Distance," and U.S. patent application Ser. No. 12/428,302, filed Apr. 22, 2009 and entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregate spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. patent application Ser. No. 11/960,162, filed Dec. 19, 2007, assigned Pub. No. 2008/0201226, and entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. patent application Ser. No. 11/862,487, filed Sep. 27, 2007 and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. patent application Ser. No. 12/185,332, filed Aug. 4, 2008, assigned Pub. No. 2010/0030644, and entitled "Targeted Advertising by Payment Processor History of Cashless Acquired Merchant Transaction on Issued Consumer Account," and in U.S. patent application Ser. No. 12/849,793, filed Aug. 3, 2010 and entitled "Systems and Methods for Targeted Advertisement Delivery," the disclosures of which are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real-time; and the profile selector (129) uses the user data (125) to query the profile generator (121) to generate the user specific profile (131) in real-time, or just in time. The profile generator (121) generates the user specific profile (131) that best matches the user data (125).

In one embodiment, the user tracker (113) identifies the user (101) based on the user activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341) to present effective, timely, and relevant marketing information to the user (101), via the preferred communication channel (e.g., mobile communications, web, mail, email, POS, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

For example, in one embodiment, a first user tracker (113) observes the card number of the user (101) at a particular IP address for a time period identified by a timestamp (e.g., via an online payment process); a second user tracker (113) observes the user (101) having a cookie ID at the same IP address for a time period near or overlapping with the time period observed by the first user tracker (113). Thus, the cookie ID as observed by the second user tracker (113) can be linked to the card number of the user (101) as observed by the first user tracker (113). The first user tracker (113) may be operated by the same entity operating the transaction handler (103) or by a different entity. Once the correlation between the cookie ID and the card number is established via a database or a look up table, the cookie ID can be subsequently used to identify the card number of the user (101) and the account data (111).

In one embodiment, the portal (143) is configured to observe a card number of a user (101) while the user (101) uses an IP address to make an online transaction. Thus, the portal (143) can identify a consumer account (146) based on correlating an IP address used to identify the user (101) and IP addresses recorded in association with the consumer account (146).

For example, in one embodiment, when the user (101) makes a payment online by submitting the account information (142) to the transaction terminal (105) (e.g., an online store), the transaction handler (103) obtains the IP address from the transaction terminal (105) via the acquirer processor (147). The transaction handler (103) stores data to indicate the use of the account information (142) at the IP address at the time of the transaction request. When an IP address in the query received in the portal (143) matches the IP address previously recorded by the transaction handler (103), the portal (143) determines that the user (101) identified by the IP address in the request is the same user (101) associated with the account of the transaction initiated at the IP address. In one embodiment, a match is found when the time of the query request is within a predetermined time period from the transaction request, such as a few minutes, one hour, a day, etc. In one embodiment, the query may also include a cookie ID representing the user (101). Thus, through matching the IP address, the cookie ID is associated with the account information (142) in a persistent way.

In one embodiment, the portal (143) obtains the IP address of the online transaction directly. For example, in one embodiment, a user (101) chooses to use a password in the account data (111) to protect the account information (142) for online transactions. When the account information (142) is entered into the transaction terminal (105) (e.g., an online store or an online shopping cart system), the user (101) is connected to the portal (143) for the verification of the password (e.g., via a pop up window, or via redirecting the web browser of the user (101)). The transaction handler (103) accepts the transaction request after the password is verified via the portal (143). Through this verification process, the portal (143) and/or the transaction handler (103) obtain the IP address of the user (101) at the time the account information (142) is used.

In one embodiment, the web browser of the user (101) communicates the user provided password to the portal (143) directly without going through the transaction terminal (105) (e.g., the server of the merchant). Alternatively, the transaction terminal (105) and/or the acquirer processor (147) may relay the password communication to the portal (143) or the transaction handler (103).

In one embodiment, the portal (143) is configured to identify the consumer account (146) based on the IP address identified in the user data (125) through mapping the IP address to a street address. For example, in one embodiment, the user data (125) includes an IP address to identify the user (101); and the portal (143) can use a service to map the IP address to a street address. For example, an Internet service provider knows the street address of the currently assigned IP address. Once the street address is identified, the portal (143) can use the account data (111) to identify the consumer account (146) that has a current address at the identified street address. Once the consumer account (146) is identified, the portal (143) can provide a transaction profile (131) specific to the consumer account (146) of the user (101).

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in U.S. patent application Ser. No. 12/849,798, filed Aug. 3, 2010 and entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

In one embodiment, the correlator (117) is to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a web site, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

Illustratively, a search engine entity may display a search page with particular advertisements for flat panel televisions produced by companies A, B, and C. The search engine entity may then compare the particular advertisements presented to a particular consumer with transaction data of that consumer and may determine that the consumer purchased a flat panel television produced by Company B. The search engine entity may then use this information and other information derived from the behavior of other consumers to determine the effectiveness of the advertisements provided by companies A, B, and C. The search engine entity can determine if the placement, the appearance, or other characteristic of the advertisement results in actual increased sales. Adjustments to advertisements (e.g., placement, appearance, etc.) may be made to facilitate maximum sales.

In one embodiment, the correlator (117) matches the online activities and the transactions based on matching the user data (125) provided by the user tracker (113) and the records of the transactions, such as transaction data (109) or transaction records (301). In another embodiment, the correlator (117) matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in U.S. patent application Ser. No. 12/849,789, filed Aug. 3, 2010 and entitled "Systems and Methods for Closing the Loop between Online Activities and Offline Purchases," U.S. patent application Ser. No. 12/851,138, filed Aug. 5, 2010 and entitled "Systems and Methods for Propensity Analysis and Validation," and U.S. patent application Ser. No. 12/854,022, filed Aug. 10, 2010 and entitled "System and Methods for Targeting Offers," the disclosures of which applications are incorporated herein by reference.

Matching Advertisement & Transaction

In one embodiment, the correlator (117) is configured to receive information about the user specific advertisement data (119), monitor the transaction data (109), identify transactions that can be considered results of the advertisement corresponding to the user specific advertisement data (119), and generate the correlation result (123), as illustrated in FIG. 1.

When the advertisement and the corresponding transaction both occur in an online checkout process, a website used for the online checkout process can be used to correlate the transaction and the advertisement. However, the advertisement and the transaction may occur in separate processes and/or under control of different entities (e.g., when the purchase is made offline at a retail store, while the advertisement is presented outside the retail store). In one embodiment, the correlator (117) uses a set of correlation criteria to identify the transactions that can be considered as the results of the advertisements.

In one embodiment, the correlator (117) identifies the transactions linked or correlated to the user specific advertisement data (119) based on various criteria. For example, the user specific advertisement data (119) may include a coupon offering a benefit contingent upon a purchase made according to the user specific advertisement data (119). The use of the coupon identifies the user specific advertisement data (119), and thus allows the correlator (117) to correlate the transaction with the user specific advertisement data (119).

In one embodiment, the user specific advertisement data (119) is associated with the identity or characteristics of the user (101), such as global unique identifier (GUID), personal account number (PAN), alias, IP address, name or user name, geographical location or neighborhood, household, user group, and/or user data (125). The correlator (117) can link or match the transactions with the advertisements based on the identity or characteristics of the user (101) associated with the user specific advertisement data (119). For example, the portal (143) may receive a query identifying the user data (125) that tracks the user (101) and/or characteristics of the user specific advertisement data (119); and the correlator (117) identifies one or more transactions matching the user data (125) and/or the characteristics of the user specific advertisement data (119) to generate the correlation result (123).

In one embodiment, the correlator (117) identifies the characteristics of the transactions and uses the characteristics to search for advertisements that match the transactions. Such characteristics may include GUID, PAN, IP address, card number, browser cookie information, coupon, alias, etc.

In FIG. 1, the profile generator (121) uses the correlation result (123) to enhance the transaction profiles (127) generated from the profile generator (121). The correlation result (123) provides details on the purchases and/or indicates the effectiveness of the user specific advertisement data (119).

In one embodiment, the correlation result (123) is used to demonstrate to the advertisers the effectiveness of the advertisements, to process incentive or rewards associated with the advertisements, to obtain at least a portion of advertisement revenue based on the effectiveness of the advertisements, to improve the selection of advertisements, etc.

Coupon Matching

In one embodiment, the correlator (117) identifies a transaction that is a result of an advertisement (e.g., 119) when an offer or benefit provided in the advertisement is redeemed via the transaction handler (103) in connection with a purchase identified in the advertisement.

For example, in one embodiment, when the offer is extended to the user (101), information about the offer can be stored in association with the account of the user (101) (e.g., as part of the account data (111)). The user (101) may visit the portal (143) of the transaction handler (103) to view the stored offer.

The offer stored in the account of the user (101) may be redeemed via the transaction handler (103) in various ways. For example, in one embodiment, the correlator (117) may download the offer to the transaction terminal (105) via the transaction handler (103) when the characteristics of the transaction at the transaction terminal (105) match the characteristics of the offer.

After the offer is downloaded to the transaction terminal (105), the transaction terminal (105) automatically applies the offer when the condition of the offer is satisfied in one embodiment. Alternatively, the transaction terminal (105) allows the user (101) to selectively apply the offers downloaded by the correlator (117) or the transaction handler (103). In one embodiment, the correlator (117) sends reminders to the user (101) at a separate point of interaction (107) (e.g., a mobile phone) to remind the user (101) to redeem the offer. In one embodiment, the transaction handler (103) applies the offer (e.g., via statement credit), without having to download the offer (e.g., coupon) to the transaction terminal (105). Examples and details of redeeming offers via statement credit are provided in U.S. patent application Ser. No. 12/566,350, filed Sep. 24, 2009 and entitled "Real-Time Statement Credits and Notifications," the disclosure of which is hereby incorporated herein by reference.

In one embodiment, the offer is captured as an image and stored in association with the account of the user (101). Alternatively, the offer is captured in a text format (e.g., a code and a set of criteria), without replicating the original image of the coupon.

In one embodiment, when the coupon is redeemed, the advertisement presenting the coupon is correlated with a transaction, and/or is determined to have resulted in a transaction. In one embodiment, the correlator (117) identifies advertisements that have resulted in purchases, without having to identify the specific transactions that correspond to the advertisements.

Details about offer redemption via the transaction handler (103) in one embodiment are provided in U.S. patent application Ser. No. 12/849,801, filed Aug. 3, 2010 and entitled "Systems and Methods for Multi-Channel Offer Redemption," the disclosure of which is hereby incorporated herein by reference.

On ATM & POS Terminal

In one example, the transaction terminal (105) is an automatic teller machine (ATM), which is also the point of interaction (107). When the user (101) approaches the ATM to make a transaction (e.g., to withdraw cash via a credit card or debit card), the ATM transmits account information (142) to the transaction handler (103). The account information (142) can also be considered as the user data (125) to select the user specific profile (131). The user specific profile (131) can be sent to an advertisement network to query for a targeted advertisement. After the advertisement network matches the user specific profile (131) with user specific advertisement data (119) (e.g., a targeted advertisement), the transaction handler (103) may send the advertisement to the ATM, together with the authorization for cash withdrawal.

In one embodiment, the advertisement shown on the ATM includes a coupon that offers a benefit that is contingent upon the user (101) making a purchase according to the advertisement. The user (101) may view the offer presented on a white space on the ATM screen and select to load or store the coupon in a storage device of the transaction handler (103) under the account of the user (101). The transaction handler (103) communicates with the bank to process the cash withdrawal. After the cash withdrawal, the ATM prints the receipt which includes a confirmation of the coupon, or a copy of the coupon. The user (101) may then use the coupon printed on the receipt. Alternatively, when the user (101) uses the same account to make a relevant purchase, the transaction handler (103) may automatically apply the coupon stored under the account of the user (101), or automatically download the coupon to the relevant transaction terminal (105), or transmit the coupon to the mobile phone of the user (101) to allow the user (101) to use the coupon via a display of the coupon on the mobile phone. The user (101) may visit a web portal (143) of the transaction handler (103) to view the status of the coupons collected in the account of the user (101).

In one embodiment, the advertisement is forwarded to the ATM via the data stream for authorization. In another embodiment, the ATM makes a separate request to a server of the transaction handler (103) (e.g., a web portal) to obtain the advertisement. Alternatively, or in combination, the advertisement (including the coupon) is provided to the user (101) at separate, different points of interactions, such as via a text message to a mobile phone of the user (101), via an email, via a bank statement, etc.

Details of presenting targeted advertisements on ATMs based on purchasing preferences and location data in one embodiment are provided in U.S. patent application Ser. No. 12/266,352, filed Nov. 6, 2008 and entitled "System Including Automated Teller Machine with Data Bearing Medium," the disclosure of which is hereby incorporated herein by reference.

In another example, the transaction terminal (105) is a POS terminal at the checkout station in a retail store (e.g., a self-service checkout register). When the user (101) pays for a purchase via a payment card (e.g., a credit card or a debit card), the transaction handler (103) provides a targeted advertisement having a coupon obtained from an advertisement network. The user (101) may load the coupon into the account of the payment card and/or obtain a hardcopy of the coupon from the receipt. When the coupon is used in a transaction, the advertisement is linked to the transaction.

Details of presenting targeted advertisements during the process of authorizing a financial payment card transaction in one embodiment are provided in U.S. patent application Ser. No. 11/799,549, filed May 1, 2007, assigned Pub. No. 2008/0275771, and entitled "Merchant Transaction Based Advertising," the disclosure of which is hereby incorporated herein by reference.

In one embodiment, the user specific advertisement data (119), such as offers or coupons, is provided to the user (101) via the transaction terminal (105) in connection with an authorization message during the authorization of a transaction processed by the transaction handler (103). The authorization message can be used to communicate the rewards qualified for by the user (101) in response to the current transaction, the status and/or balance of rewards in a loyalty program, etc. Examples and details related to the authorization process in one embodiment are provided in U.S. patent application Ser. No. 11/266,766, filed Nov. 2, 2005, assigned Pub. No. 2007/0100691, and entitled "Method and System for Conducting Promotional Programs," the disclosure of which is hereby incorporated herein by reference.

In one embodiment, when the user (101) is conducting a transaction with a first merchant via the transaction handler (103), the transaction handler (103) may determine whether the characteristics of the transaction satisfy the conditions specified for an announcement, such as an advertisement, offer or coupon, from a second merchant. If the conditions are satisfied, the transaction handler (103) provides the announcement to the user (101). In one embodiment, the transaction handler (103) may auction the opportunity to provide the announcements to a set of merchants. Examples and details related to the delivery of such announcements in one embodiment are provided in U.S. patent application Ser. No. 12/428,241, filed Apr. 22, 2009 and entitled "Targeting Merchant Announcements Triggered by Consumer Activity Relative to a Surrogate Merchant," the disclosure of which is hereby incorporated herein by reference.

On Third Party Site

In a further example, the user (101) may visit a third party website, which is the point of interaction (107) in FIG. 1. The third party website may be a web search engine, a news website, a blog, a social network site, etc. The behavior of the user (101) at the third party website may be tracked via a browser cookie, which uses a storage space of the browser to store information about the user (101) at the third party website. Alternatively, or in combination, the third party website uses the server logs to track the activities of the user (101). In one embodiment, the third party website may allow an advertisement network to present advertisements on portions of the web pages. The advertisement network tracks the user behavior using its server logs and/or browser cookies. For example, the advertisement network may use a browser cookie to identify a particular user across multiple websites. Based on the referral uniform resource locators (URL) that cause the advertisement network to load advertisements in various web pages, the advertisement network can determine the online behavior of the user (101) via analyzing the web pages that the user (101) has visited. Based on the tracked online activities of the user (101), the user data (125) that characterizes the user (101) can be formed to query the profiler selector (129) for a user specific profile (131).

In one embodiment, the cookie identity of the user (101) as tracked using the cookie can be correlated to an account of the user (101), the family of the user (101), the company of the user (101), or other groups that include the user (101) as a member. Thus, the cookie identity can be used as the user data (125) to obtain the user specific profile (131). For example, when the user (101) makes an online purchase from a web page that contains an advertisement that is tracked with the cookie identity, the cookie identity can be correlated to the online transaction and thus to the account of the user (101). For example, when the user (101) visits a web page after authentication of the user (101), and the web page includes an advertisement from the advertisement network, the cookie identity can be correlated to the authenticated identity of the user (101). For example, when the user (101) signs in to a web portal of the transaction handler (103) to access the account of the user (101), the cookie identity used by the advertisement network on the web portal can be correlated to the account of the user (101).

Other online tracking techniques can also be used to correlate the cookie identity of the user (101) with an identifier of the user (101) known by the profile selector (129), such as a GUID, PAN, account number, customer number, social security number, etc. Subsequently, the cookie identity can be used to select the user specific profile (131).

Multiple Communications

In one embodiment, the entity operating the transaction handler (103) may provide intelligence for providing multiple communications regarding an advertisement. The multiple communications may be directed to two or more points of interaction with the user (101).

For example, after the user (101) is provided with an advertisement via the transaction terminal (105), reminders or revisions to the advertisements can be sent to the user (101) via a separate point of interaction (107), such as a mobile phone, email, text message, etc. For example, the advertisement may include a coupon to offer the user (101) a benefit contingent upon a purchase. If the correlator (117) determines that the coupon has not been redeemed, the correlator (117) may send a message to the mobile phone of the user (101) to remind the user (101) about the offer, and/or revise the offer.

Examples of multiple communications related to an offer in one embodiment are provided in U.S. patent application Ser. No. 12/510,167, filed Jul. 27, 2009 and entitled "Successive Offer Communications with an Offer Recipient," the disclosure of which is hereby incorporated herein by reference.

Auction Engine

In one embodiment, the transaction handler (103) provides a portal to allow various clients to place bids according to clusters (e.g., to target entities in the clusters for marketing, monitoring, researching, etc.)

For example, the cardholders may register in a program to receive offers, such as promotions, discounts, sweepstakes, reward points, direct mail coupons, email coupons, etc. The cardholders may register with issuers, or with the portal (143) of the transaction handler (103). Based on the transaction data (109) or transaction records (301) and/or the registration data, the profile generator (121) is to identify the clusters of cardholders and the values representing the affinity of the cardholders to the clusters. Various entities may place bids according to the clusters and/or the values to gain access to the cardholders, such as the user (101). For example, an issuer may bid on access to offers; an acquirer and/or a merchant may bid on customer segments. An auction engine receives the bids and awards segments and offers based on the received bids. Thus, the customers can get great deals; and merchants can get customer traffic and thus sales.

Some techniques to identify a segment of users (101) for marketing are provided in U.S. patent application Ser. No. 12/288,490, filed Oct. 20, 2008, assigned Pub. No. 2009/0222323, and entitled "Opportunity Segmentation," U.S. patent application Ser. No. 12/108,342, filed Apr. 23, 2008, assigned Pub. No. 2009/0271305, and entitled "Payment Portfolio Optimization," and U.S. patent application Ser. No. 12/108,354, filed Apr. 23, 2008, assigned Pub. No. 2009/0271327, and entitled "Payment Portfolio Optimization," the disclosures of which applications are hereby incorporated herein by reference.

Social Network Validation

In one embodiment, the transaction data (109) is combined with social network data and/or search engine data to provide benefits (e.g., coupons) to a consumer. For example, a data exchange apparatus may identify cluster data based upon consumer search engine data, social network data, and payment transaction data to identify like groups of individuals who would respond favorably to particular types of benefits such as coupons and statement credits. Advertisement campaigns may be formulated to target the cluster of cardholders.

In one embodiment, search engine data is combined with social network data and/or the transaction data (109) to evaluate the effectiveness of the advertisements and/or conversion pattern of the advertisements. For example, after a search engine displays advertisements about flat panel televisions to a consumer, a social network that is used by a consumer may provide information about a related purchase made by the consumer. For example, the blog of the consumer, and/or the transaction data (109), may indicate that the flat panel television purchased by the consumer is from company B. Thus, the search engine data and the social network data and/or the transaction data (109) can be combined to correlate advertisements to purchases resulting from the advertisements and to determine the conversion pattern of the advertisement to the consumer. Adjustments to advertisements (e.g., placement, appearance, etc.) can be made to improve the effectiveness of the advertisements and thus increase sales.

Loyalty Program

In one embodiment, the transaction handler (103) uses the account data (111) to store information for third party loyalty programs. The transaction handler (103) processes payment transactions made via financial transaction cards, such as credit cards, debit cards, banking cards, etc.; and the financial transaction cards can be used as loyalty cards for the respective third party loyalty programs. Since the third party loyalty programs are hosted on the transaction handler (103), the consumers do not have to carry multiple, separate loyalty cards (e.g., one for each merchant that offers a loyalty program); and the merchants do not have to spend a large setup and investment fee to establish the loyalty program. The loyalty programs hosted on the transaction handler (103) can provide flexible awards for consumers, retailers, manufacturers, issuers, and other types of business entities involved in the loyalty programs. The integration of the loyalty programs into the accounts of the customers on the transaction handler (103) allows new offerings, such as merchant cross-offerings or bundling of loyalty offerings.

In one embodiment, an entity operating the transaction handler (103) hosts loyalty programs for third parties using the account data (111) of the users (e.g., 101). A third party, such as a merchant, a retailer, a manufacturer, an issuer or other entity that is interested in promoting certain activities and/or behaviors, may offer loyalty rewards on existing accounts of consumers. The incentives delivered by the loyalty programs can drive behavior changes without the hassle of loyalty card creation. In one embodiment, the loyalty programs hosted via the accounts of the users (e.g., 101) of the transaction handler (103) allow the consumers to carry fewer cards and may provide more data to the merchants than traditional loyalty programs.

The loyalty programs integrated with the accounts of the users (e.g., 101) of the transaction handler (103) can provide tools to enable nimble programs that are better aligned for driving changes in consumer behaviors across transaction channels (e.g., online, offline, via mobile devices). The loyalty programs can be ongoing programs that accumulate benefits for the customers (e.g., points, miles, cash back), and/or programs that provide one time benefits or limited time benefits (e.g., rewards, discounts, incentives).

Figure 8:
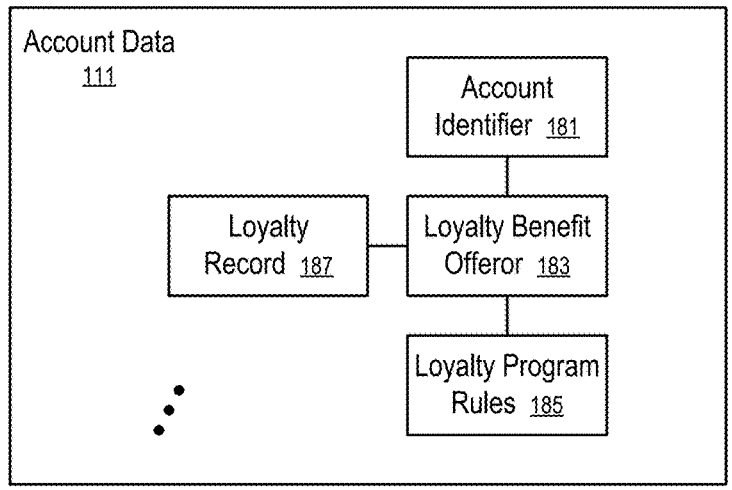
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeror (183). In one embodiment, the account identifier (181) may be linked to multiple loyalty benefit offerors (e.g., 183), corresponding to different third party loyalty programs.

In one embodiment, a third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty programs, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user (101) may enjoy the privileges based on the status of being a member of the loyalty program. The user (101) may use the account identifier (181) to show the status of being a member of the loyalty program.

For example, the user (101) may provide the account identifier (181) (e.g., the account number of a credit card) to the transaction terminal (105) to initiate an authorization process for a special transaction which is designed to check the member status of the user (101), as if the account identifier (181) were used to initiate an authorization process for a payment transaction. The special transaction is designed to verify the member status of the user (101) via checking whether the account data (111) is associated with the loyalty benefit offeror (183). If the account identifier (181) is associated with the corresponding loyalty benefit offeror (183), the transaction handler (103) provides an approval indication in the authorization process to indicate that the user (101) is a member of the loyalty program. The approval indication can be used as a form of identification to allow the user (101) to access member privileges, such as access to services, products, opportunities, facilities, discounts, permissions, which are reserved for members.

In one embodiment, when the account identifier (181) is used to identify the user (101) as a member to access member privileges, the transaction handler (103) stores information about the access of the corresponding member privilege in loyalty record (187). The profile generator (121) may use the information accumulated in the loyalty record (187) to enhance transaction profiles (127) and provide the user (101) with personalized/targeted advertisements, with or without further offers of benefit (e.g., discounts, incentives, rebates, cash back, rewards, etc.).

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may use the reward points to redeem cash, gift, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules occur.

In one embodiment, the accumulated benefits as indicated in the loyalty record (187) can be redeemed when the account identifier (181) is used to perform a payment transaction, when the payment transaction satisfies the loyalty program rules. For example, the user (101) may redeem a number of points to offset or reduce an amount of the purchase price.

In one embodiment, when the user (101) uses the account identifier (181) to make purchases as a member, the merchant may further provide information about the purchases; and the transaction handler (103) can store the information about the purchases as part of the loyalty record (187). The information about the purchases may identify specific items or services purchased by the member. For example, the merchant may provide the transaction handler (103) with purchase details at stock-keeping unit (SKU) level, which are then stored as part of the loyalty record (187). The loyalty benefit offeror (183) may use the purchase details to study the purchase behavior of the user (101); and the profile generator (121) may use the SKU level purchase details to enhance the transaction profiles (127).

In one embodiment, the SKU level purchase details are requested from the merchants or retailers via authorization responses, when the account (146) of the user (101) is enrolled in a loyalty program that allows the transaction handler (103) (and/or the issuer processor (145)) to collect the purchase details.

In one embodiment, the profile generator (121) may generate transaction profiles (127) based on the loyalty record (187) and provide the transaction profiles (127) to the loyalty benefit offeror (183) (or other entities when permitted).

In one embodiment, the loyalty benefit offeror (183) may use the transaction profiles (e.g., 127 or 131) to select candidates for membership offering. For example, the loyalty program rules (185) may include one or more criteria that can be used to identify which customers are eligible for the loyalty program. The transaction handler (103) may be configured to automatically provide the qualified customers with the offer of membership in the loyalty program when the corresponding customers are performing transactions via the transaction handler (103) and/or via points of interaction (107) accessible to the entity operating the transaction handler (103), such as ATMs, mobile phones, receipts, statements, websites, etc. The user (101) may accept the membership offer via responding to the advertisement. For example, the user (101) may load the membership into the account in the same way as loading a coupon into the account of the user (101).

In one embodiment, the membership offer is provided as a coupon or is associated with another offer of benefits, such as a discount, reward, etc. When the coupon or benefit is redeemed via the transaction handler (103), the account data (111) is updated to enroll the user (101) into the corresponding loyalty program.

In one embodiment, a merchant may enroll a user (101) into a loyalty program when the user (101) is making a purchase at the transaction terminal (105) of the merchant.

For example, when the user (101) is making a transaction at an ATM, performing a self-assisted check out on a POS terminal, or making a purchase transaction on a mobile phone or a computer, the user (101) may be prompted to join a loyalty program, while the transaction is being authorized by the transaction handler (103). If the user (101) accepts the membership offer, the account data (111) is updated to have the account identifier (181) associated with the loyalty benefit offeror (183).

In one embodiment, the user (101) may be automatically enrolled in the loyalty program, when the profile of the user (101) satisfies a set of conditions specified in the loyalty program rules (185). The user (101) may opt out of the loyalty program.

In one embodiment, the loyalty benefit offeror (183) may personalize and/or target loyalty benefits based on the transaction profile (131) specific to or linked to the user (101). For example, the loyalty program rules (185) may use the user specific profile (131) to select gifts, rewards, or incentives for the user (101) (e.g., to redeem benefits, such as reward points, accumulated in the loyalty record (187)). The user specific profile (131) may be enhanced using the loyalty record (187), or generated based on the loyalty record (187). For example, the profile generator (121) may use a subset of transaction data (109) associated with the loyalty record (187) to generate the user specific profile (131), or provide more weight to the subset of the transaction data (109) associated with the loyalty record (187) while also using other portions of the transaction data (109) in deriving the user specific profile (131).

In one embodiment, the loyalty program may involve different entities. For example, a first merchant may offer rewards as discounts, or gifts from a second merchant that has a business relationship with the first merchant. For example, an entity may allow a user (101) to accumulate loyalty benefits (e.g., reward points) via purchase transactions at a group of different merchants. For example, a group of merchants may jointly offer a loyalty program, in which loyalty benefits (e.g., reward points) can be accumulated from purchases at any of the merchants in the group and redeemable in purchases at any of the merchants.

In one embodiment, the information identifying the user (101) as a member of a loyalty program is stored on a server connected to the transaction handler (103). Alternatively or in combination, the information identifying the user (101) as a member of a loyalty program can also be stored in the financial transaction card (e.g., in the chip, or in the magnetic strip).

In one embodiment, loyalty program offerors (e.g., merchants, manufactures, issuers, retailers, clubs, organizations, etc.) can compete with each other in making loyalty program related offers. For example, loyalty program offerors may place bids on loyalty program related offers; and the advertisement selector (133) (e.g., under the control of the entity operating the transaction handler (103), or a different entity) may prioritize the offers based on the bids. When the offers are accepted or redeemed by the user (101), the loyalty program offerors pay fees according to the corresponding bids. In one embodiment, the loyalty program offerors may place an auto bid or maximum bid, which specifies the upper limit of a bid; and the actual bid is determined to be the lowest possible bid that is larger than the bids of the competitors, without exceeding the upper limit.

In one embodiment, the offers are provided to the user (101) in response to the user (101) being identified by the user data (125). If the user specific profile (131) satisfies the conditions specified in the loyalty program rules (185), the offer from the loyalty benefit offeror (183) can be presented to the user (101). When there are multiple offers from different offerors, the offers can be prioritized according to the bids.

In one embodiment, the offerors can place bids based on the characteristics that can be used as the user data (125) to select the user specific profile (131). In another embodiment, the bids can be placed on a set of transaction profiles (127).

In one embodiment, the loyalty program based offers are provided to the user (101) just in time when the user (101) can accept and redeem the offers. For example, when the user (101) is making a payment for a purchase from a merchant, an offer to enroll in a loyalty program offered by the merchant or related offerors can be presented to the user (101). If the user (101) accepts the offer, the user (101) is entitled to receive member discounts for the purchase.

For example, when the user (101) is making a payment for a purchase from a merchant, a reward offer can be provided to the user (101) based on loyalty program rules (185) and the loyalty record (187) associated with the account identifier (181) of the user (101) (e.g., the reward points accumulated in a loyalty program). Thus, the user effort for redeeming the reward points can be reduced; and the user experience can be improved.

In one embodiment, a method to provide loyalty programs includes the use of a computing apparatus of a transaction handler (103). The computing apparatus processes (301) a plurality of payment card transactions. After the computing apparatus receives (303) a request to track transactions for a loyalty program, such as the loyalty program rules (185), the computing apparatus stores and updates (305) loyalty program information in response to transactions occurring in the loyalty program. The computing apparatus provides (307) to a customer (e.g., 101) an offer of a benefit when the customer satisfies a condition defined in the loyalty program, such as the loyalty program rules (185).

Examples of loyalty programs through collaboration between collaborative constituents in a payment processing system, including the transaction handler (103) in one embodiment are provided in U.S. patent application Ser. No. 11/767,202, filed Jun. 22, 2007, assigned Pub. No. 2008/0059302, and entitled "Loyalty Program Service," U.S. patent application Ser. No. 11/848,112, filed Aug. 30, 2007, assigned Pub. No. 2008/0059306, and entitled "Loyalty Program Incentive Determination," and U.S. patent application Ser. No. 11/848,179, filed Aug. 30, 2007, assigned Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. patent application Ser. No. 11/835,100, filed Aug. 7, 2007, assigned Pub. No. 2008/0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. patent application Ser. No. 10/401,504, filed Mar. 27, 2003, assigned Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. patent application Ser. No. 11/688,423, filed Mar. 20, 2007, assigned Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal (143) and/or the transaction handler (103) stores the loyalty currency in the data warehouse (149). Further details and examples of one embodiment are provided in U.S. patent application Ser. No. 12/177,530, filed Jul. 22, 2008, assigned Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (105) to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned Pub. No. 2010-0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. patent application Ser. No. 12/566,350, filed Sep. 24, 2009 and entitled "Real-Time Statement Credits and Notifications," the disclosure of which is hereby incorporated herein by reference.

Details on loyalty programs in one embodiment are provided in U.S. patent application Ser. No. 12/896,632, filed Oct. 1, 2010 and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

In one embodiment, the user specific profile (131) is an aggregated spending profile (341) that is generated using the SKU-level information. For example, in one embodiment, the factor values (344) correspond to factor definitions (331) that are generated based on aggregating spending in different categories of products and/or services. A typical merchant offers products and/or services in many different categories.

In one embodiment, the user (101) may enter into transactions with various online and "brick and mortar" merchants. The transactions may involve the purchase of various items of goods and services. The goods and services may be identified by SKU numbers or other information that specifically identifies the goods and services purchased by the user (101).

In one embodiment, the merchant may provide the SKU information regarding the goods and services purchased by the user (101) (e.g., purchase details at SKU level) to the operator of the transaction handler (103). In one embodiment, the SKU information may be provided to the operator of the transaction handler (103) in connection with a loyalty program, as described in more detail below. The SKU information may be stored as part of the transaction data (109) and associated with the user (101). In one embodiment, the SKU information for items purchased in transactions facilitated by the operator of the transaction handler (103) may be stored as transaction data (109) and associated with its associated purchaser. In one embodiment, the SKU level purchase details are requested from the merchants or retailers via authorization responses, when the account (146) of the user (101) is enrolled in a program that allows the transaction handler (103) (and/or the issuer processor (145)) to collect the purchase details.

In one embodiment, based on the SKU information and perhaps other transaction data, the profile generator (121) may create an SKU-level transaction profile for the user (101). In one embodiment, based on the SKU information associated with the transactions for each person entering into transactions with the operator of the transaction handler (103), the profile generator (121) may create an SKU-level transaction profile for each person.

In one embodiment, the SKU information associated with a group of purchasers may be aggregated to create an SKU-level transaction profile that is descriptive of the group. The group may be defined based on one or a variety of considerations. For example, the group may be defined by common demographic features of its members. As another example, the group may be defined by common purchasing patterns of its members.

In one embodiment, the user (101) may later consider the purchase of additional goods and services. The user (101) may shop at a traditional retailer or an online retailer. With respect to an online retailer, for example, the user (101) may browse the website of an online retailer, publisher, or merchant. The user (101) may be associated with a browser cookie to, for example, identify the user (101) and track the browsing behavior of the user (101).

In one embodiment, the retailer may provide the browser cookie associated with the user (101) to the operator of the transaction handler (103). Based on the browser cookie, the operator of the transaction handler (103) may associate the browser cookie with a personal account number of the user (101). The association may be performed by the operator of the transaction handler (103) or another entity in a variety of manners such as, for example, using a look up table.

Based on the personal account number, the profile selector (129) may select a user specific profile (131) that constitutes the SKU-level profile associated specifically with the user (101). The SKU-level profile may reflect the individual, prior purchases of the user (101) specifically, and/or the types of goods and services that the user (101) has purchased.

The SKU-level profile for the user (101) may also include identifications of goods and services the user (101) may purchase in the future. In one embodiment, the identifications may be used for the selection of advertisements for goods and services that may be of interest to the user (101). In one embodiment, the identifications for the user (101) may be based on the SKU-level information associated with historical purchases of the user (101). In one embodiment, the identifications for the user (101) may be additionally or alternatively based on transaction profiles associated with others. The recommendations may be determined by predictive association and other analytical techniques.

For example, the identifications for the user (101) may be based on the transaction profile of another person. The profile selector (129) may apply predetermined criteria to identify another person who, to a predetermined degree, is deemed sufficiently similar to the user (101). The identification of the other person may be based on a variety of factors including, for example, demographic similarity and/or purchasing pattern similarity between the user (101) and the other person. As one example, the common purchase of identical items or related items by the user (101) and the other person may result in an association between the user (101) and the other person, and a resulting determination that the user (101) and the other person are similar. Once the other person is identified, the transaction profile constituting the SKU-level profile for the other person may be analyzed. Through predictive association and other modeling and analytical techniques, the historical purchases reflected in the SKU-level profile for the other person may be employed to predict the future purchases of the user (101).

As another example, the identifications of the user (101) may be based on the transaction profiles of a group of persons. The profile selector (129) may apply predetermined criteria to identify a multitude of persons who, to a predetermined degree, are deemed sufficiently similar to the user (101). The identification of the other persons may be based on a variety of factors including, for example, demographic similarity and/or purchasing pattern similarity between the user (101) and the other persons. Once the group constituting the other persons is identified, the transaction profile constituting the SKU-level profile for the group may be analyzed. Through predictive association and other modeling and analytical techniques, the historical purchases reflected in the SKU-level profile for the group may be employed to predict the future purchases of the user (101).

The SKU-level profile of the user (101) may be provided to select an advertisement that is appropriately targeted. Because the SKU-level profile of the user (101) may include identifications of the goods and services that the user (101) may be likely to buy, advertisements corresponding to the identified goods and services may be presented to the user (101). In this way, targeted advertising for the user (101) may be optimized. Further, advertisers and publishers of advertisements may improve their return on investment, and may improve their ability to cross-sell goods and services.

In one embodiment, SKU-level profiles of others who are identified to be similar to the user (101) may be used to identify a user (101) who may exhibit a high propensity to purchase goods and services. For example, if the SKU-level profiles of others reflect a quantity or frequency of purchase that is determined to satisfy a threshold, then the user (101) may also be classified or predicted to exhibit a high propensity to purchase. Accordingly, the type and frequency of advertisements that account for such propensity may be appropriately tailored for the user (101).

In one embodiment, the SKU-level profile of the user (101) may reflect transactions with a particular merchant or merchants. The SKU-level profile of the user (101) may be provided to a business that is considered a peer with or similar to the particular merchant or merchants. For example, a merchant may be considered a peer of the business because the merchant offers goods and services that are similar to or related to those of the business. The SKU-level profile reflecting transactions with peer merchants may be used by the business to better predict the purchasing behavior of the user (101) and to optimize the presentation of targeted advertisements to the user (101).

Details on SKU-level profile in one embodiment are provided in U.S. patent application Ser. No. 12/899,144, filed Oct. 6, 2010 and entitled "Systems and Methods for Advertising Services Based on an SKU-Level Profile," the disclosure of which is hereby incorporated herein by reference.

Real-Time Messages

In one embodiment, the transaction handler (103) is configured to cooperate with the media controller (115) to facilitate real-time interaction with the user (101) when the payment of the user (101) is being processed by the transaction handler (103). The real-time interaction provides the opportunity to impact the user experience during the purchase (e.g., at the time of card swipe), through delivering messages in real-time to a point of interaction (107), such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

Figure 9:
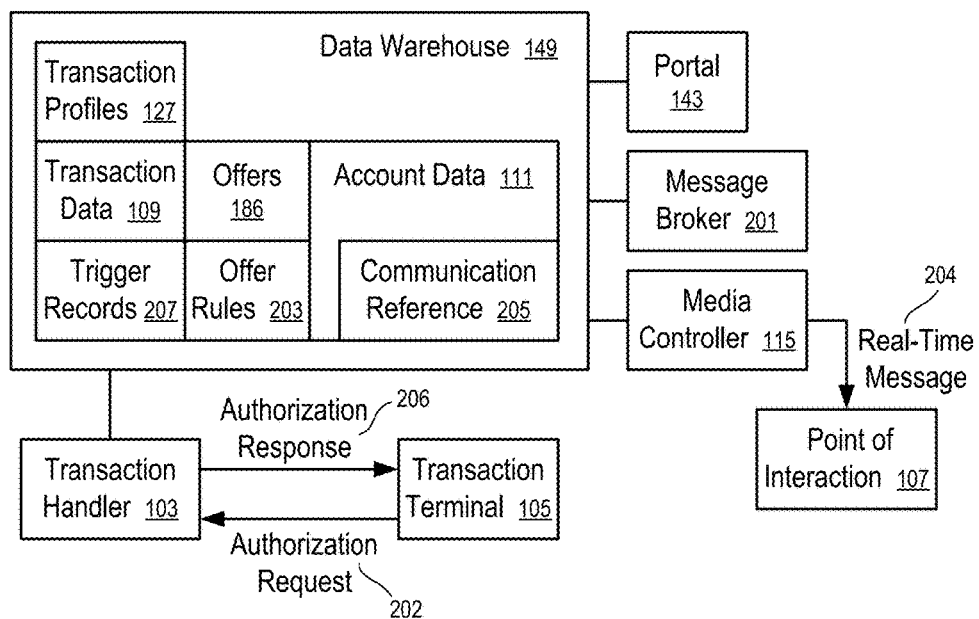
FIG. 9 shows a system to provide real-time messages according to one embodiment.

FIG. 9 shows a system to provide real-time messages according to one embodiment. In FIG. 9, the system includes a transaction handler (103), a message broker (201) and a media controller (115).

In one embodiment, the transaction handler (103) (or a separate computing system coupled with the transaction handler (103)) is configured to detect the occurrence of certain transactions of interest during the processing of the authorization requests (e.g., 202) received from the transaction terminal (105) (via an acquirer processor (147) associated with the transaction terminal (105) of a merchant and/or the merchant account (148)).

In one embodiment, the message broker (201) is configured to identify a relevant message for the user (101) associated with the corresponding authorization request (202); and the media controller (115) is to provide the message to the user (101) at the point of interaction (107) via a communication channel separate from the channel used by the transaction handler (103) to respond (206) to the corresponding authorization request (202) submitted from the transaction terminal (105).

In one embodiment, the media controller (115) is to provide the message (204) to the point of interaction (107) in parallel with the transaction handler (103) providing the response (206) to the authorization request (202).

In one embodiment, the point of interaction (107) receives the message (204) from the media controller (115) in real-time with the transaction handler (103) processing the authorization request (202) and providing the authorization response (206).

In one embodiment, the message (204) is arranged to arrive at the point of interaction (107) in the context of the authorization response (206) provided from the transaction handler (103) to the transaction terminal (105). For example, in one embodiment, the real-time message (204) is to arrive at the point of interaction (107) substantially at the same time that the authorization response (206), responding to the authorization request (202), arrives at the transaction terminal (105), or with a delay not long enough to cause the user (101) to have the impression that the message (204) is in response to an action other than the payment transaction conducted at the transaction terminal (105). For example, in one embodiment, the real-time message (204) is arranged to arrive at the point of interaction (107) prior to the user (101) completing the transaction and leaving the transaction terminal (105), or prior to the user (101) leaving the retail location of the merchant operating the transaction terminal (105).

In FIG. 9, the system further includes a portal (143) to provide services to merchants and/or the user (101). In one embodiment, different portals (143) are used to service merchants and users (101). For example, in one embodiment, a merchant portal (143) is used to provide services to merchants; a different user portal (143) is used to provide services to users (101). Alternatively, a same portal (143) may be used to service both merchants and users (101).

For example, in one embodiment, the merchant portal (143) is configured to allow the user (101) to register the communication reference (205) in association with the account data (111), such as the account information (142) of the consumer account (146); and the media controller (115) is to use the communication reference (205) to deliver the message to the point of interaction (107). Examples of the communication reference (205) include a mobile phone number, an email address, a user identifier of an instant messaging system, an IP address, etc. In one embodiment, the media controller (115) is configured to transmit the message (204) to the point of interaction (107) of the user (101) using the communication reference (205), when the message (204) is responsive to an authorization request (202) identifying the account data (111).

In one embodiment, the user portal (143) allows merchants and/or other parties to define rules (203) to provide offers (186) as real-time responses (e.g., 204) to authorization requests (e.g., 202); and based on the offer rules (203), the message broker (201) is configured to generate, or instruct the media controller (115) to generate, real-time messages (e.g., 204) to provide the offers (186) to the users (e.g., 101).

In one embodiment, the offers (186) can be provided to the users (e.g., 101) and associated with the account data (111) of the users (e.g., 101) via other media channels, such as a search engine, a news website, a social networking site, a communication application, etc. Examples of techniques to associate offers with account data (111) can be found in U.S. patent application Ser. No. 12/849,801, filed Aug. 3, 2010 and entitled "Systems and Methods for Multi-Channel Offer Redemption," the disclosure of which is hereby incorporated herein by reference.

In one embodiment, the offer (186) includes the benefit of a discount, an incentive, a reward, a rebate, a gift, or other benefit, which can be redeemed upon the satisfaction of certain conditions required by the offer rules (203). In one embodiment, the real-time message (204) is configured to inform the user (101) of the benefit that the user (101) is entitled to upon the completion of the payment associated with the authorization request (202).

In one embodiment, based on the offer rules (203), the message broker (201) configures a message (204) by selecting the appropriate message template from (an) existing message(s) template(s), and inserts any relevant data (e.g., the communication reference (205)) into the selected template, then passes the configured message to the media controller (115), which delivers the message (204) to the point of interaction (107) using the communication reference (205) associated with the account data (111) of the user (101).

In one embodiment, the message broker (201) (or a subsystem) is configured to manage message templates along with the rules (203) for selecting the appropriate message template from among several potential choices.

In one embodiment, the offer rules (203) include offer details, targeting rules, advertisement campaign details, profile mapping, creative mapping, qualification rules, award/notification/fulfillment rules, approvals, etc. Creative elements for offers include text, images, channels, approvals, etc.

For example, in one embodiment, the offer details specify the benefits the user (101) is entitled to when the conditions specified in the fulfillment rules (203) are satisfied.

For example, in one embodiment, the creative mapping specifies the content elements that are used to generate a message that describes or identifies the offer (186), such as the logo of a sponsor of the offer (186), a banner of the offer (186), a message of the offer (186), etc.

For example, in one embodiment, the targeting rules and the advertisement campaign details specify the way the offer (186) can be distributed and the requirements of the recipients of the offer (186). In one embodiment, the portal (143) allows the merchants to target the offers (186) at users (e.g., 101) according to the transaction profiles (127) of the respective users. Some details and examples about the transaction profiles (127) in one embodiment are provided in the section entitled "AGGREGATED SPENDING PROFILE."

In one embodiment, when the offer rules (203) are activated by the merchant or advertiser via the portal (143), the message broker (201) is configured to generate trigger records (207) for the transaction handler (103). The transaction handler (103) is configured to monitor the incoming authorization requests (e.g., 202) to identify requests that satisfy the conditions specified in the trigger records (207), during the process of the authorization requests (e.g., 202). In one embodiment, the transaction handler (103) is configured to provide the information about the requests (e.g., 202) identified according to the trigger records (e.g., 207) to the message broker (201) for the transmission of an appropriate real-time message (e.g., 204) in accordance with the offer rules (203).

In one embodiment, the conditions specified in a trigger record (e.g., 207) to select a transaction associated with an authorization request (202) for further processing by the message broker (201) is a subset of conditions required for the generation of the real-time message (204). Once the transaction associated with the authorization request (202) is identified by the transaction handler (103) according to the trigger records (207), the message broker (201) is configured to further determine whether and/or how to generate the real-time message (204). In one embodiment, the trigger record (207) identifies the respective offer (186) and/or its associated offer rules (203) to allow the message broker (201) to further process the generation and/or transmission of the real-time message (204).

For example, in one embodiment, the message broker (201) is configured to determine whether the user (101) is entitled to the benefit of the offer (186) if the payment associated with the authorization request (202) is eventually settled. Based on the result of such a determination, the message broker (201) determines whether or not to generate the message (204). For example, if the payment transaction is not actually relevant to the offer (186) (e.g., the conclusion according to the trigger record (207) is a false positive), the message broker (201) does not generate the real-time message (204). For example, when the payment transaction, if completed, brings the user (101) closer to the qualification of the benefit redemption associated with the offer (186), the message broker (201) is configured to generate the real-time message (204) to indicate the milestone achieved towards the redemption of the offer (186). For example, when the payment transaction, if completed, brings the user (101) to a point that the user (101) is entitled to the benefit of the offer (186), the real-time message (204) is configured to notify the user (101) of the benefit available upon the settlement of the payment transaction.

In one embodiment, through the arrangement of including a portion of the conditions in the trigger record (207) and using the message broker (201) to process the remaining conditions, the load applied on the transaction handler (103) for the detection of transactions of interest to the message broker (201) is reduced. Thus, the impact on the performance of the transaction handler (103) in processing authorization request (202) in aspects not related to the offer (186) and the real-time message (204) is reduced.

In one embodiment, a set of standardized types of conditions are identified for generation of the trigger records (207). The standardized types of conditions are selected to optimize the performance the transaction handler (103), while reducing the likelihood of false positives which are identified by applying the complete set of conditions associated with the offer rules (203). In generating the trigger records (207), the conditions in the offer rules (203) are mapped to the standardized types of conditions in a way to eliminate false negatives and reduce false positives. In one embodiment, a false negative occurs when a conclusion in accordance with the conditions specified in the trigger record (207) indicates that the transaction is of no interest to the message broker (201), while a conclusion in accordance with the conditions specified in the offer rules (203) indicates that the transaction is of interest to the message broker (201); and a false positive occurs when a conclusion in accordance with the conditions specified in the trigger record (207) indicates that the transaction is of interest to the message broker (201), while a conclusion in accordance with the conditions specified in the offer rules (203) indicates that the transaction is of no interest to the message broker (201).

In one embodiment, the generation of the trigger records (207) for the transaction handler (103) is in real-time with the merchant or advertiser activating the offer rules (203). Thus, the offer rules (203) can be activated and used for the detection of the new authorization requests in real-time, while the transaction handler (103) continues to process the incoming authorization requests.

In one embodiment, the portal (143) provides information about the spending behaviors reflected in the transaction data (109) to assist the merchants or advertisers to target offers or advertisements. For example, in one embodiment, the portal (143) allows merchants to target the offers (186) based on transaction profiles (127). For example, the offer rules (203) are partially based on the values in a transaction profile (127), such as an aggregated spending profile (341). In one embodiment, the offer rules (203) are partially based on the information about the last purchase of the user (101) from the merchant operating the transaction terminal (105) (or another merchant), and/or the information about the location of the user (101), such as the location determined based on the location of the transaction terminal (105) and/or the location of the merchant operating the transaction terminal (105).

In one embodiment, the portal (143) provides transaction based statistics, such as merchant benchmarking statistics, industry/market segmentation, etc., to assist merchants and advertisers to identify customers. In one embodiment, the transaction based statistics are provided in a way that prevents the merchant from identifying any specific individual user (101) associated with the transaction based statistics (e.g., to protect the privacy of the individual user (101)).

In one embodiment, the real-time messages (204) include offers (186) provided according to the offer rules (203) and are used to influence customer behaviors while the customers are in the purchase mode.

In one embodiment, the benefit of the offers (186) can be redeemed via the transaction handler (103). The redemption of the offer (186) may or may not require the purchase details (e.g., SKU level purchase details). Details in one embodiment about redeeming offers (186) via the transaction handler (103) are provided in U.S. patent application Ser. No. 13/113,710, filed May 23, 2011 and entitled "Systems and Methods for Redemption of Offers," the disclosure of which is hereby incorporated herein by reference.

In one embodiment, when the authorization request (202) for a purchase indicates that the purchase qualifies the offer (186) for redemption if the purchase corresponding to the authorization request (202) is completed, the message broker (201) is to construct a message (204) and use the media controller (115) to deliver the message (204) in real-time with the processing of the authorization request (202) to the point of interaction (107). For example, in one embodiment, the message (204) is configured to inform the user (101) that when the purchase is completed, the transaction handler (103) and/or the issuer processor (145) is to provide the benefit of the offer (186) to the user (101) via statement credit or some other settlement value, such as points in a registered loyalty program, or credit at the point of sale using a digital coupon delivered to the user (101) via cell phone.

In one embodiment, the settlement of the payment transaction corresponding to the authorization request (202) does not occur in real-time with the processing of the authorization request (202). For example, the merchant may submit the complete purchases for settlement at the end of the day, or in accordance with a predetermined schedule. The settlement may occur one or more days after the processing of the authorization request (202).

In one embodiment, when transactions are settled, the settled transactions are matched to the authorization requests (202) to identify offers (186) that are redeemable in view of the settlement. When the offer (186) is confirmed to be redeemable based on a record of successful settlement, the message broker (201) is to use the media controller (115) to provide a message (204) to the point of interaction (107) of the user (101), such as the mobile phone of the user (101). In one embodiment, the message (204) is to inform the user (101) of the benefit to be provided as statement credits and/or to provide additional offers. In one embodiment, the message (204) to confirm the statement credits is issued in real-time with the completion of the transaction settlement.

In one embodiment, the message broker (201) is configured to determine the identity of the merchant based on the information included in the authorization request (202) transmitted from the transaction terminal (105) to the transaction handler (103). In one embodiment, the identity of the merchant is normalized to allow the application of the offer rules (203) that are merchant specific.

In one embodiment, the portal (143) is configured to provide data insight to merchants and/or advertisers. For example, the portal (143) can provide the transaction profile (127) of the user (101), audience segmentation information, etc.

In one embodiment, the portal (143) is configured to allow the merchants and/or advertisers to define and manage offers (186) for their creation, fulfillment and/or delivery in messages (204).

In one embodiment, the portal (143) is configured to allow the merchants and/or advertisers to test, run and/or monitor the offers (186) for their creation, fulfillment and/or delivery in messages.

In one embodiment, the portal (143) is configured to provide reports and analytics regarding the offers (186).

In one embodiment, the portal (143) is configured to provide operation facilities, such as onboarding, contact management, certification, file management, workflow, etc. to assist the merchants and/or advertisers to complete the tasks related to the offers (186).

In one embodiment, the portal (143) allows the user (101) to opt in or opt out of the real-time message delivery service.

In one embodiment, the portal (143) is configured to present a user interface that allows an advertiser or merchant to select an offer fulfillment method from a list of options, such as statement credits, points, gift cards, e-certificates, third party fulfillment, etc.

In one embodiment, the merchant or advertiser is to use the pre-computed ("off the rack") transaction profiles (127) available in the data warehouse (149) to target the delivery of the offers (186). In one embodiment, the portal (143) is configured to further allow the merchant or advertiser to edit parameters (e.g., define new parameters based on existing parameters defined in the pre-computed transaction files (127) to generate new parameters) to customize the generation of the transaction profiles (127) and/or develop custom transaction profiles from scratch.

In one embodiment, the portal (143) is configured to provide a visualization tool to allow the user of the portal (143) (e.g., a merchant or an advertiser) to see clusters of data based on geographical codes to identify locations (e.g., GeoCodes), proximity, transaction volumes, spending patterns, zip codes, customers, stores, etc.

In one embodiment, the portal (143) is configured to provide a user interface that allows a merchant or advertiser to define cells for targeting the customers who reside in the cells, based on date/time, profile attributes, map to offer/ channel/creative, condition testing, etc.

In one embodiment, the portal (143) is configured to provide a user interface that allows a merchant or advertiser to monitor the health of the system (e.g., the condition of servers, files received or sent, errors, status), monitor the throughput by date or range, by program, by campaign, or by global view, and monitor aspects of current programs/offers/campaigns, such as offer details, package audit reports, etc. In one embodiment, the portal (143) is configured to provide a user interface to provide reports on topics such as analytics and metrics relating to lift, conversion, category differentials (e.g., spending patterns, transaction volumes, peer groups), with the reporting performed for a specific program, campaign, cell, GeoCode, proximity, ad-hoc, auditing, etc.

Figure 10:
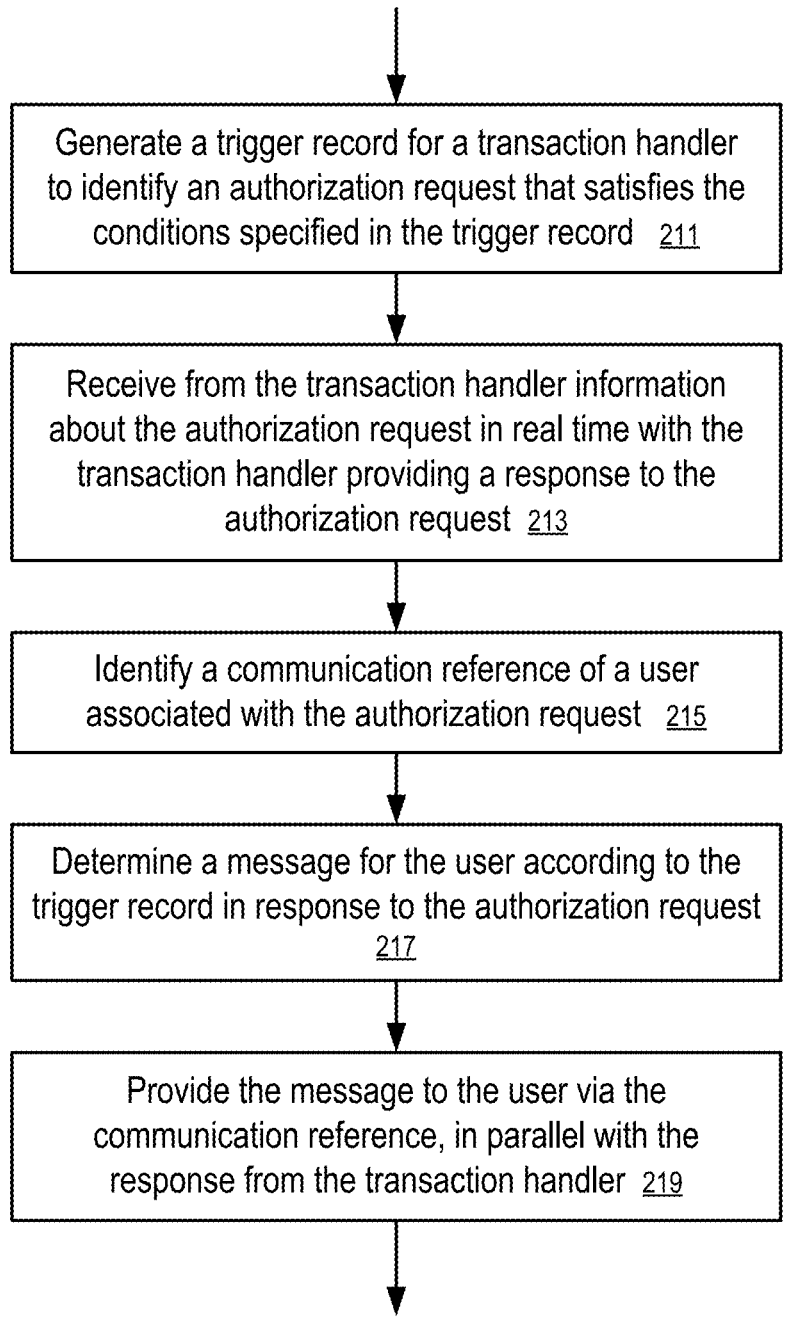
FIG. 10 shows a method to provide real-time messages according to one embodiment.

FIG. 10 shows a method to provide real-time messages according to one embodiment. In FIG. 10, a computing apparatus is configured to generate (211) a trigger record (207) for a transaction handler (103) to identify an authorization request (202) that satisfies the conditions specified in the trigger record (207), receive (213) from the transaction handler (103) information about the authorization request (202) in real-time with the transaction handler (103) providing a response (206) to the authorization request (202) to a transaction terminal (105), identify (215) a communication reference (205) of a user (101) associated with the authorization request (202), determine (217) a message (204) for the user (101) responsive to the authorization request (202), and provide (219) the message (204) to the user (101) at a point of interaction (107) via the communication reference (205), in parallel with the response (206) from the transaction handler (103) to the transaction terminal (105).

In one embodiment, the computing apparatus includes at least one of: a transaction handler (103), a message broker (201), a media controller (115), a portal (143) and a data warehouse (149).

Figure 11:
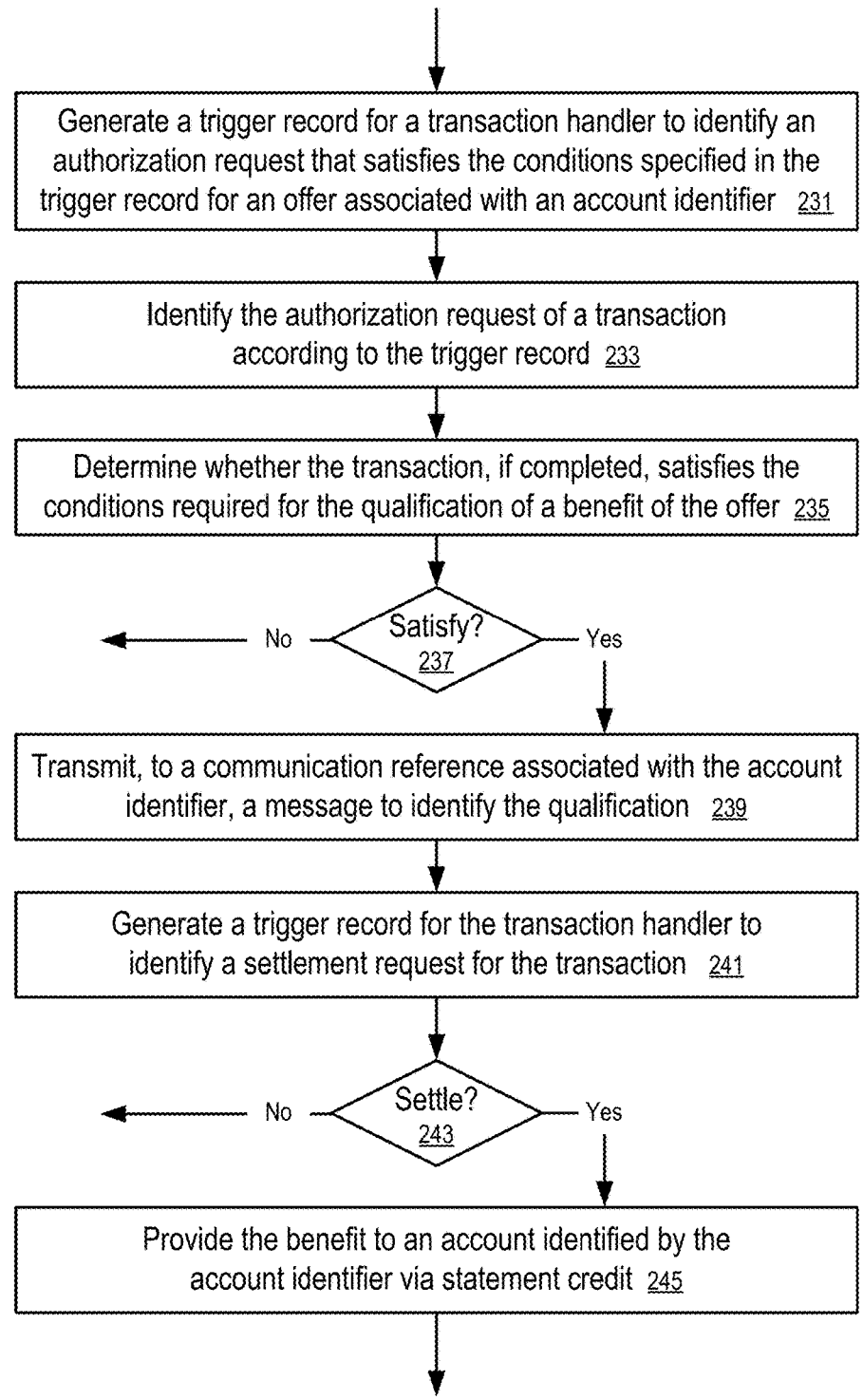
FIG. 11 shows a method to provide benefits according to one embodiment.

FIG. 11 shows a method to provide benefits according to one embodiment. In FIG. 11, the computing apparatus is configured to generate (231) a trigger record (207) for a transaction handler (103) to identify an authorization request (202) that satisfies the conditions specified in the trigger record (207) for an offer (186) associated with an account identifier (e.g., account data (111), account information (142), or account number (302)).

In FIG. 11, the computing apparatus is configured to identify (233) the authorization request (202) of a transaction according to the trigger record (207) and determine (235) whether the transaction, if completed, satisfies the conditions required for the qualification of a benefit of the offer (186) in accordance with the offer rules (203).

If the transaction satisfies (237) the benefit qualification conditions in accordance with the offer rules (203) of the offer (186), the computing apparatus is configured to transmit (239), to a communication reference (205) associated with the account identifier (e.g., account data (111), account information (142), or account number (302)), a message (204) to identify the qualification. The computing apparatus is configured to further generate (241) a trigger record (207) for the transaction handler (103) to identify a settlement request for the transaction. If the transaction is settled (243), the computing apparatus is configured to provide (245) the benefit of the offer (186) to a consumer account (146) identified by the account identifier (e.g., account data (111), account information (142), or account number (302)) via statement credit. In one embodiment, the statement credit is provided as part of the settlement operations of the transaction.

In one embodiment, a computer-implemented method includes: storing, in a computing apparatus having a transaction handler (103), a plurality of trigger records (207); processing, by the transaction handler (103), an authorization request (202) received from an acquirer processor (147), where the authorization request (202) is processed for a payment to be made by an issuer processor (145) on behalf of a user (101) having an account identifier (e.g., account data (111), account information (142), or account number (302)) associated with the issuer processor (145), and the acquirer processor (147) is configured to receive the payment on behalf of a merchant operating the transaction terminal (105).

In one embodiment, the method further includes: determining, by the transaction handler (103), whether the authorization request (202) matches one of the plurality of trigger records (207) by determining whether the attributes of the transaction associated with the authorization request (202) satisfies the conditions specified in one of the plurality of trigger records (207).

In one embodiment, if the authorization request (202) matches a trigger record (207) in the plurality of the trigger records (207), the computing apparatus is configured to identify a communication reference (205) of the user (101) in accordance with the trigger record (207), generate a message (204) regarding a benefit to be provided to the user (101) upon the completion of the payment, and transmit the message (204) to the user (101) via the communication reference (205) in real-time with the processing of the authorization request (202). In one embodiment, the communication reference (205) is one of: a phone number and an email address; and the message (204) is transmitted via at least one of: short message service and email.

In one embodiment, the message (204) is transmitted to a mobile phone of the user (101) via the communication reference (205).

In one embodiment, the message (204) is transmitted to the user (101) via a communication channel separate from a communication channel used to provide a response (206) to the authorization request (202).

In one embodiment, the method further includes the computing apparatus identifying an offer (186) based on transaction data (109) of the user; and the message (204) is configured to provide the offer (186).

In one embodiment, the computing apparatus includes the portal (143) configured to receive offer rules (203) from a merchant for the offer (186); and the offer (186) is identified for delivery in the real-time message (204) based further on the offer rules (203).

In one embodiment, the offer (186) is identified in real-time with the processing of the authorization request (202), or in response to a determination that the authorization request (202) matches the trigger record (207).

In one embodiment, the offer (186) is identified based on a profile (e.g., 131, or 341) of the user (101). In one embodiment, the profile (e.g., 131 or 341) summarizes the transaction data (109) of the user (101). In one embodiment, the computing apparatus includes the profile generator (121) configured to generate the profile (e.g., 341) from the transaction data (109) of the user (101) via a cluster analysis (329) and a factor analysis (327), as described in the section entitled "AGGREGATED SPENDING PROFILE."

In one embodiment, the message (204) indicates that a transaction for which the authorization request (202) is processed is eligible for the benefit of an offer (186) associated with the account identifier (e.g., account data (111)) of the user (101), when the transaction is eventually completed and settled.

In one embodiment, the offer (186) is stored in the data warehouse (149) in association with the account identifier (e.g., account data (111)); and the trigger record (207) identifies the offer (186) to allow the message broker (201) to further check whether the transaction meets the benefit redemption conditions of the offer (186).

In one embodiment, the computer apparatus is configured to determine whether the payment, if completed, entitles the user (101) to the benefit of the offer (186), in response to a determination that the authorization request (202) matches the trigger record (207); and the message (204) is transmitted to the user (101) via the communication reference (205) in response to an indication of the approval of the authorization request (202) and after a determination is made that the payment, if completed, entitles the user (101) to the benefit of the offer (186).

In one embodiment, the transaction handler (103) is configured to identify a settled transaction corresponding to the authorization request (202) that triggers the message (204), and then provide the benefit of the offer (186) to the user (101) via statement credits, or loyalty program points, after the settled transaction is identified.

In one embodiment, the transaction handler (103) is configured to provide the benefit of the offer (186) to the user (101) via point of sale credit using digital coupons transmitted to cellular telephone of the user (101) during the processing of the payment at the transaction terminal (105).

In one embodiment, the transaction handler (103) is configured to process a settlement request for the payment and provide the benefit of the offer (186) to the user (101) via statement credit to a consumer account (146) corresponding to the account identifier (e.g., account data (111)) in response to the completion of the settlement of the payment, or as part of the settlement of the payment.

In one embodiment, the computing apparatus is configured to generate a second trigger record for the transaction handler (103) to monitor the settlement of the payment, in order to provided a benefit in response to the settlement of the payment, or as part of the settlement of the payment.

In one embodiment, the computing apparatus includes: a data warehouse (149) configured to store a plurality of trigger records (207); a transaction handler (103) coupled with the data warehouse (149) and configured to process an authorization request (202) received from an acquirer processor (147); and a message broker (201) coupled with the transaction handler (103) such that after the transaction handler (103) determines that the authorization request (202) matches a trigger record (207) in the plurality of the trigger records (207), the message broker (201) identifies a communication reference (205) of the user (101) in accordance with the trigger record (207) and generates a message (204) regarding a benefit to be provided to the user (101) upon completion of the payment. The computing apparatus further includes a media controller (115) coupled with the message broker (201) to transmit the message (204) to the user (101) via the communication reference (205) in real-time with the transaction handler (103) processing the authorization request (202).

Mobile Offer

Figure 12:
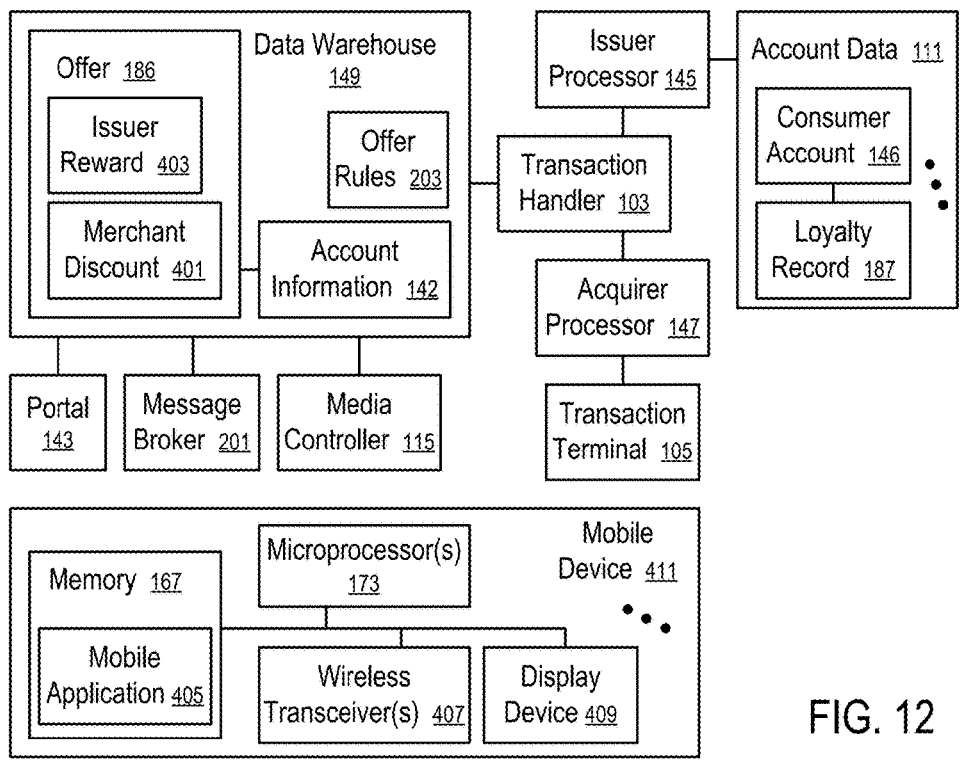
FIG. 12 shows a system to process offers according to one embodiment.

FIG. 12 shows a system to process offers according to one embodiment.

In one embodiment, the portal (143) is configured to download a mobile application (405) to the mobile device (411) of a user (101) of a consumer account (146). To use the mobile application (405), the user (101) submits data associating the account information (142) with the mobile application (405) running on the mobile device (411) (e.g., via the microprocessor(s) (173) executing the instructions included in the mobile application (405)).

In one embodiment, the portal (143) is in communication with the mobile application (405) running inside the mobile device (411), via a communication channel (e.g., using the wireless transceiver(s) (407)). In one embodiment, the mobile device (411) includes a plurality of wireless transceivers (407), such as a cellular communication signal transceiver, a wireless local area network transceiver, a personal area network transceiver, etc. In one embodiment, the wireless transceivers (407) are used to determine or estimate the current location of the mobile device (411). In one embodiment, the mobile device (411) includes a global positioning system (GPS) receiver to determine the current location of the mobile device (411).

In FIG. 12, the mobile application (405) in the mobile device (411) is configured to receive offers (e.g., 186) via the portal (143). For example, the portal (143) may push offers (e.g., coupons and promotions) to the mobile device (411) based on the location of the mobile device (411), the merchant location (e.g., the location of the point of sales (POS) terminals operated by a merchant), and/or the spending patterns of the user (101) (e.g., as indicated in the transaction profile (127 or 341) of the user (101)).

In one embodiment, the offer (186) includes a coupon code that is transmitted to the mobile device (411) via the mobile application (405). The mobile application (405) is configured to use the display device (409) to present the coupon code to the merchant when the user (101) uses the consumer account (146) to make a purchase in accordance with the requirements of the offer (186). In view of the coupon code presented via the mobile application (405), the merchant provides a merchant discount (401) in accordance with the offer (186).

In one embodiment, the coupon code is presented to the merchant after the user (101) completes a payment transaction using the consumer account (146). When the offer (186) is presented to the merchant, the merchant initiates a charge-back to the consumer account (146) to provide the merchant discount (401).

For example, in one embodiment, after or during the time the user (101) makes the payment transaction that satisfies the requirements of the offer (186), the transaction handler (103) detects the transaction and causes the portal (143) to push the offer (186) to the mobile application (405), before the user (101) leaves the transaction terminal (105). The media controller (115) may also transmit a real-time message notifying the user (101) of the offer (186) that contains the coupon code. If the user (101) uses the mobile device (411) to present the coupon code, the merchant provides a discount (401) in accordance with the offer (186).

In one embodiment, the offer (186) is provided in anticipation of, and/or to promote, the user (101) performing a payment transaction with the merchant. Thus, the user (101) can provide the coupon code to the merchant prior to the initiation of the payment transaction on the transaction terminal (105). In view of the coupon code, the merchant may instantly reduce the price to provide the merchant discount (401), such that the amount in the transaction authorization request reflects the merchant discount (401).

In one embodiment, the application of the offer (186) is automated without the user (101) having to present the coupon code to apply the offer (186).

For example, in one embodiment, the offer (186) is stored in the data warehouse (149) of the transaction handler (103). When the transaction handler (103) detects the transaction that qualifies for the benefit of the offer (186), the transaction handler (103) modifies the transaction amount to apply the merchant discount (401) during the processing of the authorization request received from the acquirer processor (147), or the authorization response received from the issuer processor (145). In one embodiment, the transaction handler (103) is configured to communicate with the transaction terminal (105) to identify the merchant discount (401) applied to the transaction; and thus, the user (101) can see the applied merchant discount (401) on the receipt printed for the transaction. Alternatively, the transaction handler (103) initiates a separate transaction between the merchant and the consumer account (146) to provide the merchant discount (401). For example, the transaction handler (103) may apply the merchant discount (401) in response to the settlement of the transaction that qualifies for the merchant discount (401) of the offer (186) (e.g., via communicating with the issuer processor (145) and the acquirer processor (147) to provide a statement credit to the consumer account (146) and to charge the merchant for the cost of the merchant discount (401)).

In one embodiment, the offer (186) includes not only the merchant discount (401) but also the issuer reward (403). After the transaction that qualifies for the benefit of the offer (186) is settled, the transaction handler (103) and/or the portal (143) communicates with the issuer processor (145) to inform of the issuer reward (403) that is to be provided to the consumer account (146) in accordance with the offer (186). In response, the issuer processor (145) modifies the account data (111) to include the issuer reward (403) in the loyalty record (187).

In one embodiment, the mobile device (411) is configured to present the coupon code to the transaction terminal (105) via wireless communications (e.g., near field communications, radio frequency identification (RFID) communications, Bluetooth communications, or a bar code displayed on the display device (409)).

In one embodiment, the transaction terminal (105) is configured to apply the offer (186) based on the coupon code. For example, the transaction terminal (105) is configured in one embodiment to retrieve data about the offer (186) via the portal (143) using the coupon code that identifies the offer (186). A description of the offer (186) is presented to the merchant for approval; and the identification of the offer (186) is printed on the receipt for the transaction.

In one embodiment, the transaction terminal (105) is configured to modify the transaction amount, prior to initiating an authorization request for the payment transaction that qualifies for the benefit of the offer (186), if the coupon code is transmitted to the transaction terminal (105) prior to the transaction terminal (105) initiating the authorization request.

In one embodiment, the transaction terminal (105) is configured to modify the transaction amount, after the authorization request for the transaction is approved by the issuer processor (145) but prior to initiating a settlement request for the payment transaction that qualifies for the benefit of the offer (186). For example, in one embodiment, in response to the authorization response that approves the authorization request, the portal (143) pushes the coupon code to the mobile application (405) and/or provides an alert to the mobile device (411) via a message generated by the message broker (201) and transmitted by the media controller (115). After the coupon code is presented to the transaction terminal (105), the settlement amount can be adjusted to apply the merchant discount (401).

In one embodiment, the transaction terminal (105) is configured to initiate a chargeback to provide the merchant discount (401) after the merchant approves the merchant discount (401).

In one embodiment, in response to the authorization response that approves the authorization request, the portal (143) pushes the coupon code to the transaction terminal (105) (e.g., via the authorization response provided to the transaction terminal (105) via the acquirer processor (147)). In response, the transaction terminal (105) identifies the offer (186) for the merchant's approval of the merchant discount (401). Thus, the user (101) and/or the mobile device (411) do not have to present the coupon code and/or identify the offer (186) to the merchant to receive the merchant discount (401).

In one embodiment, the offers (186) are managed by the portal (143) on behalf of the issuers and the merchants in accordance with the offer rules (203) specified by the issuers and merchants.

In one embodiment, the issuers and merchants specify issuer rewards (e.g., 403) and merchant discounts (e.g., 401) separately with respective offer rules (203). The portal (143) is configured to combine compatible offers from the issuer and merchant to generate the offer (186) that includes both an issuer reward (403) and a merchant discount (401).

In one embodiment, the offer rules (203) specify the conditions to deliver the offer (186) to the mobile application (405). The conditions may include a location requirement, such as a distance between the mobile device (411) and the transaction terminal (105) being less than a predetermined distance, or when the consumer account (146) is used to make a transaction at another transaction terminal that is within a predetermined range from the transaction terminal (105). For example, the conditions may include a timing requirement, such as the offer (186) is allowed to be delivered to the mobile application (405) within certain periods in a day, or certain days in a week or month. For example, the conditions may include a spending pattern requirement formulated based on the transaction profile (127 or 341).

In one embodiment, the mobile device (411) is configured to not only identify the coupon code of the offer (186) but also the consumer account (146). For example, in one embodiment, the mobile device (411) is configured as an account identification device (141) to provide the account information (142) that identifies the consumer account (146). The account information (142) is identified to the transaction terminal (105) via a bar code, a magnetic strip, an RFID chip, a near field communications device, etc.

In one embodiment, the offer (186) can be pushed to the mobile device (411) via the message broker (201) and the media controller (115) without the mobile application (405), using general purpose software, such as client software for emails, instant messages, short message service messages, or web browsers.

In one embodiment, the loyalty record (187) is stored in the data warehouse (149) of the transaction handler (103) and/or sponsored by the transaction handler (103), the issuer processor (145), or a third party.

Figure 13:
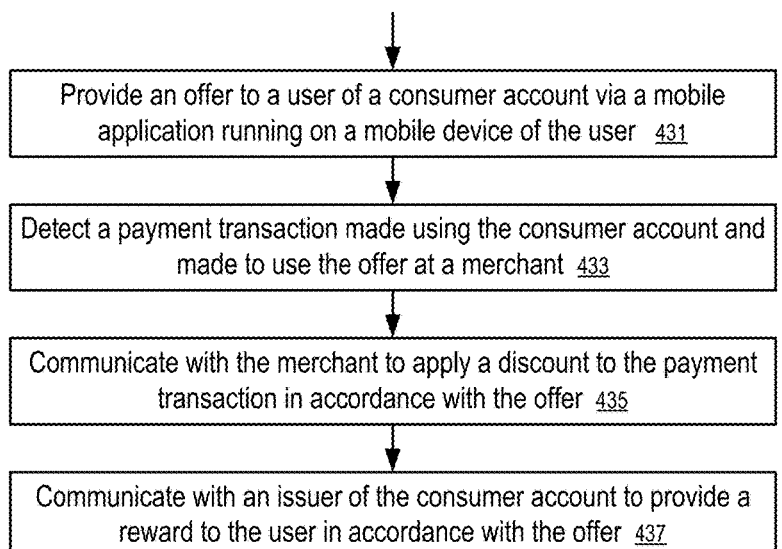
FIG. 13 shows a method to process offers according to one embodiment.

FIG. 13 shows a method to process offers according to one embodiment. In FIG. 13, a computing apparatus is configured to provide (431) an offer (186) to a user (101) of a consumer account (146) via a mobile application (405) running on a mobile device (411) of the user (101), detect (433) a payment transaction made using the consumer account (146) and made to use the offer (186) at a merchant, communicate (435) with the merchant to apply a discount (401) to the payment transaction in accordance with the offer (186), and communicate (437) with an issuer of the consumer account (146) to provide a reward to the user (101) in accordance with the offer (186).

In one embodiment, the computing apparatus/system includes at least one of: the data warehouse (149), the portal (143), the message broker (201), the media controller (115), the transaction handler (103), the advertisement selector (133), the profile generator (121), the issuer processor (145), the acquirer processor (147), and the transaction terminal (105).

Offer Formation

In one embodiment, offer related communications are provided to a user (101) via a mobile device (e.g., 107, 411) that is configured to determine information about items disposed in a retail location. Based on the information about the items and transaction data (109) of the user (101), offers (186) are initially formulated and communicated to the user (101) via the mobile device (411). Based on the real-time information indicating the user (101) disposing the offers (186), the offers (186) may be adjusted to refine the offers (186).

In one embodiment, the mobile device (e.g., 107, 411) is configured to make payments. After the information about the items is determined by the mobile device (411), payments related to the items and/or offers related to the items are monitored to determine the real-time information indicative of the purchase intent of the user (101). The purchase intent of the user (101) is analyzed to formulate new offers (186) and/or adjust existing offers (186).

In one embodiment, the mobile device (e.g., 107, 411) is configured to provide a comparison shopping experience based on the user (101) using the mobile device (411) to identify information about items disposed in a retail location, such as the description of the item, the price of the item, etc. Targeted offers (186) are formulated based on the interest of the user (101) indicated by the use of the mobile device (411) that is configured to identify information about items disposed in the retail location and that is configured to make payments for the identified items. The offer formulation and adjustment reduces abandonment, increases customer conversion, and avoids inefficient and irrelevant "mass" offers to consumers.

In one embodiment, the mobile device (411) is configured to capture or scan an identification of an item disposed in a retail location, such as the barcode representing the item. The identification of the item can be used to determine the price of the item at the retail location and search for the prices from competitors of the retail location. Offers from competitors can be presented with the offer from the retail location to provide the user (101) with a comparison shopping experience. Based on the disposal of the offers by the user (101), the offers may be adjusted to help the retail location merchant to retain the business of the user (101).

In one embodiment, the portal (149) is configured with a control panel to allow merchants to actively participate in and influence consumers' shopping experience via formulating offer rules (203) for delivering offers with a high degree of relevance to the users (101).

In one embodiment, the process of targeting offers is configured to elicit a virtual two party negotiation between a merchant and a user (101) that includes scanning product barcodes in a retail store using a mobile device (411) (e.g., a smart phone, a cellular phone, a personal digital assistant, a tablet computer, a portable media player, etc) with the intent of making a purchase or comparing prices of the item offered by different merchants.

Figure 19:
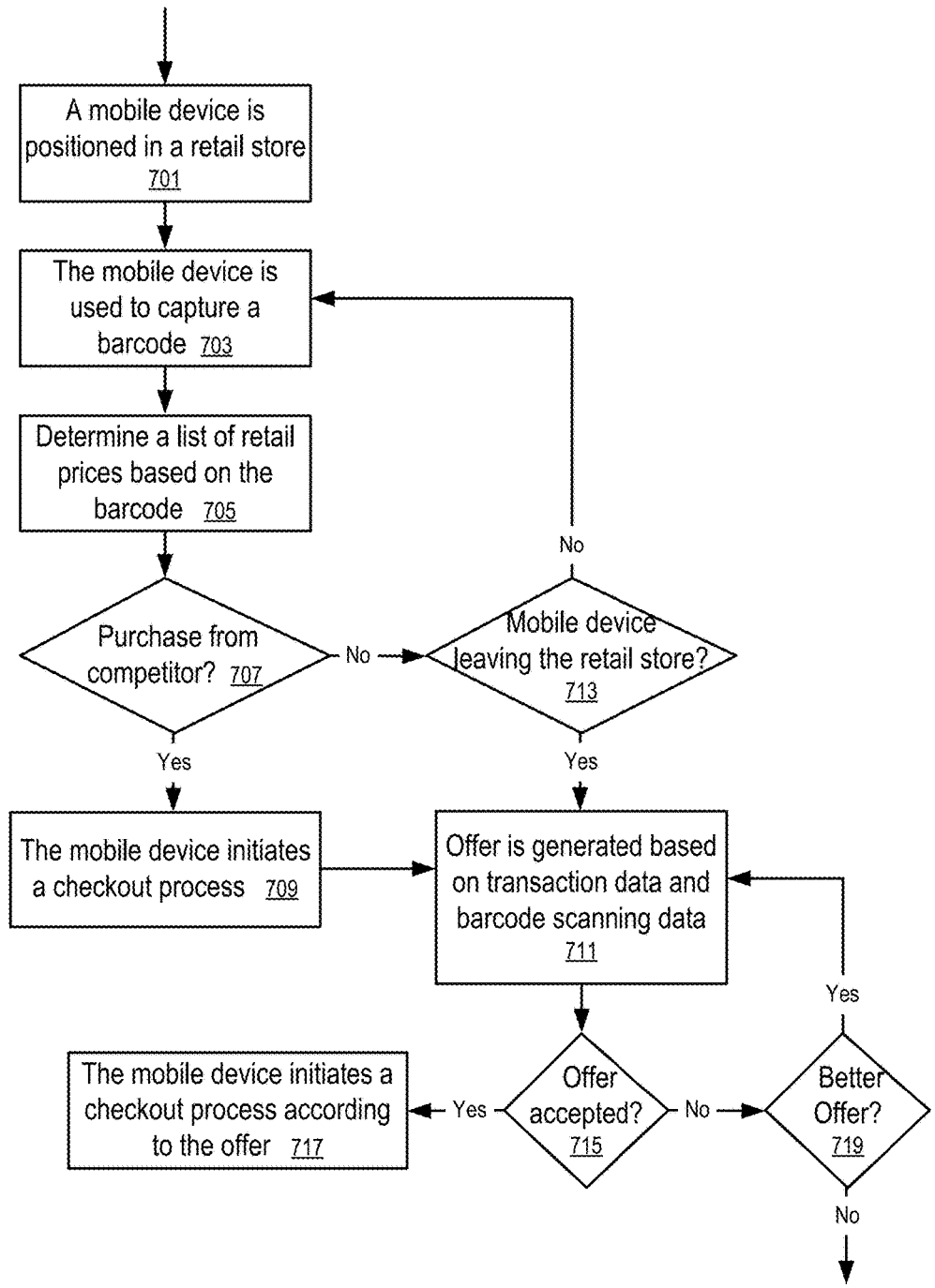
FIG. 19 shows a process to negotiate offers via an AI engine according to one embodiment.

FIG. 19 shows a process to negotiate offers via an AI engine according to one embodiment. In FIG. 19, a mobile device (e.g., 107 or 411) is positioned (701) in a retail store of a merchant.

For example, the user (101) may walk into a physical, brick-and-mortal retail store (e.g., as oppose to a virtual store hosted on Internet) with the mobile device (e.g., 107, 411). When the user (101) uses the mobile device (e.g., 107, 411) configured with a barcode scanning application (e.g., configured to recognize a barcode from an image capture via a digital camera of the mobile device (411) or using other barcode scanning techniques) to capture (703) a barcode of a product for sale in the retail store, the intent of the user (101) to purchase an item (e.g., flat-screen TV, a DVD movie, etc) as represented by the barcode is determined.

In one embodiment, the barcode scanning application uses the digital camera integrated within the mobile device (411) to determine the Universal Product Code (UPC) of items for sale in a retail location of a merchant. Alternatively or in combination, the mobile device (411) is also configured with a user interface to allow the user to input the UPC code without using the digital camera.

The mobile device (411) then uses the UPC code to access a product database to determine (705) a list of retail prices for the specific product charged by a variety of online and retail merchants. The user (101) may use the mobile device (411) to scan one product UPC code or scan the UPC codes for multiple items in the same category. The type and number of scans are used to configure the type of offers that will be provided to the user (101).

In one embodiment, if the returned price list includes one or more prices lower than the price at the retail location of the merchant, which would induce the user (101) to purchase the product elsewhere, the user (101) might purchase the product online from one of the ecommerce providers included in the search results using the mobile device (411), or leave the retail location of the merchant to buy the product from another local retailer identified the list. In one embodiment, the mobile device (411) is configured to allow the merchant at the retail location at which the user (101) is currently located to provide offers to retain the business of the user (101).

For example, if the user (101) decides (707) to purchase online via the mobile device (411) in accordance with the price information provided based on the scan of the UPC code and initiates (709) an online checkout process on the mobile device (411), the initiation of the checkout process on the mobile device (411) is configured to trigger the generation (711) of an offer (186) and the mobile device (411) is configured to present the offer (186) from the merchant of the retail location at which the user (101) is currently located. The offer (186) provides the customer with a better deal to retain the business of the user (101).

In one embodiment, an artificial intelligence (AI) engine is configured to use the transaction data (109) and analytics along with historical product barcode scan data of the user (101) to generate an attractive offer (186) for the user (101). For example, the offer (186) may indicate that "We know that you found this product online $10 cheaper but here is a 20% coupon on a minimum purchase of $100 which will give you a much better deal." The deal would also fluctuate based on the number and type of similar products the customer has scanned, which are used to calculate the degree of interest of the user (101) in the product, likelihood of the user (101) buying the products, etc.

Such an opportunity to present such an offer (186) is extremely valuable to retailers, and allows the retailers to practice multiple levels of price discrimination based on level and intensity of interest.

In one embodiment, the user (101) is given the opportunity to accept (715) the new offer (186) and check out (717) directly on the mobile device (411), or reject the offer (186). If the user (101) rejects the offer (186), the AI engine calculates the likelihood of the user (101) buying the product if the offer (186) is improved, taking into consideration merchant restrictions and limitations on what can be offered to determine whether (719) to provide a better offer (186). If a better offer (186) can be generated, the mobile device (411) is configured to present the improved offer (186) to the user (101); and the user (101) is prompted to take advantage of the improved deal.

In one embodiment, if the user (101) decides to leave the store, either abandoning the intent to shop or in order to purchase the item from a cheaper local retailer from the list generated by the barcode scanner, the mobile device (411) is configured to detect (713) the user (101) leaving a predetermined region containing the retail location of the merchant (e.g., as defined by a geo-fence defined as a virtual perimeter for a real-world geographic area of the merchant). If the mobile device (411) detects that the user (101) is leaving the premises of the merchant, the AI engine computes a sweetened offer (186) from the merchant to induce the user (101) to return to the store of the merchant. Alternatively or in combination, the offer (186) from a different merchant from the price list may be presented to steer the user (101) to their store to purchase the product.

Thus, in accordance with the offer rules specified by the merchants, the AI engine in one embodiment is configured to virtually represent the merchants to negotiate with the user (101) to form a deal via the mobile device (411), based on the reaction of the user (101) to the incrementally improved offers (186) presented by the AI engine. The AI engine is configured to include the best practices of deal negotiation, and determine the level and intensity of interest of the user (101) in one or more particular products, based the history of scanning activities and the history of purchases of the user (101), to formulate offers (186). The AI engine can thus be used to augment or replace human representatives to negotiate deals with users (101) at an individual level.

In one embodiment, the AI engine is integrated with the portal (143) or the transaction handler (103) to calculate offer redemption at the transaction terminal (105) (e.g., POS or online), if the user (101) decides to use the offer (186) generated by the AI engine.

In one embodiment, the portal (143) is configured with a control panel to allow the merchant to specify the offer rules (203) that can be used by the AI engine to generate automated offers (186) based on the user-driven triggering events, such as scanning a product, shopping online based on scanning results, walking out of the store perimeter, abandoning the shopping process, etc.

In one embodiment, the AI engine is configured to calculate the best offer for the user (101) based on the multiple competing offers from various merchants and use the mobile device (411) to present at least the best offer based on the offer rules (203) specified by the merchants.

In one embodiment, the AI engine is configured to optionally store the click-through history at the request of the user (101) (e.g., "do you want me to save this item for the future?"). The AI engine is configured in one embodiment to correlate the user scan activities with purchase activities to formulate offers (186). For example, after the AI engine determines that the user (101) bought a new TV and is now scanning for DVD players, the AI engine is configured to generate an offer of 20% off purchasing a DVD player with a sound system.

In one embodiment, the mobile device (411) is configured to determine the code representing the product from the digital image captured by the digital camera integrated within the mobile device (411). In one embodiment, the mobile device (411) is configured to transmit the digital image to the AI engine to determine the code and request the pricing information of the product represented by the code. The mobile device (411) is configured to present the offers from one or more merchants for the scanned product, or for products related to the scanned product (e.g., complementary to the scanned product or past purchases related to the current purchase intent of the user (101)).

In one embodiment, the AI engine is configured to determine the level of confidence in the user intent to purchase, and thus generate "tiered offers" based on the level of confidence. For example, a consumer who is already very likely to buy may not warrant as high a discount as a reluctant buyer.

Barcode scanning is a strong indicator of intent to purchase in real-time. Other indicators of purchase intent, such as user selection of items for storage in a wish list, current location of the user (101), etc., can be used to trigger actions by the AI engine, alternatively or in combination, to formulate or adjust relevant or pre-approved offers (e.g., discounts, deals, incentives, rebates, statement credits, reward points). The offers drive incremental merchant transactions and provide a convenient, customized shopping experience for the users (101).

In one embodiment, the mobile device (411) includes a digital wallet, which allows the user (101) to make payments via transactions using accounts (146) processed via the transaction handler (103) and/or payments not processed via the transaction handler (103). In one embodiment, the mobile device (411) is configured to report the transactions not processed by the transaction handler (103) to the portal (143) and store the respective transaction records in the data warehouse (149) for the AI engine, the correlator (117), the profile generator (121), etc.

In one embodiment, the AI engine is configured to formulate offers (186) based on current browsing/shopping data, which can be taken from a number of sources, such as barcode scanning, information of items stored in a wish list that is indicative of the user purchase intent, geolocation of the user (101) as determined by the mobile device (411) carried by the user (101), etc.

Details about the system in one embodiment are provided in the sections entitled "SYSTEM," "CENTRALIZED DATA WAREHOUSE" and "HARDWARE."

In one embodiment, the mobile device (411) is configured to have at least some of the functionalities of the in-person one-tap purchasing apparatus (IPOT) described in the following section entitled "IPOT." However, it is not necessary to complete the purchase in "one-tap." In one embodiment, the "one-tap" configuration is modified to allow the user (101) to interact with offers (186) generated by the AI engine.

In one embodiment, the mobile device (411) is configured to be used in SHOPPING PROXIMITY REVISALS apparatuses, methods and systems that transform available user's position data into sale offers to the user. Details about SHOPPING PROXIMITY REVISALS apparatuses, methods and systems are provided in the section entitled "SHOPPING PROXIMITY REVISALS".

IPOT

In-Person One-Tap purchasing apparatuses (hereinafter "IPOT") transform product code snapshots, via IPOT components, into real-time offer-driven electronic purchase transaction notifications.

Figure 14:
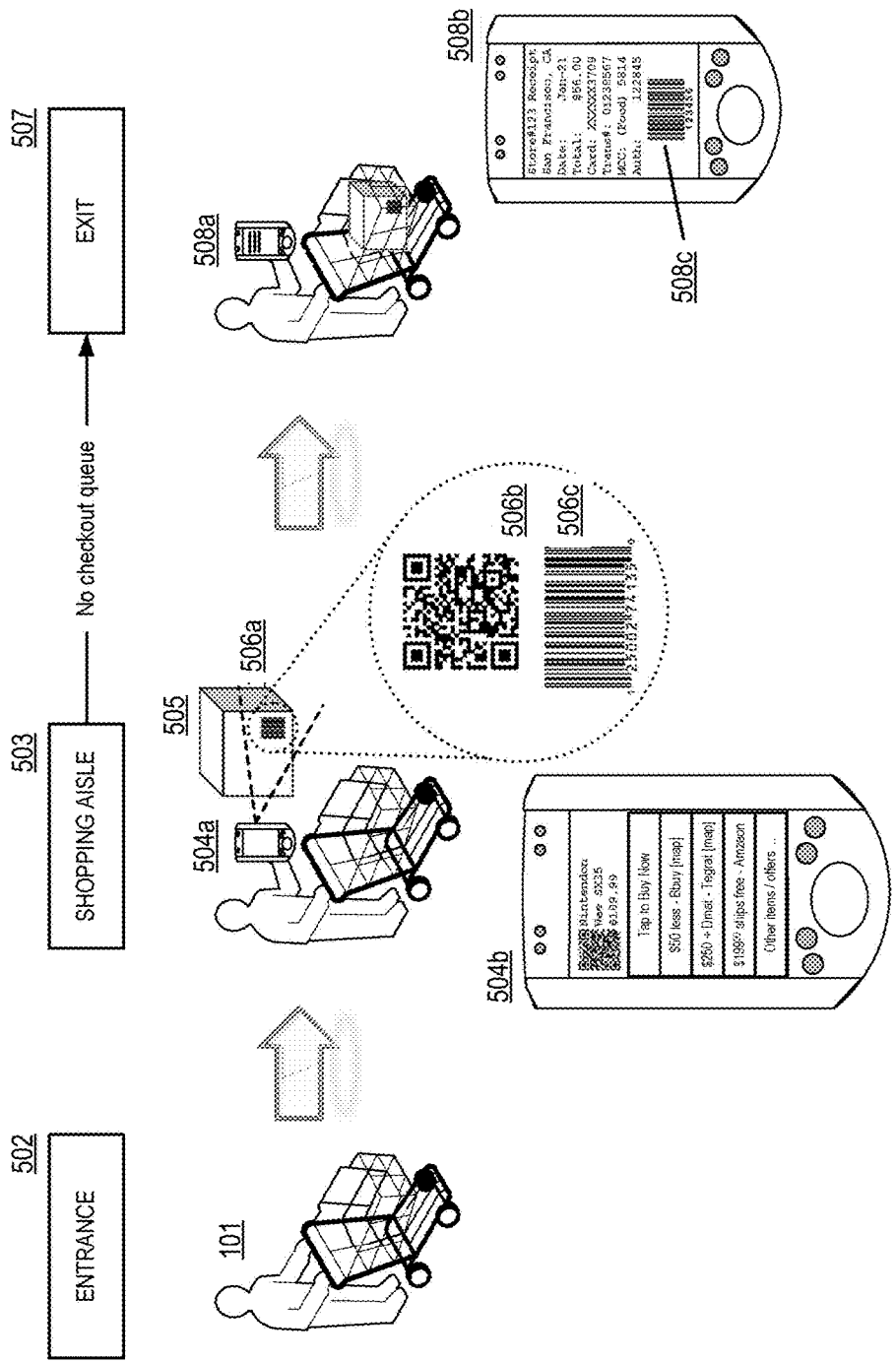
FIG. 14 shows a block diagram illustrating example aspects of in-person one-tap purchasing according to one embodiment.

FIG. 14 shows a block diagram illustrating example aspects of in-person one-tap purchasing in some embodiments of the IPOT. In some embodiments, a user (e.g., 101) may desire to purchase products, services and/or other offerings (products) in-person. The user may enter (e.g., 502), into a store, warehouse, etc. to purchase a product. The user may inspect products available at the store in person (e.g., 503), and may desire to learn more about a product (e.g., 505). The user may, in some embodiments, utilize a client device (e.g., 504a). In some embodiments, the user may utilize the client device to obtain information about the product. For example, the user may capture information about a product identification (506a) (e.g., barcode (506c), RFID, QR code (506b), etc.) associated with the product. For example, the user may obtain an image, a video, a live stream, etc. of the product identification associated with the product. In some embodiments, the client device may provide the obtained information to the IPOT. For example, the client device may send a server within the IPOT a (Secure) HyperText Transfer Protocol (HTTP(S)) POST/GET message, electronic mail message, Short Messaging Service (SMS) message, HTTP/Real Time Streaming Protocol (RTSP) video stream, etc., including the captured information about the product identification associated with the product.

In one embodiment, the IPOT server may utilize the capture information about the product identification associated with the product to identify the product that the user desires to learn about. For example, the IPOT may parse the message provided by the client device, and extract the product identification information based on the parsing. Example parsers that the IPOT server may utilize are described below in the discussion with reference to FIG. 8. The IPOT server may access a database, and search for product offers to provide to the user based on the product identification information extracted from the message from the client device. For example, the IPOT server may utilize a Hypertext Preprocessor (PHP) script to issue Structured Query Language (SQL) commands to query a relational database for product offers to provide to the user. For example, the database may have stored information on various merchants, merchant locations, offers, discounts, coupons, advertisements, and/or the like, which may be provided to the user. In one embodiment, the IPOT server may utilize the location of the client device (e.g., using Global Position System (GPS) location data), as well as the product identification information to query the database for product offers to provide to the user.

In one embodiment, the IPOT server may provide the results obtained from the database to the client device (e.g., 504b). For example, the client device may be executing an application module (app), via which the client device may communicate with the IPOT server. The client device may display the obtained results from the IPOT server to the user via the app. In one embodiment, the app may provide the user with an option to buy the product on the spot by performing a single action (e.g., tap, swipe touch screen of a mobile device, press a key on a keyboard, perform a single mouse click, etc.). In one embodiment, the app may provide the user with various alternate options. For example, the app may provide the user with alternate merchants where the user may obtain the product and/or similar products, alternate products that may be comparable to the product, competitive pricing information between merchants, discounts, coupons, and/or other offers for the user, etc. In one embodiment, the app may indicate that the user may earn rewards points if the user purchases the product at another merchant. In one embodiment, the app may indicate that the user may be required to use fewer rewards points to pay for the purchase transaction if the user purchases the product at another merchant, because the other merchant may have a better relationship with the rewards points provider. In one embodiment, the app may indicate that the user may earn more rewards points if the user uses a specific (or alternative) card to pay for the purchase transaction. In one embodiment, the app may indicate that the user may obtain a greater amount of cash back if the user purchases the product at an alternate merchant and/or using an alternate card. In various embodiments, offers to the user including and similar to those described herein may originate from various entities and/or IPOT components, including but not limited to: merchants, pay networks, card issuers, acquirers, and/or the like.

In one embodiment, the user may buy the product on the spot from the current merchant and/or other merchant(s) by performing the single action on the client device (e.g., one tap of a touchscreen of the user device). In such embodiments, the IPOT server may initiate a card-based purchase transaction using a card (e.g., credit card, debit card, prepaid card, etc.) associated with the client device and/or the user. For example, the app may allow the user to select a card from a virtual wallet of the user to utilize for the purchase transaction. In one embodiment, the IPOT may be able to arbitrage credit card payment networks in that a merchant, card issuer, acquirer, pay network, and/or the like entities and/or IPOT components may switch how payments for the user are processed because of transaction cost considerations.

In one embodiment, the IPOT may initiate the card-based purchase transaction, and may generate a purchase confirmation receipt for the user. The IPOT server may provide the purchase confirmation receipt to the client device (e.g., 508b). In one embodiment, the user may desire to exit the store after purchasing a product via the app. In such embodiments, the user may be required to provide proof of purchase of the product at the exit of the store. The user may utilize the purchase confirmation receipt obtained from the IPOT server via the app on the client device to provide such proof of product purchase (e.g., 508*a*). For example, the receipt may include a purchase identifier (e.g., 508*c*). For example, the purchase identifier may include a barcode, a QR code, an image of a receipt, a video of a purchase action, etc. The user may utilize such confirmations of the purchase as proof at the exit of the store. Accordingly, in one embodiment, the user may skip a checkout line at the store altogether and gain efficiency in the shopping experience.

Figure 15A:
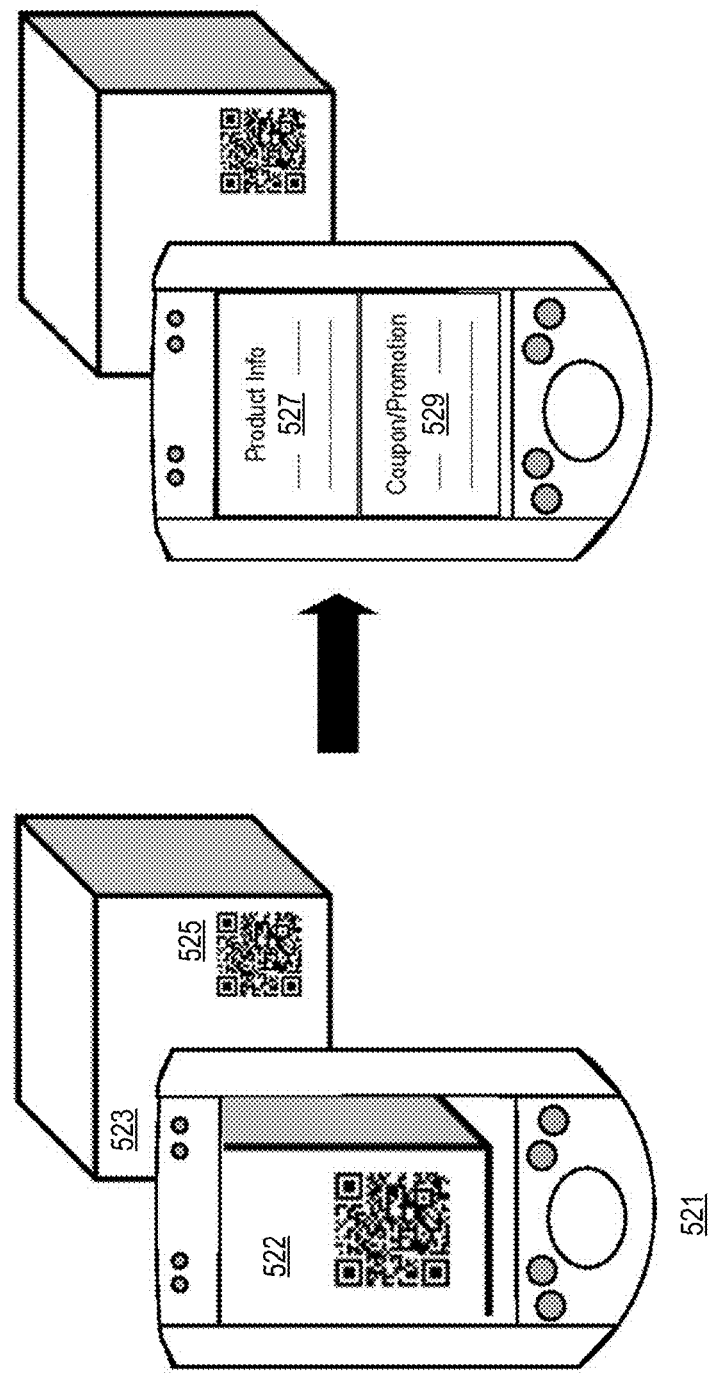
FIGS. 15a-15b show block diagrams illustrating example aspects of an in-person mobile purchasing application according to one embodiment.
Figure 15B:
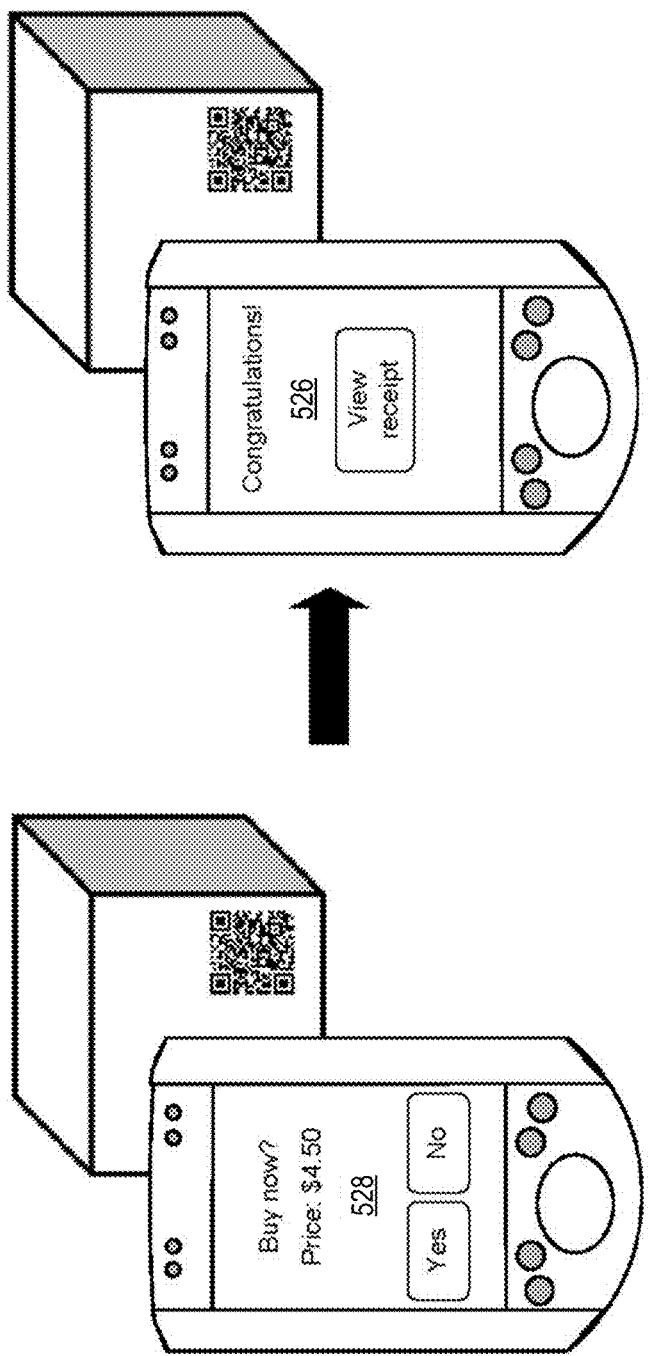

FIGS. 15*a*-15*b* show block diagrams illustrating example aspects of an in-person mobile purchasing app in some embodiments of the IPOT. In one embodiment, the IPOT may transform product identification information about a product via various IPOT components into consumer-friendly product offer information and enable one-tap product purchases. For example, the IPOT may obtain information (e.g., 522) about a product (523) via a product identifier (e.g., 525). The IPOT may transform this product identifier information into detailed product information (e.g., 527) for the user, as well as coupons, promotions, advertisements, etc. (e.g., 529). In one embodiment, the IPOT may provide pricing information on the product and/or related and/or similar products (e.g., 528), and may provide the user (101) with an option to purchase the product on the spot and/or at competing merchants. In one embodiment, the IPOT may provide (e.g., 526) proof of purchase for the user, so the user can provide proof of purchase should it become necessary.

FIG. 16*a*-16*d* show application user interface diagrams illustrating example features of a one-tap mobile app in some embodiments of the IPOT. In one embodiment, the app may be configured to recognize product identifiers (e.g., barcodes, QR codes, etc.). In one embodiment, the user may be required to sign in to the app to enable its features. Once enabled, a camera may provide in-person one tap purchasing features for the user. For example, the client device may have a camera via which the app may acquire images, video data, streaming live video, and/or the like (e.g., 533). The app may be configured to analyze the incoming data, and search (e.g., 531) for a product identifier (e.g., 534). In one embodiment, the app may overlay cross-hairs, target box, and/or like alignment reference markers (e.g., 305), so that a user may align the product identifier using the reference markers to facilitate product identifier recognition and interpretation. In one embodiment, the app may include interface elements to allow the user to switch back and forth between the product identification mode and the product offer interface display screens (e.g., 536), so that a user may accurately study the deals available to the user before capturing a product identifier. In one embodiment, the app may provide the user with the ability to view prior product identifier captures (e.g., 537) so that the user may be able to better decide which product identifier the user desires to capture. In one embodiment, the user may desire to cancel product purchasing; the app may provide the user with a user interface element (e.g., 538) to cancel the product identifier recognition procedure and return to the prior interface screen the user was utilizing. In one embodiment, the user may be provided with information about products, user settings, merchants, offers, etc. in list form (e.g., 539) so that the user may better understand the user's purchasing options. Various other features may be provided for in the app (e.g., 540).

In one embodiment, the app executing on the client device of the user may include an app interface providing various features for the user. In one embodiment, the app may include an indication of the location (e.g., name of the merchant store, geographical location, information about the aisle within the merchant store, etc.) of the user (e.g., 541). The app may provide an indication of a pay amount due for the purchase of the product (e.g., 542). In one embodiment, the app may provide various options for the user to pay the amount for purchasing the product(s). For example, the app may utilize the GPS coordinates to determine the merchant store within which the user is present, and direct the user to a website of the merchant. In one embodiment, the IPOT may provide an API directly to participating merchants to facilitate transaction processing. In some embodiments, a merchant-branded IPOT application is developed with the IPOT functionality, which may directly connect the user into the merchant's transaction processing system. For example, the user may choose from a number of cards (e.g., credit cards, debit cards, prepaid cards, etc.) from various card providers (e.g., 543). In one embodiment, the app may provide the user the option to pay the purchase amount using funds included in a bank account of the user, e.g., a checking, savings, money market, current account, etc. (e.g., 544). In one embodiment, the user may have set default options for which card, bank account, etc. to use for the purchase transactions made via the app. In one embodiment, such setting of default options may allow the user to initiate the purchase transaction via a single click, tap, swipe, and/or other minimal user input action (e.g., 545). In one embodiment, when the user utilizes such an option, the app may utilize the default settings of the user to initiate the purchase transaction. In one embodiment, the app may allow the user to utilize other accounts (e.g., Google™ Checkout, Paypal™ account, etc.) to pay for the purchase transaction (e.g., 546). In one embodiment, the app may allow the user to utilize rewards points, airline miles, hotel points, electronic coupons, printed coupons (e.g., by capturing the printed coupons similar to the product identifier) etc., to pay for the purchase transaction (e.g., 547-548). In one embodiment, the app may provide an option to provide express authorization before initiating the purchase transaction (e.g., 549). In one embodiment, the app may provide a progress indicator to provide indication on the progress of the transaction after the user has selected an option to initiate the purchase transaction (e.g., 550). In one embodiment, the app may provide the user with historical information on the user's prior purchases made via the app (e.g., 321). In one embodiment, the app may provide the user with an option to share information about the purchase (e.g., via email, SMS, wall posting on Facebook®, tweet on Twitter™, etc.) with other users (e.g., 552). In one embodiment, the app may provide the user with an option to display the product identification information captured by the client device (e.g., in order to show the product information to a customer service representative at the exit of a store) (e.g., 554). In one embodiment, the user, app, client device and or IPOT may encounter an error in the processing. In such scenarios, the user may be able to chat with a customer service representative (e.g., via VerifyChat 553) to resolve the difficulties in the purchase transaction procedure.

For example, in one embodiment, the "VerifyChat" feature may be utilized for fraud prevention. For example, the IPOT may detect an unusual and/or suspicious transaction. The IPOT may utilize the VerifyChat feature to communicate with the user, and verify the authenticity of the originator of the purchase transaction. In various embodiments, the IPOT may use electronic mail messages, text (SMS) messages, Facebook® messages, Twitter™ tweets, text chat, voice chat, video chat (e.g., Apple FaceTime), and/or the like to communicate with the user. For example, the IPOT may initiate a video challenge for the user (e.g., 555). For example, the user may need to present him/her-self via a video chat (e.g., 556). In some embodiments, a customer service representative (e.g., agent 558b) may manually determine the authenticity of the user using the video of the user. In one embodiment, the IPOT may utilize face, biometric and/or like recognition (e.g., using pattern classification techniques) to determine the identity of the user (e.g., 558a). In one embodiment, the app may provide a reference marker (e.g., cross-hairs, target box, etc.) (e.g., 557) so that the user may use the video to facilitate the IPOT's automated recognition of the user. In one embodiment, the user may not have initiated the transaction, e.g., the transaction is fraudulent. In such embodiments, the user may cancel (e.g., 559) the challenge. The IPOT may then cancel the transaction, and/or initiate fraud investigation procedures on behalf of the user.

In one embodiment, the user may select to conduct the transaction using a one-time anonymized credit card number (e.g., 545b). In such embodiments, the app may automatically set the user profile settings such that any personal identifying information of the user will not be provided to the merchant and/or other entities. In one embodiment, the user may be required to enter a user name and password to enable the one-time anonymization feature.

In one embodiment, the IPOT may utilize a text challenge procedure to verify the authenticity of the user (e.g., 560). For example, the IPOT may communicate with the user via text chat, SMS messages, electronic mail, Facebook® messages, Twitter™ tweets, and/or the like. The IPOT may pose a challenge question (e.g., 562) for the user. The app may provide a user input interface element(s) (e.g., virtual keyboard 563) to answer the challenge question posed by the IPOT. In one embodiment, the challenge question may be randomly selected by the IPOT automatically; in one embodiment, a customer service representative may manually communicate with the user. In one embodiment, the user may not have initiated the transaction, e.g., the transaction is fraudulent. In such embodiments, the user may cancel (e.g., 561) the text challenge. The IPOT may then cancel the transaction, and/or initiate fraud investigation procedures on behalf of the user.

Figure 16A:
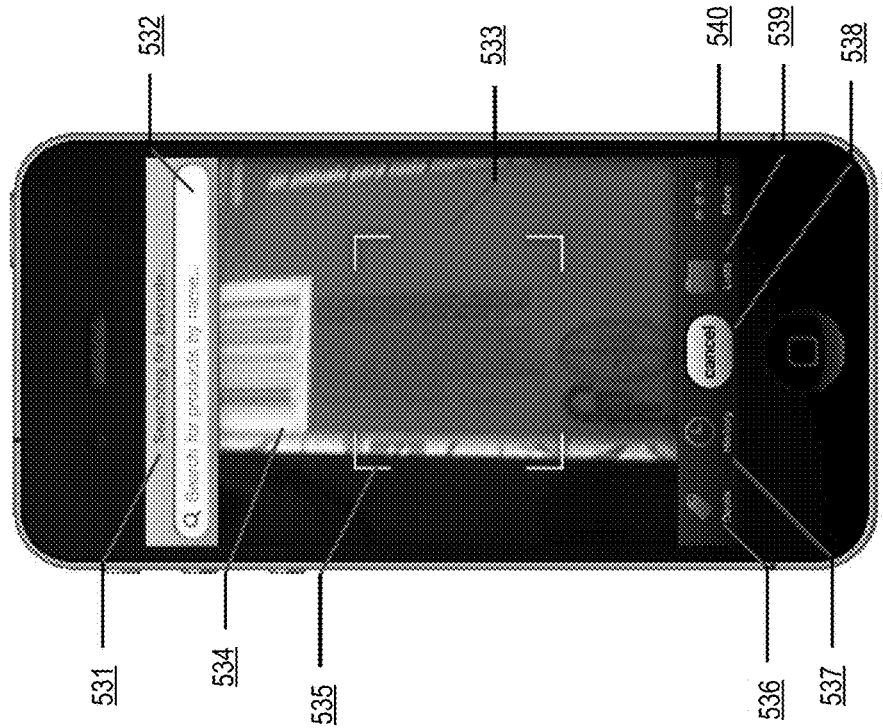
Figure 16B:
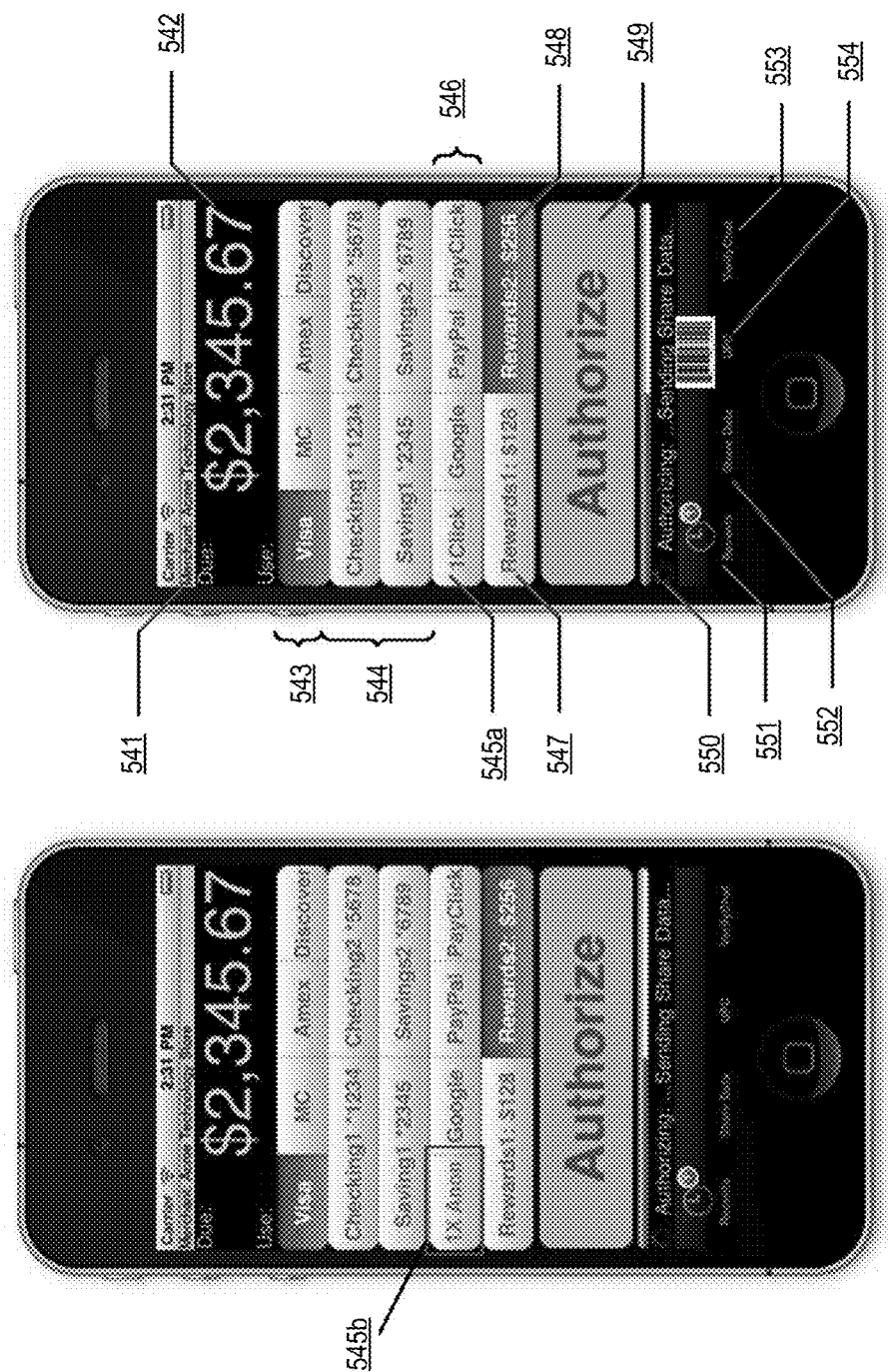
Figure 16D:
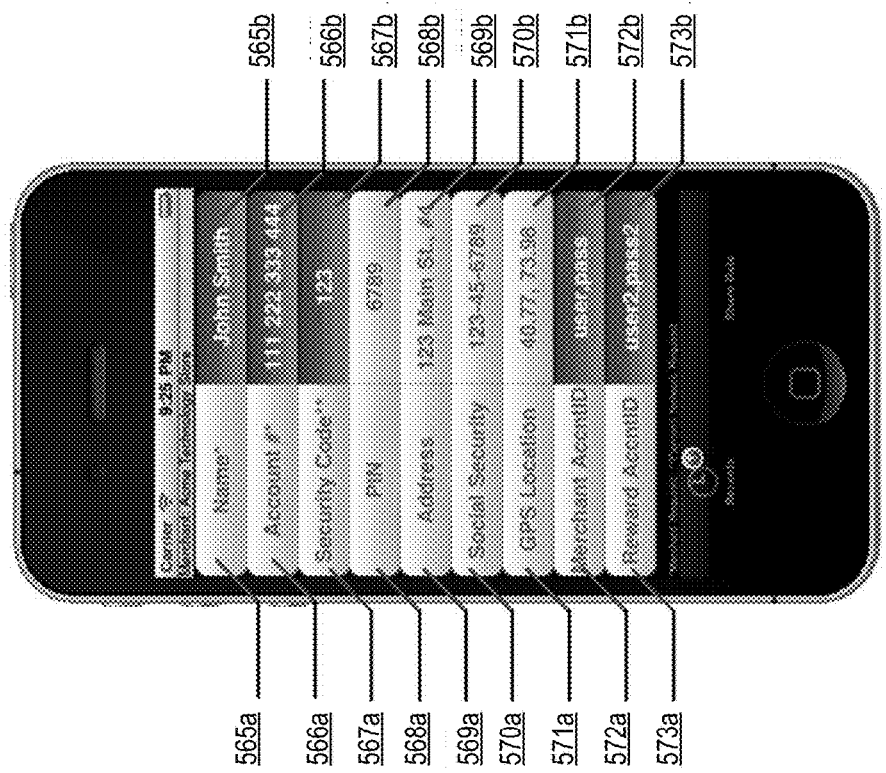

In one embodiment, the user may be able to view and/or modify the user profile and/or settings of the user, e.g., by activating a user interface element (e.g., 538) (see FIG. 16a). For example, the user may be able to view/modify a user name (e.g., 565a-b), account number (e.g., 566a-b), user security access code (e.g., 567a-b), user pin (e.g., 568a-b), user address (e.g., 569a-b), social security number associated with the user (e.g., 570a-b), current device GPS location (e.g., 571a-b), user account of the merchant in whose store the user is currently present (e.g., 572a-b), the user's rewards accounts (e.g., 573a-b), and/or the like. In one embodiment, the user may be able to select which of the data fields and their associated values should be transmitted to facilitate the purchase transaction. For example, in the example illustration in FIG. 16d, the user has selected the values in the name (565a), account number (566a), security code (567a), merchant account ID (572a) and reward account ID (573a) fields to be sent as part of the notification to process the purchase transaction. In one embodiment, the user may toggle the fields and/or data values that are sent as part of the notification to process the purchase transactions. In one embodiment, the app may provide multiple screens of data fields and/or associated values stored for the user to select as part of the purchase order transmission. In one embodiment, the app may provide the IPOT with the GPS location of the user. Based on the GPS location of the user, the IPOT may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to a doctor's office and desire to pay the co-payment for the doctor's appointment. In addition to basic transactional information such as account number and name, the app may provide the user with the ability to transfer medical records and/or health information, which may be provided to the medical provider and/or the user's insurance company, as well as to the transaction processor to reconcile payments between the parties. In one embodiment, the records may be sent in a Health Insurance Portability and Accountability Act (HIPAA)-compliant data format and encrypted, and only the recipients who are authorized to view such records may have appropriate decryption keys to decrypt and view the private user information.

Figure 17:
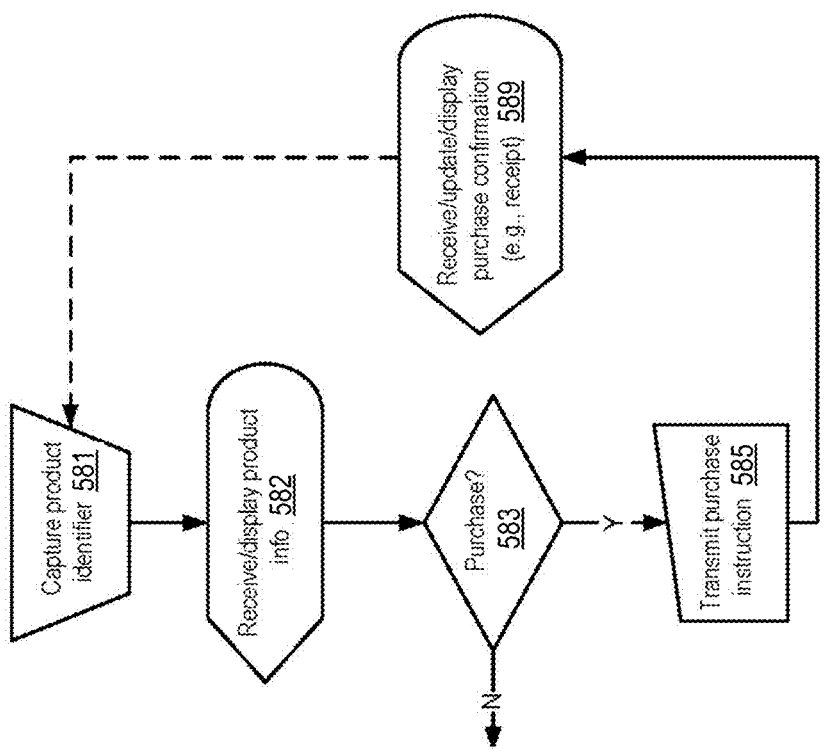
FIG. 17 shows a logic flow diagram illustrating example aspects of conducting a mobile product purchase transaction according to one embodiment.

FIG. 17 shows a logic flow diagram illustrating example aspects of conducting a mobile product purchase transaction in some embodiments of the IPOT, e.g., a Mobile Product Purchase Transaction (mPPT) component. In one embodiment, the IPOT may capture (581) a product identifier. The IPOT may receive (582) product information about the product and display the product information for the user. The IPOT may provide the user with an option to purchase the product based on one or more of the offers the IPOT provides to the user. If the user chooses to purchase the product (583), the IPOT may transmit (585) purchase instructions to other components and/or entities (e.g., merchant, card issuer, merchant's acquirer, and/or the like). In one embodiment, the IPOT may receive (589) an updated (e.g., if the user is modifying a prior purchase) purchase confirmation receipt, and may display the obtained purchase confirmation receipt for the user.

Figure 18:
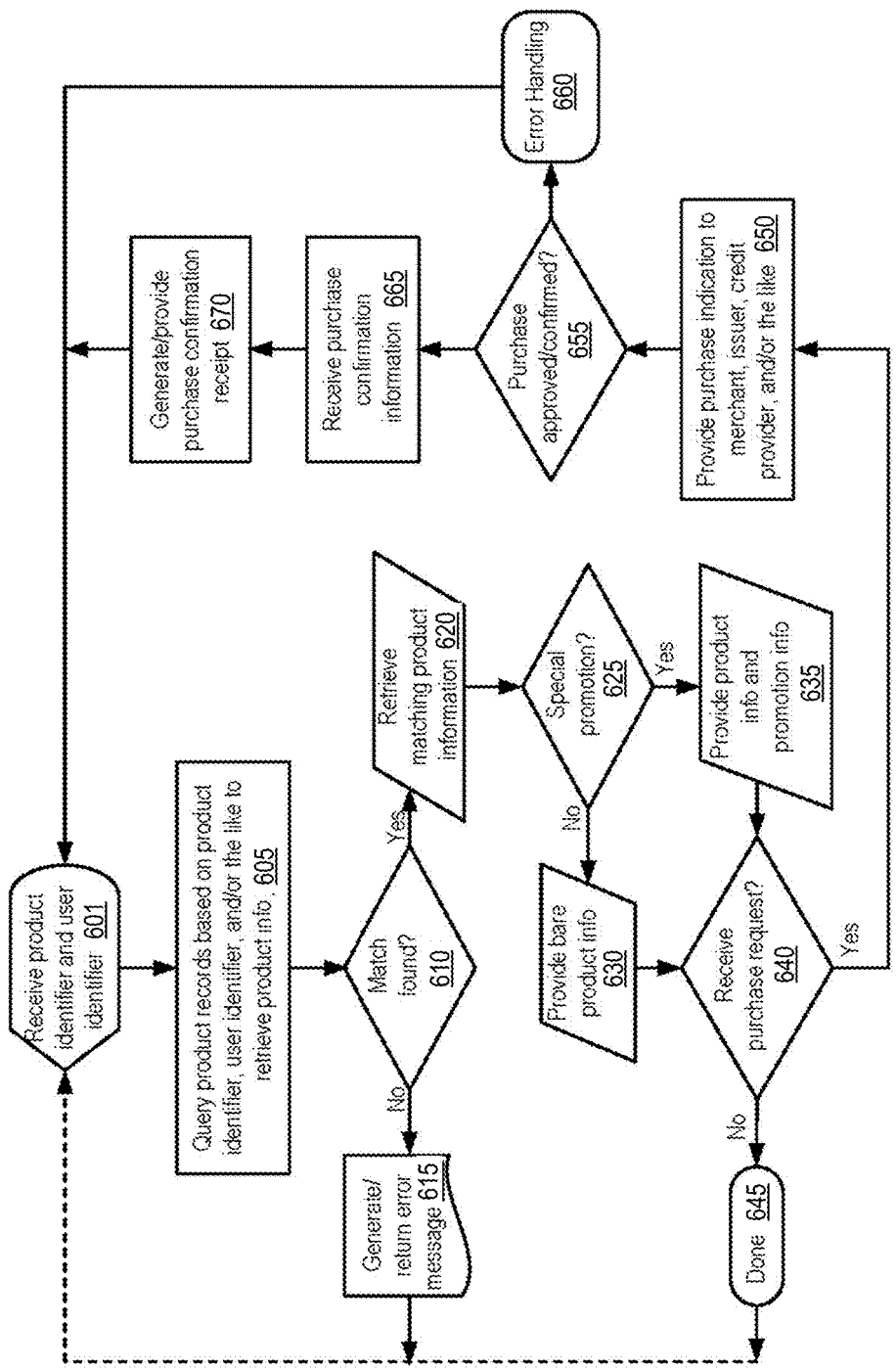
FIG. 18 shows a logic flow diagram illustrating example aspects of selecting purchase options for a mobile product purchase transaction according to one embodiment.

FIG. 18 shows a logic flow diagram illustrating example aspects of selecting purchase options for a mobile product purchase transaction in some embodiments of the IPOT, e.g., a Purchase Options Selection (POS) component. In one embodiment, the IPOT may receive (601) a product identifier from a client device, as well as client and/or user identifiers. The IPOT may query (605) a product records database for product information based on the product identifier and/or the client identifier and/or the user identifier. If the IPOT does not find a match for the product in the database (e.g., 610), the IPOT may generate and return (615) an error message and initiate error handling procedures. If the IPOT finds a match (e.g., 610), for the product in the product records database, the IPOT may retrieve (620) product information corresponding to the product from the database. The IPOT may determine (625), based on the information obtained from the database, whether any special promotions are available for the product. If there are no special promotions available, the IPOT may provide (630) the bare product information for the user. If there are special promotions available, the IPOT may provide (635) the product information as well as the promotional information for the user. In one embodiment, the IPOT may receive a purchase request from the user. If the IPOT receives (640) a purchase request from the user, the IPOT may provide a purchase indication to a merchant, issuing bank, acquirer bank and/or other entities for processing of the purchase transaction. The IPOT may obtain a notification regarding the purchase from the entities to which the IPOT provided the purchase indication. If the purchase is not approved (e.g., 655), the IPOT may initiate (660) error handling procedures. If the purchase is approved (e.g., 655), the IPOT may receive (665) the purchase confirmation information, generate (670) a purchase confirmation receipt, and provide the purchase confirmation receipt for the user.

Shopping Proximity Revisals

In one embodiment, SHOPPING PROXIMITY REVISALS APPARATUSES, METHODS AND SYSTEMS ("SHOPPING PROXIMITY REVISALS") transform available user's position data via SHOPPING PROXIMITY REVISALS components into sale offers to the user. The SHOPPING PROXIMITY REVISALS include identifying a first client in proximity of a first merchant location, retrieving a first client shopping profile associated with the identified first client and first merchant offer targeting information associated with the first merchant location, updating the first client shopping profile with data describing actions of the first client, determining a parting position of the first client, identifying at least one parting offer of interest for the first client based on the first client shopping profile and the first merchant offer targeting information, and notifying the at least one parting offer to the first client.

Figure 20:
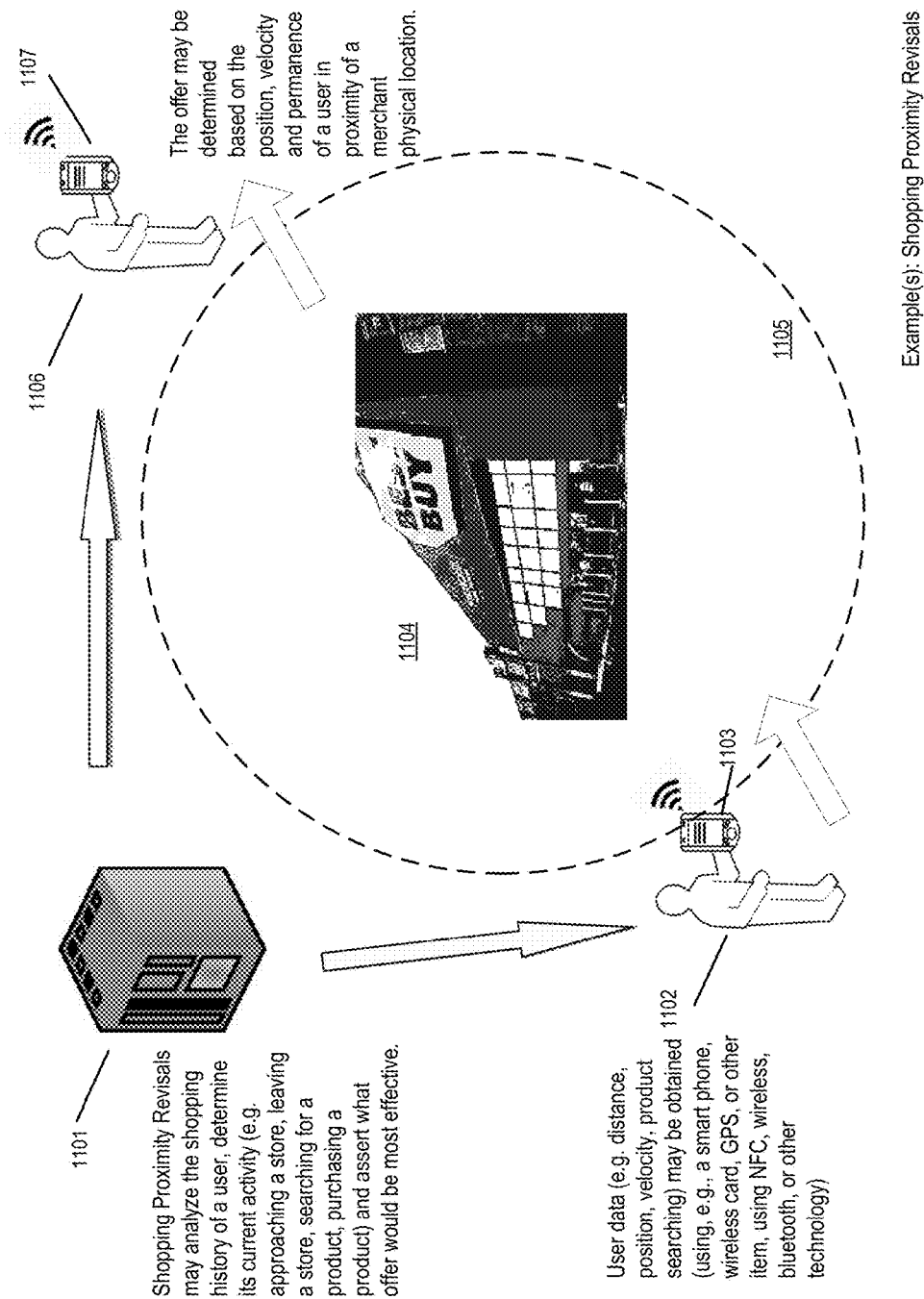
FIGS. 20-21 example aspects of some embodiments of the SHOPPING PROXIMITY REVISALS determining an offer for a user entering or exiting the proximity of a merchant location.

FIG. 20 shows examples of the SHOPPING PROXIMITY REVISALS (1101) detecting the presence of user (1102) in the proximity (1105) of merchant (1104) through the user's user device (1103), such as the point of interaction (107), account identification device (141), or the mobile device (411). User device (1103) may be a smartphone, laptop, PDA, GPS device, a computer or the like. Proximity (1105) may comprise the physical premises of a merchant location, an area within a radius around the merchant location, a space reached by RF signals from radio devices the merchant location or an arbitrary space around the merchant location, for example defined as a "geo-fence". SHOPPING PROXIMITY REVISALS may acquire the position of a user through data provided by the user's user device. In some embodiments, the collected data may include current position, previous positions, speed and time. These may be determined by the user's user device through a variety of methods and systems, including GPS systems, triangulation via a cell phone, RF communication with wi-fi devices, RF communication with RF enabled devices at known locations, input from the user, and more.

In some embodiments, proximity offer generator and user device may communicate via a communication protocol, such as, but not limited to: Wi-Fi, Bluetooth, cellular network, SMS, email or like communication protocols. For example, the proximity offer generator may direct the user to initiate a plug-in on its system to provide an alternate communication service, and transmit the data to the user's device via the communication service.

Once SHOPPING PROXIMITY REVISALS has determined that user (1102) has entered the proximity (1105) of a merchant location (1104), SHOPPING PROXIMITY REVISALS may analyze various data about the user stored in the user shopping profile of user (1102) and may also consider other data such as market data, demographic data and statistical information, as available. SHOPPING PROXIMITY REVISALS may also retrieve data and settings from the merchant offer targeting information for determining the details of the offer and the type(s) of customers that the merchant wants to target.

A user shopping profile may include data representing the user's shopping habits, history, finances, social relations, and interests and may include data from previous transactions, online searches for offers, products or services, frequency and length of visits to merchants, comments and activity on specialized websites, social media and shopping websites, wish lists, previous offers and associated answers, user's presence on social media, user's influence on others, user's tendency to publicize purchases, user's preferences and attitude towards online gaming, and more.

Merchant offer targeting information may comprise information such as the maximum discount for each particular product on sale, the list of products on sale, a ranking of the products to be promoted, parameters for bundling different products in an offer, inventory, orders and deliveries, the offer terms and ranges for each term and how to determine a value for each term, the weight to be given to the parameters in a user shopping profile for determining the details of an offer, the groups of users to target, the demographic groups to target, and more. Merchants may also be allowed to input their preferences and settings directly into the SHOPPING PROXIMITY REVISALS, for example through a dedicated web page.

Based on the analysis of a user shopping profile, merchant offer targeting information and more data if desired, SHOPPING PROXIMITY REVISALS may determine a customized offer for the user according to the merchant offer targeting information.

In another example, when user (1106) is leaving proximity (1105), SHOPPING PROXIMITY REVISALS may be triggered by the data sent from user's user device (1107) indicating that the user is leaving the proximity and SHOPPING PROXIMITY REVISALS may determine a parting offer(s) to the user for bringing him/her back to the merchant location and make a purchase.

SHOPPING PROXIMITY REVISALS may also collect data related to the shopping activities of a user, for example what barcodes or labels a user scans for obtaining information on products or services, or what online searches a user does for reviews or prices, or how frequently a user visits merchants, how long it remains, which departments are visited, and what transactions the user does. The data may be collected by SHOPPING PROXIMITY REVISALS and stored in a users database, updating a user shopping profile for calculating future offers to user, or may be accessed if available in another database.

Figure 21:
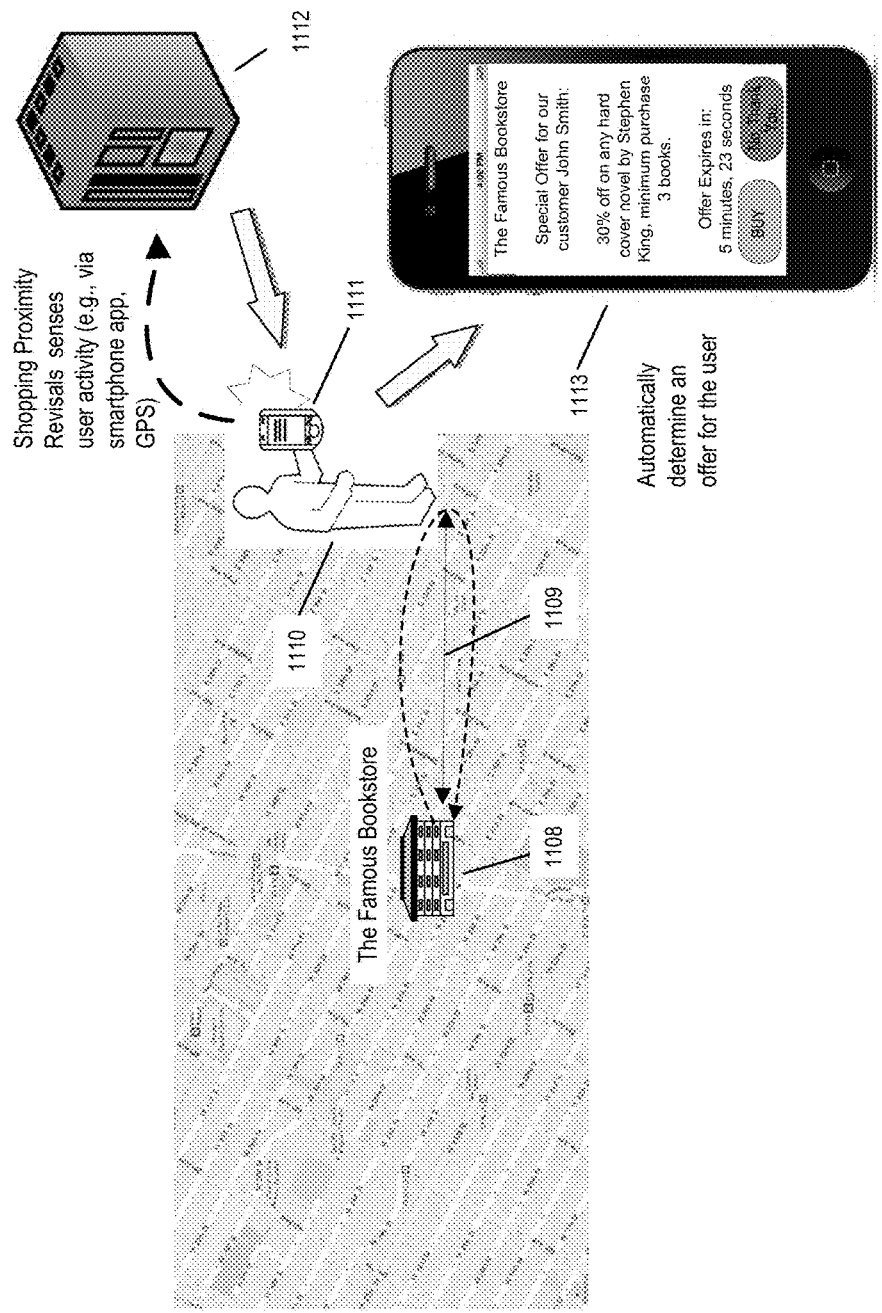

FIG. 21 shows examples of the SHOPPING PROXIMITY REVISALS (1112) receiving parting user (1110) data through user device (1111), and determining an offer(s) for user.

There are many ways SHOPPING PROXIMITY REVISALS may determine if an offer(s) is to be made and may define the details of the offer(s). For example, the further away a user is, the more discount may be offered. In another example, if the velocity of user (1110) leaving the proximity is low, it may indicate that user is walking, and an offer(s) should be triggered at a shorter distance from merchant's location than if user was detected driving a car. In some embodiments, if the parting velocity is high, as if the user was on a vehicle, the offer(s) may be delayed and conditioned to user reaching a certain distance or a minimum speed, so not to endanger the user if driving. In another example, SHOPPING PROXIMITY REVISALS may determine that user is approaching a competitor merchant, and may determine to make the offer(s) before the user reaches the competitor. In another example, if the altitude of a user is high above ground and there is an elevated train line within proximity, it may indicate that the user is traveling on the train and SHOPPING PROXIMITY REVISALS may determine that an offer(s) would be ineffective. In some embodiments, if collected data show a user may be visiting a category of stores at an unusually high frequency and spending a relatively long time in there, SHOPPING PROXIMITY REVISALS may determine a risen interest of the user for a particular type of products and generate one or more offers accordingly. In some embodiments, if collected data show that a user normally refuses the first offer(s) but accepts the second, SHOPPING PROXIMITY REVISALS may determine to tune the offers in order to maximize the profit for merchant.

In some embodiments, SHOPPING PROXIMITY REVISALS may determine a true interest value, which may consist of one or more parameters, and may represent the interest of a user towards a product or a service, or a group of products and services. A true interest value may be determined by a true interest algorithm. SHOPPING PROXIMITY REVISALS may use the true interest value of a user for fine tuning the details and terms of an offer to user. For example, if true interest value is defined as proportional to the interest of a user for a product, and the true interest of a first user for a product is determined to be high, the discount in an offer on that product for the first user may be lower than an offer on the same product for a second user with a lower true interest value for the same product. In another example, if it is determined that a user is more interested in the quality of a products rather than in its price, SHOPPING PROXIMITY REVISALS may offer an alternative product of higher quality.

An embodiment of an offer message generated by SHOPPING PROXIMITY REVISALS is shown in (1113). Some embodiments may comprise the name and address of the merchant making the offer, the name of the target user and if the offer may be transferred, shared or negotiated, a description of the offer, details about the terms of the offer such as, for example, expiration time, minimum quantities, restrictions to a particular product, group of products, brands, or makers. Some embodiment may show if the product(s) is in stock or when it will be, if the offer is only for in-store pick up or it is valid also for delivery, and more. Some embodiments may also include features for user to interact with SHOPPING PROXIMITY REVISALS by accepting, rejecting or negotiating the offer.

An embodiment of SHOPPING PROXIMITY REVISALS may comprise gaming options, for example an interactive online game in which the user has the opportunity to win a better offer, or the possibility of sharing the offer with a number of friends. Some embodiments may also include options to publicize the offer or the purchase, for example by posting it on social media web sites or by emailing it to friends.

Figure 22:
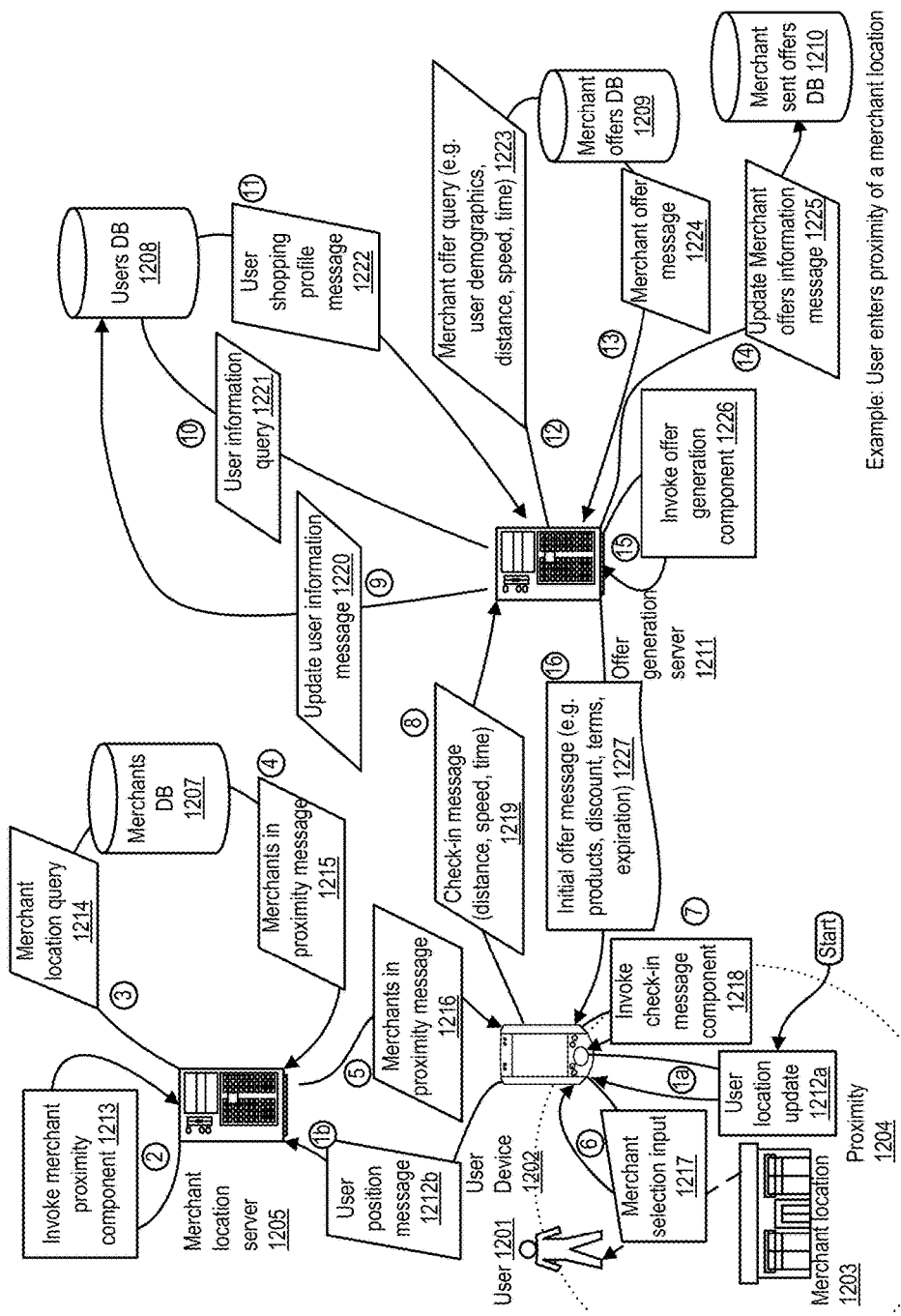
FIGS. 22-23 show a data flow diagram illustrating examples of the SHOPPING PROXIMITY REVISALS determining an offer for a user entering or exiting the proximity of a merchant location.

FIG. 22 shows a data flow diagram illustrating an example of transforming user data via a SHOPPING PROXIMITY REVISALS into an initial offer to user. In this example user (1201) enters merchant location proximity (1204) of merchant location (1203). User device (1202) may be able to determine user position through element user location update (1212a), or the merchant may be able to detect user's position, or user may input its location and other data. User device may communicate the information, including user position, to merchant location server (1205) in element user position message (1212b). Below is an example HTTP(S) POST user position message (1212b) substantially in the form of an XML-formatted message:

```
POST /checkin_info.php HTTP/1.1
Host: www.SPR.com
Content-Type: Application/XML
Content-Length: 788
<?XML version = "1.0" encoding = "UTF-8"?>
<user_position_message>
```

-continued

```
<checkin_ID>CNI4ICNW2</checkin_ID >
<user_ID>john.q.public@gmail.com</user_ID>
<password>supersecret<password>
<client_details>
<client_IP>192.168.23.126</client_IP>
<client_type>smartphone</client_type>
<client_model>HTC Hero</client_model>
<OS>Android 2.2</OS>
<app_installed_flag>true</app_installed_flag>
</client_details>
<user_info>
<user_ID>1234abc6789</user_ID>
<account_name>John Q. Public</account_name>
<user_position>40.7697° N, 73.9735° W</user_position>
<user_speed>0.2 mph</user_speed>
<user_altitude>10.3 ft</user_altitude>
<timestamp>12/25/2012_12.34.21</timestamp>
</user_info>
</user_position_message>
```

Merchant location server (1205) may determine which merchants may make offers to user by determining in which merchant location proximities the user is. For example, if user is inside a shopping mall with several merchants, user might be determined to be in the proximity of more than one merchant. Merchant location server (1205) may invoke merchant proximity component (1213). Component (1213) may compare user location with the proximity definitions of the merchants in merchants database (1207). Merchants database (1207) may hold the definitions of the proximity space for merchant locations. Merchant location query (1214) may carry data related to the user location information. Below is an example of merchant location query (1214) substantially in the form of a PHP/SQL query:

```
<?PHP
  header('Content-Type: text/plain');
  mysql_connect("254.93.179.112",$DBserver,$password); //
access database server
  mysql_select("SPR_DB.SQL"); // select database table to
search
  //create query
  $query = "SELECT merchant_name merchant_ID
merchant_store_ID merchant_store_business_categories
merchant_store_address merchant_store_geocoordinates
merchant_store_proximity_definition_ID
merchant_subscription_level merchant_store_hours
merchant_store_open merchant_online_store deselectable
welcome_text
  FROM MerchantsTable WHERE
  User_position IN merchants_proximity_definitions";
  $result = mysql_query($query); // perform the search
query
  mysql_close("SPR_DB.SQL"); // close database access
?>
```

Merchants in proximity message (1215) may include a list of merchant location proximities in which user is. Below is an example HTTP(S) POST merchants in proximity message (1215) substantially in the form of an XML-formatted message:

```
POST /merchants_in_proximity.php HTTP/1.1
Host: www.SPR.com
Content-Type: Application/XML
Content-Length: 1032
<?XML version = "1.0" encoding = "UTF-8"?>
<merchants_in_proximity_message>
<message_ID>MIP2343</message_ID>
<user_email>john.q.public@gmail.com</user_email>
<user_ID>1234abc6789</user_ID>
<timestamp>12.21.2012 18:12:32</timestamp>
<merchant_01>
<merchant_name>stop and shop</merchant_name>
<merchant_ID>123456</merchant_ID>
<merchant_store_ID>SAP265847</merchant_store_ID>
<merchant_store_business_categories>groceries_195,
``` farmacy_546, flowers_078, pastry_254, deli_264</merchant_store_business_categories>
    <merchant_store_address>30 N Washington st., Tarrytown, NY, 10591, US</merchant_store_address>
    <merchant_store_geocoordinates>41°04'40.2060, −073°51'35.2872</merchant_store_geocoordinates>
    <merchant_store_proximity_definition_ID>SAP265847-324D56</merchant_store_proximity_definition_ID>
    <merchant_subscription_level>A332</merchant_subscription_level>
    <merchant_store_hours>Mo 7:00-20:00, Tu 7:00-20:00, We 7:00-20:00, Th 7:00-20:00, Fr 7:00-20:00, Sa 7:00-18:00, Su 10:00-17:00 </merchant_store_hours>
    <merchant_store_open>Yes</merchant_store_open>
    <merchant_online_store>www.stopandshop.com</merchant_online_store>
    <deselectable>no</deselectable>
    <welcome_text>Hello!</welcome_text>
    </merchant_1>
    <merchant_2>
    <merchant_name>super bookstore</merchant_name>
    <merchant_ID>84520</merchant_ID>
    <merchant_store_ID>SBS65387</merchant_store_ID>
    <merchant_store_business_categories>books_523, newspapers_926, coffee_824</merchant_store_business_categories>
    <merchant_store_address>42 Central ave., Tarrytown, NY, 10591, US</merchant_store_address>
    <merchant_store_geocoordinates>41°04'39.9000, −073°51'36.4068</merchant_store_geocoordinates>
    <merchant_store_proximity_definition_ID>SBS65387-726V23</merchant_store_proximity_definition_ID>
    <merchant_subscription_level>C100</merchant_subscription_level>
    <merchant_store_hours>Mo 11:00-20:00, Tu 11:00-20:00, We 11:00-20:00, Th 11:00-20:00, Fr 11:00-20:00, Sa 9:00-21:00, Su closed</merchant_store_hours>
    <merchant_store_open>No</merchant_store_open>
    <merchant_online_store>none</merchant_online_store>
    <deselectable>yes</deselectable>
    <welcome_text>Welcome!</welcome_text>
    </merchant_2>
    </merchants_in_proximity_message>
```

Merchant location server (1205) may then send data element merchants in proximity message (1216), which may include a list of merchants that may make offers to user. If there are more than one merchant in element merchants in proximity message (1216), user device (1202) may prompt a message to user for selecting one or more of the merchants, to which user may reply, e.g., merchant selection input (1217). See FIG. 24 for an example of element merchant selection input (1217).

User device (1202) may then invoke check-in message component (1218) for generating check-in message (1219) for transmission to offer generation server (1211). Check in message (1219) may include data such as user ID, user position, speed and altitude, timestamp, recent user's shopping activity, and more, and may also include data on the merchants the user is in proximity of, or a selection of merchants by the user. Below is an example HTTP(S) POST check in message (1219) substantially in the form of an XML-formatted message:

```
POST /checkin_info.php HTTP/1.1
Host: www.SPR.com
Content-Type: Application/XML
Content-Length: 721
<?XML version = "1.0" encoding = "UTF-8"?>
<check_in_message>
<checkin_ID>CNI4ICNW2</ checkin_ID >
<user_ID>john.q.public@gmail.com</user_ID>
<password>supersecret</password>
<client_details>
<client_IP>192.168.23.126</client_IP>
<client_type>smartphone</client_type>
<client_model>HTC Hero</client_model>
<OS>Android 2.2</OS>
<app_installed_flag>true</app_installed_flag>
</client_details>
<user_info>
<user_ID>1234abc6789</user_ID>
<account_name>John Q. Public</account_name>
<merchant_name>BestBuy</merchant_name>
<user_position>40.7697° N, 73.9735° W</user_position>
<user_distance>56 yrd</user_ distance>
<user_speed>0.2 mph</user_speed>
<user_altitude>10.3 ft</user_altitude>
<timestamp>12/25/2012_12.34.21</timestamp>
</user_info>
<merchants_selection>
<selection_1>
<merchant_ID> 37488974 </merchant_ID>
<merchant_store_ID> dhf534745 </merchant_store_ID>
<user_selection> selected </user_selection>
</selection_1>
<selection_2>
<merchant_ID> thy5687 </merchant_ID>
<merchant_store_ID> mjki6867 </merchant_store_ID>
<user_selection> NOT selected </user_selection>
</selection_2>
<selection_3>
<merchant_ID> gyu5675 </merchant_ID>
<merchant_store_ID> ssfe234 </merchant_store_ID>
<user_selection> automatic </user_selection>
</selection_3>
<selection_4>
<merchant_ID> jut465 </merchant_ID>
<merchant_store_ID> uiw250 </merchant_store_ID>
<user_selection> selected </user_selection>
</selection_4>
</merchants_selection>
</check_in_message>
```

Offer generation server (1211) may receive check-in message (1219) and may update user information in users database (1208) with update user information message (1220), which may include data in check in message (1219) or more. Users database (1208) may store user shopping profiles and more information. User shopping profile message (1222) may be retrieved from users database (1208) via user information query (1221). User information query (1221) may comprise a user ID and a timestamp. User shopping profile message (1222) may comprise all or part of the information associated to user present in users database (1208), and may also include data from check-in message (1219). Below is an example of update user information message (1220) substantially in the form of a PHP/SQL query:

```
<?PHP
header('Content-Type: text/plain');
mysql_connect("254.92.185.103",$DBserver,$password); // access database server
mysql_select("SPR_DB.SQL"); // select database to append
mysql_query("INSERT INTO UsersTable (timestamp, user_ID, user_location,user_speed,user_altitude,merchant_1_ID, user_selection_1,merchant_2_ID,user_selection_2, distance_from_1,distance_from_2)
VALUES (time( ), $user_ID, $user_location, $user_speed, $user_altitude, $merchant_1_ID,$user_selection_1,$merchant_2_ID,
```

```
$user_selection_2,$distance_from_1,$distance_from_2");// add
data to table in database
        mysql_close("SPR_DB.SQL"); // close connection to
database
        ?>
```

Below is an example of user information query (1221) Substantially in the form of a PHP/SQL query:

```
<?PHP
    header('Content-Type: text/plain');
    mysql_connect("254.93.179.112",$DBserver,$password); //
access database server
    mysql_select("SPR_DB.SQL"); // select database table to
search
    //create query
    $query = "SELECT user_ID user_name user_email
user_phone_number user_user_account_type user_demographic_data
user_interests user_spending user_visited_stores
user_searched_products user_received_offers user_purchases
social_media_connection
        FROM UsersTable WHERE
        user_ID LIKE '%' $userID";
    $result = mysql_query($query); // perform the search
query
    mysql_close("SPR_DB.SQL"); // close database access
    ?>
```

It should be noted that user information query (1221) may reoccur and/or occur asynchronously, periodically (e.g. cron job), on demand, independently and/or the like. Below is an example HTTP(S) POST user shopping profile message (1222) substantially in the form of an XML-formatted message:

```
POST /user_shopping_profile.php HTTP/1.1
Host: www.SPR.com
Content-Type: Application/XML
Content-Length: 2134
<?XML version = "1.0" encoding = "UTF-8"?>
<user_shopping_profile_message>
    <message_ID>UPD2155834764</message_ID>
    <timestamp> 2/1/2015 10:12:39 </timestamp>
    <user_ID>1234abc6789</user_ID>
    <user_name> john, public </user_name>
    <user_email>john.q.public@gmail.com</user_email>
    <user_phone_number>3957402275</user_phone_number>
    <user_user_account_type>A113</user_user_account_type>
    <user_demographic_data>
    <user_birth_date> 12/23/1965 </user_birth_date>
    <user_gender> Male </user_gender>
    <user_marital_status> Married </user_marital_status>
    <user_Head_of_Household_Status> Yes
</user_Head_of_Household_Status>
    <user_Household_Size> 3 </user_Household_Size>
<user_Presence_By_Age_In_Household> 1/34, 1/32, 1/2
</user_Presence_By_Age_In_Household>
    <user_Race_Ethnicity> Asian </user_Race_Ethnicity>
<user_Highest_Completed_Education> BS
</user_Highest_Completed_Education>
    <user_Current_Employment_Status> Employed
</user_Current_Employment_Status >
    <user_Household_Income_before_taxes> 92000
</user_Household_Income_before_taxes>
    <user_Dual_Income_Status> Yes </user_Dual_Income_Status>
    <user_Ownership_Status> n.a. </user_Ownership_Status>
    <user_Internet_Access> Yes </user_Internet_Access>
    </user_demographic_data>
    <user_interests> tablets, cell phones, fishing, camping,
cooking, soccer </user_interests>
    <user_spending> gaming 150$/mo, food 550$/mo, electronics
130$/mo </user_spending>
    <user_visited_stores>
        <user_visited_store_1>
        <merchant_name> Best Buy </merchant_name>
        <store_ID> BB2353465 </store_ID>
        <store_location> 41°04'42.0096, −073°51'40.4820
</store_location>
        <check-in_timestamp> 1/23/2015,15:23:43 </check-
in_timestamp>
        <position_at_check-in> 41°04'48.1404, −073°51'41.3136
</position_at_check-in>
        <speed_at_check-in> 2 mph</speed_at_check-in>
        <check-out_timestamp> 1/23/2015,16:41:12 </check-
out_timestamp>
        <position_at_check-out>41°04'31.3248, −073°51'31.1364
</position_at_check-out>
        <speed_at_check-out> 27 mph </speed_at_check-out>
        <store_departments_visited> computer 10:12, appliances
33:32, </store_departments_visited>
        <scanned_SKU> sefdrf756378,
dsf7878345hf544,3348239045hfhyr , 234394589798dfr </scanned_SKU>
        <transaction> Ashf357483 , 12.32 USD ,Music CD, Christmas
Songs </transaction>
        </user_visited_store_1>
        <user_visited_store_2>
        <merchant_name> CircuitCity </merchant_name>
        <store_ID> CC32854766 </store_ID>
        <store_location> 41°03'30.8988, −073°51'11.5524
</store_location>
        <check-in_timestamp> 1/23/2015,16:53:43 </check-
in_timestamp>
        <position_at_check-in> 41°03'35.7624, −073°51'22.0572
</position_at_check-in>
        <speed_at_check-in> 23 mph </speed_at_check-in>
        <check-out_timestamp> 1/23/2015,18:54:51 </check-
out_timestamp>
        <position_at_check-out> 41°03'38.4012, −073°50'50.5032
</position_at_check-out>
        <speed_at_check-out> 57 mph </speed_at_check-out>
        <store_departments_visited> computer 14:16, appliances
43:01, </store_departments_visited>
        <scanned_SKU> sefdrf756378, df54748329, cbfrtr34345
</scanned_SKU>
        <transaction> n.a. </transaction>
        </user_visited_store_2>
        <user_visited_store_3>
        ...
        </user_visited_store_3>
    </user_visited_stores>
    <user_searched_products>
        <searched_product_1>
        <search_ID> s34234534456 </search_ID>
        <timestamp> 1/23/2015,21:02:51 </timestamp>
        <product_ID> sefdrf756378 </product_ID>
        <search_tool> google </search_tool>
        <search_logic> reviews </search_logic>
        <product_name> Dishwasher </product_name>
        <product_model> WR12334 </product_model>
        <product_price> 601$ </product_price>
        <product_category> Appliances </product_category>
        <product_purchased> No </product_purchased>
        </searched_product_1>
        <searched_product_2>
        <search_ID> s34234534457 </search_ID>
        <timestamp> 1/23/2015,21:17:32 </timestamp>
        <product_ID> sefdrf756378 </product_ID>
        <search_tool> google </search_tool>
        <search_logic> price </search_logic>
        <product_name> Dishwasher </product_name>
        <product_model> WR12334 </product_model>
        <product_price> 535$ - 659$ </product_price>
        <product_category> Appliances </product_category>
        <product_purchased> No </product_purchased>
        </searched_product_2>
        <searched_product_3>
        <search_ID> s56445756785 </search_ID>
        <timestamp> 1/20/2015,14:23:19 </timestamp>
        <product_ID> fghg5646721 </product_ID>
        <search_tool> SKU skan </search_tool>
        <search_logic> price </search_logic>
        <product_name> Tablet </product_name>
```

-continued

```
<product_model> 42436TB </product_model>
<product_price> 1120$ </product_price>
<product_category> Electronics </product_category>
<product_purchased> Yes </product_purchased>
</searched_product_3>
<searched_product_4>
...
</searched_product_4>
</user_searched_products>
<user_received_offers>
<received_offer_1>
<offer_ID> of24334566345 </offer_ID>
<offer_timestamp> 1/23/2015,18:52:12 </offer_timestamp>
<offer_response> Refused </offer_response>
<offer_originator_ID> CC32854766 </offer_originator_ID>
<offered_products> sefdrf756378 </offer_products>
</received_offer_1>
<received_offer_2>
<offer_ID> of4563466547 </offer_ID>
<offer_timestamp> 1/23/2015,16:42:12 </offer_timestamp>
<offer_response> Refused </offer_response>
<offer_originator_ID> BB2353465 </offer_originator_ID>
<offered_products> sefdrf756378 </offer_products>
</received_offer_2>
<received_offer_3>
...
</received_offer_3>
</user_received_offers>
<user_purchases>
<purchase_1>
<transaction_ID> tr235442455 </transaction_ID>
<timestamp> 1/21/2015,11:21:38 </timestamp>
<associated_offers_ID> n.a. </associated_offers_ID>
<associated_searches_ID> n.a. </associated_searches_ID>
<product_ID> cb344553 </product_ID>
<amount> 23.00$ </amount>
<payment_method> Credit Card </payment_method>
</purchase_1>
<purchase_2>
<transaction_ID> s56445756785 </transaction_ID>
<timestamp> 1/20/2015,14:28:12 </timestamp>
<associated_offers_ID> n.a. </associated_offers_ID>
<associated_searches_ID> s56445756785
</associated_searches_ID>
<product_ID> fghg5646721 </product_ID>
<amount> 1120.00$ </amount>
<payment_method> Credit Card </payment_method>
</purchase_2>
<purchase_3>
...
</purchase_3>
</user_purchases>
<social_media_connection>
<connection_1>
<connection_ID> CN323456987267 </connection_ID>
<connection_target_ID> U23636554 </connection_target_ID>
<connection_start_timestamp> 12/2/2011,21:56:51
</connection_start_timestamp>
<connection_strength> 12/20 </connection_strength>
<connection_method> Facebook </connection_method>
<connection_activity> High </connection_activity>
<connection_influence> High </connection_influence>
</connection_1>
<connection_2>
<connection_ID> CN34567546578 </connection_ID>
<connection_target_ID> U23672539 </connection_target_ID>
<connection_start_timestamp> 7/18/2013,11:03:43
</connection_start_timestamp>
<connection_strength> 2/20 </connection_strength>
<connection_method> Linkedin </connection_method>
<connection_activity> Low </connection_activity>
<connection_influence> High </connection_influence>
</connection_2>
<connection_3>
...
</connection_3>
</social_media_connection>
</user_shopping_profile_message>
```

Merchant offer query 223 may include data such as user's position, distance, speed and more information from user shopping profile message 222. Below is an example of merchant offer query 223 substantially in the form of a PHP/SQL query:

```
<?PHP
header('Content-Type: text/plain');
mysql_connect("254.93.179.112",$DBserver,$password); //
access database server
mysql_select("SPR_DB.SQL"); // select database table to
search
//create query
$query = "SELECT merchant_name
merchant_store_ID merchant_offer_message_ID
offer_properties offer_details offer_display_options
FROM OffersTable WHERE
user_account_type LIKE '%' $useraccounttype AND
user_customer_profile LIKE '%' $usercustomerprofile AND
user_demographic_data LIKE '%' $userdemographicdata AND
user_purchases_history LIKE '%' $userpurchaseshistory AND
user_interests LIKE '%' $userinterests AND user_habits LIKE '%'
$userhabits AND userspendingstatistics LIKE '%'
$userspendingstatistics AND user_spending_profile LIKE '%'
$userspendingprofile AND user_visited_stores LIKE '%'
$uservisitedstores AND user_searched_products LIKE '%'
$usersearchedproducts AND user_offers_history LIKE '%'
$useroffershistory AND user_social_media_presence LIKE '%'
$usersocialmediapresence AND user_influence_on_others LIKE '%'
$userinfluenceonothers";
$result = mysql_query($query); // perform the search
query
mysql_close("SPR_DB.SQL"); // close database access
```

Merchant offers database (1209) may include the merchant offer targeting information or more. Merchant offer message (1224) may comprise details of the offer(s) to be made to user, for example, discount rate, validity terms, validity period, products or services included, possibility of sharing or distributing, incentives for publicizing the offer(s), and more. Below is an example HTTP(S) POST element merchant offer message (1224) substantially in the form of an XML-formatted message:

```
POST /merchant_offer.php HTTP/1.1
Host: www.SPR.com
Content-Type: Application/XML
Content-Length: 892
<?XML version = "1.0" encoding = "UTF-8"?>
<merchant_offer_message>
<merchant_ID> 123456 </merchant_ID>
<merchant_name> BestBuy </merchant_name>
<merchant_store_ID> BB3456455 </merchant_store_ID>
<merchant_offer_message_ID> 3214324hsdhg </
merchant_offer_message_ID>
<target_user_ID> 1234abc6789 </target_user_ID>
<timestamp> 12.21.2012 18:12:32 </timestamp>
<offer_1>
<offer_properties>
<name>initial offer 1</name>
<offer_ID>012-325</offer_ID>
<offer_type>products, discount</offer_type>
</offer_properties>
<offer_details>
<amount>–$10.00</amount>
<product_ID>13: 978-0-7641-4304-5</product_ID>
<product_name>Sport drive 120</product_name>
<product_brand>Samsung</product_brand>
<product_description>120 GB USB
drive</product_description>
<price>$59.99</price>
<sales_tax>$3.74</sales_tax>
<shipping>No</shipping>
<stackable_flag>true</stackable_flag>
<stackable>yes</stackable>
```

-continued

```
    <negotiable>yes</negotiable>
    <expiration>00:10:00</expiration>
    <distance_limit>no</distance_limit>
    </offer_details>
    <offer_display_options>
    <text>Here is our offer!</text>
    <images>offer_1_picture.jpg</images>
    <animations>offer_1_animation.f4p</animations>
    </offer_display_options>
  </offer_1>
  <offer_2>
    <offer_properties>
    <name>initial offer 2</name>
    <offer_ID>012-326</offer_ID>
    <offer_type>products, discount</offer_type>
    </offer_properties>
    <offer_details>
    <amount>-$5.00</amount>
    <product_ID>13: 978-0-7641-4304-5</product_ID>
    <product_name>Sport drive 120</product_name>
    <product_brand>Samsung</product_brand>
    <product_description>120 GB USB
drive</product_description>
    <price>$59.99</price>
    <sales_tax>$3.74</sales_tax>
    <shipping>Standard</shipping>
    <stackable_flag>true</stackable_flag>
    <stackable>yes</stackable>
    <negotiable>no</negotiable>
    <expiration>00:30:00</expiration>
    <distance_limit>0.5 miles</distance_limit>
    </offer_details>
    <offer_display_options>
    <text>Here is another offer!</text>
    <images>offer_2_picture.jpg</images>
    <animations>offer_2_animation.f4p</animations>
    </offer_display_options>
  </offer_2>
  <offer_3>
    <offer_properties>
    <name>initial offer 3</name>
    <offer_ID>467-934</offer_ID>
    <offer_type>incentive</offer_type>
    </offer_properties>
    <offer_details>
    <amount>n.a.</amount>
    <product_ID>0004565</product_ID>
    <product_name>free coffee</product_name>
    <product_brand>n.a.</product_brand>
    <product_description>free coffee also valid for fidelity
card program</product_description>
    <price>0</price>
    <sales_tax>0</sales_tax>
    <shipping>n.a.</shipping>
    <stackable_flag>true</stackable_flag>
    <stackable>yes</stackable>
    <negotiable>no</negotiable>
    <expiration>00:10:00</expiration>
    <distance_limit>0.5 miles</distance_limit>
    <program_status>6/10 - 4 more coffees needed for a free
mug</program_status>
    </offer_details>
    <offer_display_options>
    <text>Free coffee! Add one point to your fidelity
card!</text>
    <images>free_coffee_picture.jpg</images>
    <animations> free_coffee_animation.f4p</animations>
    </offer_display_options>
  </offer_3>
</merchant_offer_message>
```

Details of the offer(s) may be included in update merchant offers information message (1225), such as offer(s) ID(s), target user ID, time, validity terms, products or services offered, discount, and more. Merchant sent offers database (1210) may be updated with information in update merchant offers information message (1225). Merchant sent offers database (1210) may store offers generated by merchant(s).

Below is an example of merchant offers information message (1225) substantially in the form of a PHP/SQL query:

```
<?PHP
  header('Content-Type: text/plain');
  mysql_connect("254.92.185.103",$DBserver,$password); // access database server
  mysql_select("SPR_DB.SQL"); // select database to append
  mysql_query("INSERT INTO OffersTable (timestamp,
user_ID, user_location, user_speed, user_altitude,
merchant_1_ID, merchant_1_store_ID, offer_1_ID, offer_1_type,
offer_1_product, offer_1_discount, offer_1_bundled_product_1,
offer_1_condition_1, offer_1_condition_2, offer_1_term_1,
offer_1_term_2, offer_2_ID, offer_2_type, offer_2_product,
offer_2_discount, offer_2_bundled_product_1,
offer_2_condition_1, offer_2_condition_2, offer_2_term_1,
offer_2_term_2, offer_3_ID, , offer_3_type, offer_3_product,
offer_3_discount, offer_3_bundled_product_1,
offer_3_condition_1, offer_3_condition_2, offer_3_term_1,
offer_3_term_2)
    VALUES (time( ), $user_ID, $user_location, $user_speed,
$user_altitude, $merchant_1_ID, $merchant_1_store_ID,
$offer_1_ID, $offer_1_type, $offer_1_product, $offer_1_discount,
$offer_1_bundled_product_1, $offer_1_condition_1,
$offer_1_condition_2, $offer_1_term_1, $offer_1_term_2,
$offer_2_ID, $offer_2_type, $offer_2_product, $offer_2_discount,
$offer_2_bundled_product_1, $offer_2_condition_1,
$offer_2_condition_2, $offer_2_term_1, $offer_2_term_2,
$offer_3_ID, $offer_3_type, $offer_3_product, $offer_3_discount,
$offer_3_bundled_product_1, $offer_3_condition_1,
$offer_3_condition_2, $offer_3_term_1, $offer_3_term_2)");// add
data to table in database
  mysql_close("SPR_DB.SQL"); // close connection to
database
?>
```

Offer generation server (1211) invokes offer generation component (1226) for generating initial offer message (1227). Initial offer message (1227) may include details of the offer(s), but may also comprise text, images, sounds, videos, animations and effects to be displayed, and information relative to the graphical depiction of the offer(s), how visual components are to be rendered, the level of interaction with user, and social media options. Initial offer message (1227) may also include interactive games. User device (1202) may receive initial offer message (1227) and may display it. Below is an example HTTP(S) POST initial offer message (1227) substantially in the form of an XML-formatted message:

```
POST /discountoffer.php HTTP/1.1
Host: www.SPR.com
Content-Type: Application/XML
Content-Length: 788
<?XML version = "1.0" encoding = "UTF-8"?>
<initial_offer_message>
  <message_ID>CNI4ICNW2</message_ID>
  <user_email>john.q.public@gmail.com</user_email>
  <user_ID>1234abc6789</user_ID>
  <offer_1>
    <offer_properties>
    <name>initial offer 1</name>
    <offer_ID>012-325</offer_ID>
    <offer_type>products, discount</offer_type>
    <user_ID>1234abc6789</user_ID>
    <merchant_ID>123456</merchant_ID>
    <merchant_name>BestBuy</merchant_name>
    <session_ID>AEBB4356</session_ID>
    </offer_properties>
    <offer_details>
    <amount>-$10.00</amount>
    <product_ID>13: 978-0-7641-4304-5</product_ID>
    <product_name>Sport drive 120</product_name>
    <product_brand>Samsung</product_brand>
    <product_description>120 GB USB
```

```
drive</product_description>
   <price>$59.99</price>
   <sales_tax>$3.74</sales_tax>
   <shipping>No</shipping>
   <stackable_flag>true</stackable_flag>
   <stackable>yes</stackable>
   <negotiable>yes</negotiable>
   <expiration>00:10:00</expiration>
   <distance_limit>no</distance_limit>
  </offer_details>
  <offer_display_options>
   <text>Here is our offer!</text>
   <images>offer_1_picture.jpg</images>
   <animations>offer_1_animation.f4p</animations>
  </offer_display_options>
 </offer_1>
 <offer_2>
  <offer_properties>
   <name>initial offer 2</name>
   <offer_ID>012-326</offer_ID>
   <offer_type>products, discount</offer_type>
   <user_ID>1234abc6789</user_ID>
   <merchant_ID>123456</merchant_ID>
   <merchant_name>BestBuy</merchant_name>
   <session_ID>AEBB4356</session_ID>
  </offer_properties>
  <offer_details>
   <amount>-$5.00</amount>
   <product_ID>13: 978-0-7641-4304-5</product_ID>
   <product_name>Sport drive 120</product_name>
   <product_brand>Samsung</product_brand>
   <product_description>120 GB USB
drive</product_description>
   <price>$59.99</price>
   <sales_tax>$3.74</sales_tax>
   <shipping>Standard</shipping>
   <stackable_flag>true</stackable_flag>
   <stackable>yes</stackable>
   <negotiable>no</negotiable>
   <expiration>00:30:00</expiration>
   <distance_limit>0.5 miles</distance_limit>
  </offer_details>
  <offer_display_options>
   <text>Here is another offer!</text>
   <images>offer_2_picture.jpg</images>
   <animations>offer_2_animation.f4p</animations>
  </offer_display_options>
 </offer_2>
 <offer_3>
  <offer_properties>
   <name>initial offer 3</name>
   <offer_ID>467-934</offer_ID>
   <offer_type>incentive</offer_type>
   <user_ID>1234abc6789</user_ID>
   <merchant_ID>123456</merchant_ID>
   <merchant_name>BestBuy</merchant_name>
   <session_ID>AEBB4356</session_ID>
  </offer_properties>
  <offer_details>
   <amount>n.a.</amount>
   <product_ID>0004565</product_ID>
   <product_name>free coffee</product_name>
   <product_brand>n.a.</product_brand>
   <product_description>free coffee also valid for fidelity
card program</product_description>
   <price>0</price>
   <sales_tax>0</sales_tax>
   <shipping>n.a.</shipping>
   <stackable_flag>true</stackable_flag>
   <stackable>yes</stackable>
   <negotiable>no</negotiable>
   <expiration>00:10:00</expiration>
   <distance_limit>0.5 miles</distance_limit>
   <program_status>6/10 – 4 more coffees needed for a free
mug</program_status>
  </offer_details>
  <offer_display_options>
   <text>Free coffee! Add one point to your fidelity
card!</text>
   <images>free_coffee_picture.jpg</images>
   <animations> free_coffee_animation.f4p</animations>
  </offer_display_options>
 </offer_3>
</initial_offer_message>
```

Figure 23:
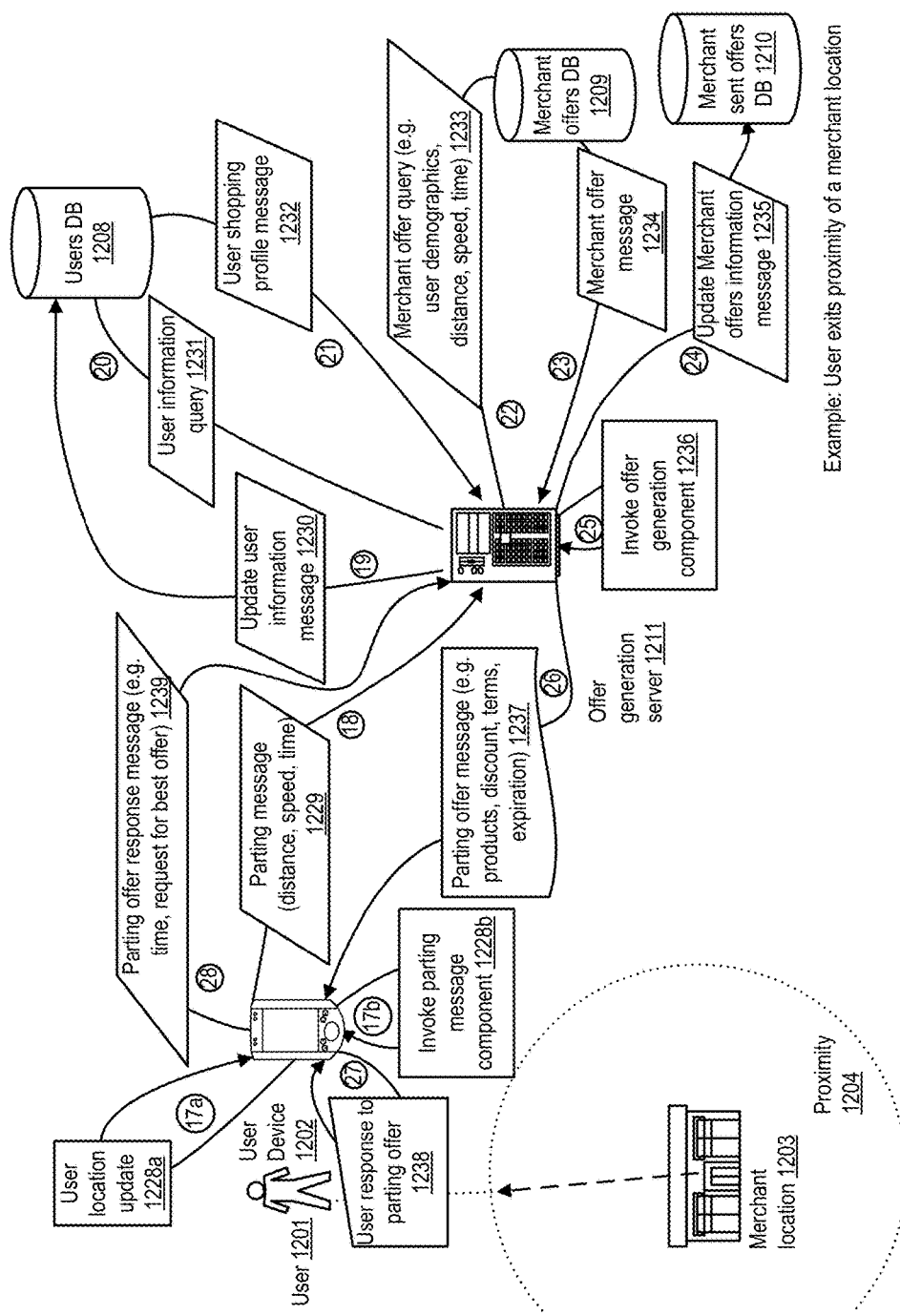

FIG. 23 shows a data flow diagram illustrating an example of transforming user data via a SHOPPING PROXIMITY REVISALS into a parting offer to user. In this example user (1201) is leaving merchant location proximity (1204). User device may determine the departure from a merchant location proximity, the merchant may determine user's departure, or other parties may.

User device (1202) may detect that user (1201) has left the proximity though user location update message (1228*a*) and then it may invoke parting message component (1228*b*) for generating parting message (1229) for transmission to offer generation server (1211). An exemplary parting message (1229) may be similar to check-in message (1219), and may include data such as user ID, user position, speed and altitude, a timestamp, user's recent shopping activity, and more, and may also comprise a list of merchants the user has exited the proximity of, is currently in the proximity of, or a selection of merchants by the user. Offer generation server (1211) may receive parting message (1229) and may update user information in users database (1208) with update user information message (1230) which may include data from parting message (1229). An exemplary element update user information message (1230) may be similar to exemplary element update user information (1220). User shopping profile message (1232) may be retrieved from users database (1208) via generating user information query (1231). An exemplary element user information query (1231) may be similar to exemplary user information query (1221). User information query (1231) may comprise a user ID and a timestamp. User shopping profile message (1232) may comprise all or part of the information associated to user stored in users database (1208), and may also include data from parting message (1229). An exemplary element user shopping profile message (1232) may be similar to exemplary element user shopping profile message (1222).

Merchant offer query (1233) may include data such as user's position, distance, speed and more from user shopping profile message (1232). An exemplary element merchant offer query (1233) may be similar to exemplary element merchant offer query (1223). Merchant offer message (1234) may comprise details of the offer(s) to be made to user, for example, discount rate, validity terms, validity period, products or services included, possibility of sharing or distributing, incentives for publicizing the offer(s), and more. An exemplary element merchant offer message (1234) may be similar to exemplary element merchant offer message (1224).

Details of the offer(s) may be comprised in element update merchant offers information message (1235), such as offer(s) ID(s), target user ID, time, validity terms, products or services offered, discount, and more. Merchant sent offers database (1210) may be updated with the information in element update merchant offers information message (1235). An exemplary element update merchant offers information message (1235) may be similar to exemplary element update merchant offers information message (1225).

Offer generation server (1211) may invoke offer generation component (1236) for generating parting offer message (1237). Parting offer message (1237) may include details of the offer(s), but may also comprise text, images, sounds, videos, animations and effects to be displayed, and information relative to the graphical depiction of the offer(s), how visual components are to be rendered and the level of interaction with user and social media options. Parting offer message (1237) may also include interactive games. An exemplary element parting offer message (1237) may be similar to exemplary element initial offer message (1227). User device (1202) may receive parting offer message (1237) and may display it.

User may provide a response to the parting offer, e.g., user response to parting offer (1238). Offer generation server (1211) may receive parting offer response message (1239) from user device (1202). Parting offer response message (1239) may comprise data such as: offer(s) response, user ID, offer(s) ID(s), timestamp, time to response, user position, speed and altitude, merchant generating the offer(s), and more.

Figure 24:
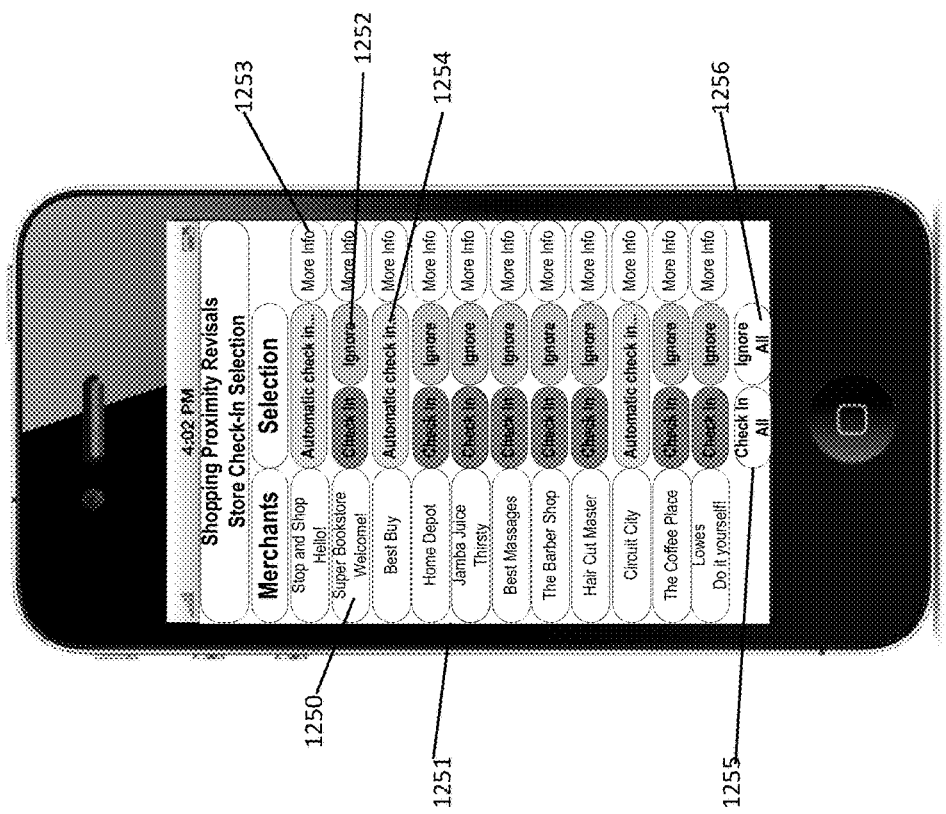

FIG. 24 shows an exemplary embodiment of merchant in proximity message (1215). The message may show a list of merchants (1250) the user is in the proximity of, it may show a check in option (1251), an ignore option (1252), an option for receiving more information on the merchant or the offer or more (1253). Merchant in proximity message (1215) may display an automatic check in for some merchants (1254), it may also give the option to check in at all available merchants (1255) or to ignore all the merchants that may be ignored (1256). When the user and/or automatic checkins and/or ignore buttons are engaged, the device may generate check in messages (e.g. see (1219), FIG. 22)

Figure 25:
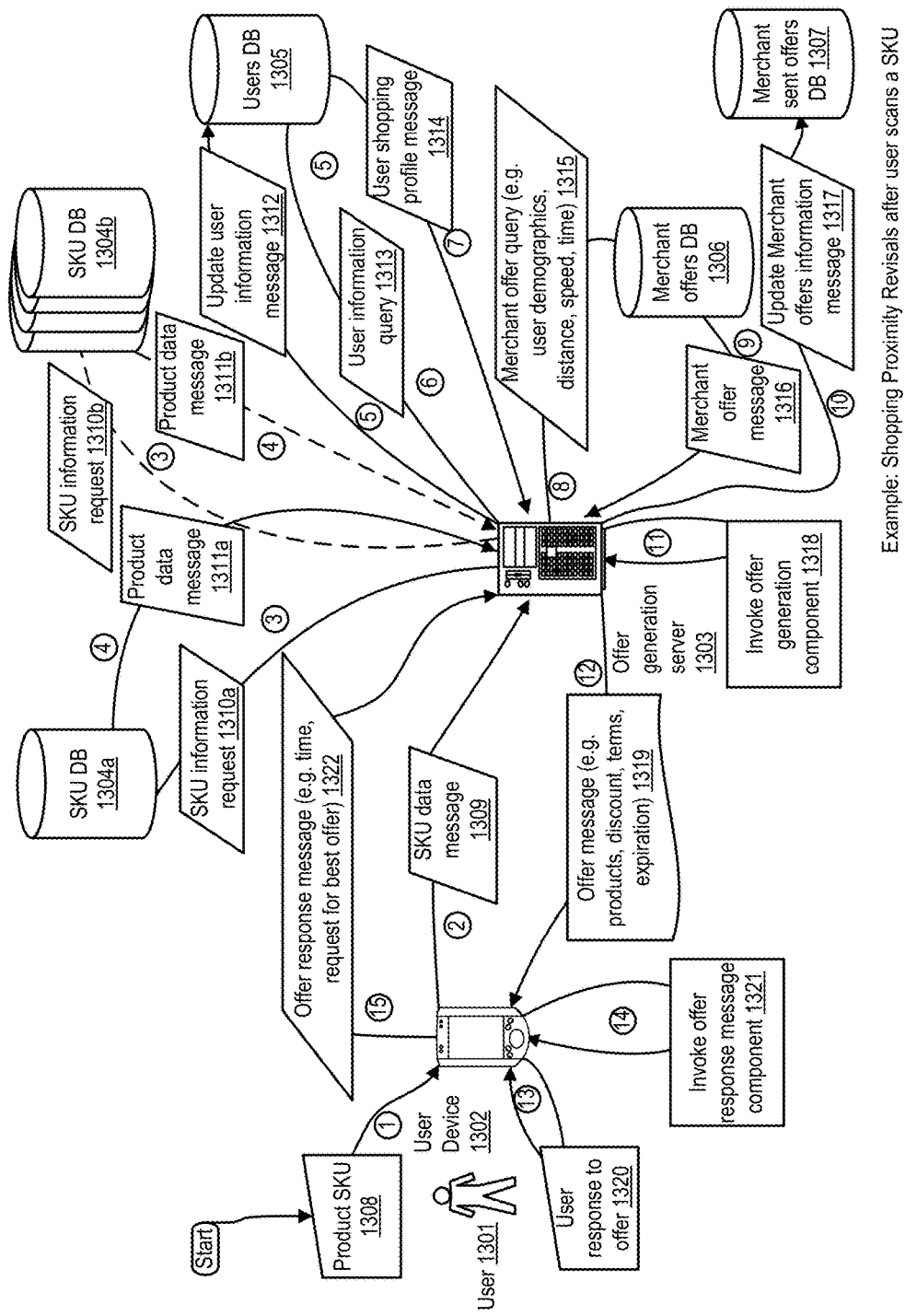
FIG. 25 shows a data flow diagram illustrating an example of the SHOPPING PROXIMITY REVISALS determining an offer for a user scanning labels of products or services.

FIG. 25 shows a data flow diagram illustrating an example of transforming label scanning by the user via a SHOPPING PROXIMITY REVISALS into an offer to user. User (1301) uses user device (1302) to scan SKU labels, or similar objects, for retrieving information on the products or services such as price, reviews, and more.

Element product SKU (1308) may be read by user device (1302) to generate SKU data message (1309) which may comprise data obtained from the label, but may also comprise user ID, timestamp, user location, seller, seller location, list of merchants the user is in the proximity of, and more. Below is an example HTTP(S) POST SKU data message (1309) message substantially in the form of an XML-formatted message:

```
POST /skudata.php HTTP/1.1
Host: www.SPR.com
Content-Type: Application/XML
Content-Length: 1283
<?XML version = "1.0" encoding = "UTF-8"?>
  <SKU_data_message>
  <user_ID>john.q.public</user_ID>
  <timestamp>2052-11-12 09:33:43</timestamp>
  <user_location> 41°04'15.2509, -073°29'25.5263
  </user_location>
    <action>
    <type>scan</type>
    <target>QR</target>
    <detail>
    <checked-in_merchant_list>
    <merchant_1>
    <merchant_id> 54TBRELF8 </merchant_id>
    <merchant_name> BARNES, Inc. </merchant_name>
    <merchant_store_id> 54TBR4567 </merchant_store_id>
    <merchant_store_location> 41°04'15.2508, -073°29'25.5264
    </merchant_store_location>
    </merchant_1>
    <merchant_2>
    <merchant_id> FHYT475E </merchant_id>
    <merchant_name> ACC Ind. </merchant_name>
```

-continued

```
    <merchant_store_id> 356HJDTW789 </merchant_store_id>
    <merchant_store_location> 41°04'14.8152, -073°29'26.8008
    </merchant_store_location>
    </merchant_2>
    <merchant_3>
    ...
    </merchant_3>
    </checked-in_merchant_list>
    <SKU_code> 45876587HFBHGDE87567328787HHGS546
    </SKU_code>
    <unit_cost>$14.46</unit_cost>
    </detail>
    </action>
    <!--optional parameters-->
    <device_fingerprint>
    <device_IP>192.168.23.126</device_IP>
    <device_MAC>0123.4567.89ab</device_MAC>
    <device_serial>312456768798765432</device_serial>
    <device_ECID>00000AEBCDF12345</device_ECID>
    <device_identifier>jqp_air</device_identifier>
    <device_UDID>21343e34-14f4-8jn4-7yfe-
124578632134</device_UDID>
    <device_browser>firefox 2.2</device_browser>
    <device_type>smartphone</device_type>
    <device_model>HTC Hero</device_model>
    <OS>Android 2.2</OS>
    </device_fingerprint>
    </SKU_data_message>
```

Below is another example HTTP(S) POST SKU data message (1309) message substantially in the form of an XML-formatted Message:

```
POST /skudata.php HTTP/1.1
Host: www.SPR.com
Content-Type: Application/XML
Content-Length: 1283
<?XML version = "1.0" encoding = "UTF-8"?>
<SKU_data_message>
  <user_ID>john.q.public</user_ID>
  <timestamp>2052-11-12 09:33:43</timestamp>
  <user_location>41°04'15.2509, -073°29'25.5263
  </user_location>
    <scan_data>picture_1.jpg</scan_data >
    </SKU data message>
```

In these embodiments all the information contained in the picture can be extracted and analyzed at destination (e.g. picture can be deconstructed, analyzed with OCR and/or the like). Offer generation server (1303) may receive SKU data message (1309) and may generate a SKU information request (1310*a*) to obtain product data message (1311*a*) from SKU database (1304*a*). SKU information request (1310*a*) may comprise information from the SKU label and more. In one embodiment a non-merchant specific SKU database (1304*a*) may include merchant_DB_URL values, which may be used to query a merchant specific SKU database (1304*b*) by retrieving a query URL for purposes of query submission to (1304*b*). Below is an example of SKU information request (1310*a*) substantially in the form of a PHP/SQL Query:

```
<?PHP
  header('Content-Type: text/plain');
  mysql_connect("254.93.179.112",$DBserver,$password); //
access database server
  mysql_select("SPR_DB.SQL"); // select database table to
search
  //create query
  $query = "SELECT general_info product_details
```

```
        FROM SKUTable WHERE SKU_code LIKE '%' $SKUcode";
        $result = mysql_query($query); // perform the search
query
        mysql_close("SPR_DB.SQL"); // close database access
```

SKU database (1304*a*) may contain SKU label data and information on the product or service associated with the SKU label data, which may comprise product name, maker, model, price, manufacturing date, expiration date, country of origin, serial number, reviews, recall information, seller, seller location and more.

Product data message (1311*a*) may comprise all or part of the data in SKU database related to the scanned SKU, or may comprise more. Below is an example HTTP(S) POST product data message (1311*a*) substantially in the form of an XML-formatted message:

```
POST /product_data.php HTTP/1.1
Host: www.SPR.com
Content-Type: Application/XML
    Content-Length: 834
    <?XML version = "1.0" encoding = "UTF-8"?>
    <product_data_message>
    <general_info>
    <timestamp> 2032-05-25 19:13:23 <timestamp>
    <product_data_message_ID> 35HFT35879SHDT
<product_data_message_ID>
    <SKU_info_query_ID> DHFT57382EHS
    <SKU_info_query_ID>
    </general_info>
    <product_details>
    <product_name> magic broom </product_name>
    <product_ID> 34548HDT45BC </product_ID>
    <product_model> AS1000 </product_model>
    <product_serial_number> 11234325 </product_serial_number>
        <product_maker> ACE Inc. </product_maker>
        <product_manufacturing_date> 2031-10-21
</product_manufacturing_date>
        <product_expiration_date> n.a.
</product_expiration_date>
        <product_country_of_origin> India
</product_country_of_origin>
        <product_version> 2.3 </product_version>
        <product_family> brooms </product_family>
        <product_category> cleaning </product_category>
        <product_compliance_with_standards> green_products_2.0
</product_compliance_with_standards>
        <product_release_year> 2021 </product_release_year>
        <product_reviews> 8.2/10 </product_reviews>
        <product_recall_info> recalled serial numbers
10234325-10239325 </product_recall_info>
        <product_price_range> 34.02$ – 41.55$
</product_price_range>
        <product_price> 34.99$ </product_price>
        <product_sellers> SJHDFY344 SHD4645896 SHTC3475
457DFS3 </product_sellers>
        <DB_URL>www.merchantq.com/?merchantproductsearchURL
</DB_URL>
        </product_details>
        </product_data_message>
```

Below is an example of SKU information query (1310*b*) Substantially in the form of a PHP/SQL query:

```
        <?PHP
        header('Content-Type: text/plain');
        mysql_connect("254.93.179.112",$DBserver,$password);
    // access database server
        mysql_select("SPR_DB.SQL"); // select database table
to search
        //create query
        $query = "SELECT merchant_DB_URL general_info
```

```
        product_details
            FROM SKUTable WHERE SKU_code LIKE '%' $SKUcode";
            $result = mysql_query($query); // perform the search
query
            mysql_close("SPR_DB.SQL"); // close database access
```

SKU database (1304*b*) may contain SKU label data and information on the product or service associated with the SKU label data and with the specific merchant associated with merchant_DB_URL, which may comprise product name, maker, model, price, manufacturing date, expiration date, country of origin, serial number, reviews, recall information, seller, seller location and more. Product data message (1311*b*) may contain similar information as product data message (1311*a*), although associated with the merchant associated with merchant_DB_URL.

Users database (1305) may be updated with update user information message (1312). An exemplary element update user information message (1312) may be similar to exemplary element update user information (1220). Users database (1305) may include data from user shopping profiles. Update user information message (1312) may comprise data from element product data message (1311*a*), from SKU data message (1309), and more. For example, update user information message (1312) may comprise user ID, seller, user location, timestamp, SKU label data, product or service data, and more.

User information query (1313) may be sent to retrieve user shopping profile message (1314) from users database (1305). An exemplary element user information query (1313) may be similar to exemplary element user information query (1221). User information query may comprise a user ID, a timestamp and more. User shopping profile message (1314) may comprise all or part of the information associated to user (1301) present in users database (1305), and may also include data from SKU data message (1309), a list of recently scanned SKU labels, a list of recently visited stores, and more. An exemplary element user shopping profile message (1314) may be similar to exemplary element user shopping profile message (1222).

Merchant offer query (1315) may comprise data such as user's position, speed, altitude, demographic data, data from recently scanned SKU labels, recent searches by user for products or services, and more from user shopping profile message (1314). An exemplary element merchant offer query (1315) may be similar to exemplary element merchant offer query (1223). Merchant offers database (1306) may store information as described in merchant offers database (1209). Merchant offer message (1316) may comprise details of the offer(s) to be made to user, for example, discount rate, validity terms, validity period, products or services included, possibility of sharing or distributing, incentives for publicizing the offer(s), and more. An exemplary element merchant offer message (1316) may be similar to exemplary element merchant offer message (1224).

Details of the offer(s) may be included in element update merchant offers information message (1317), such as offer(s) ID(s), target user ID, a timestamp, validity terms, products or services offered, the discount, and more. An exemplary element update merchant offers information message (1317) may be similar to exemplary element update merchant offers information message (1225). Merchant sent offers database (1307) may be updated with the information in element update merchant offers information message (1317). Merchant sent offers database (1307) may store offers generated by a merchant.

Offer generation server (1303) may invoke offer generation component (1318) for generating offer message (1319). Offer message (1319) may include details of the offer(s), but may also comprise text, images, sounds, videos, animations and effects to be displayed, and information relative to the graphical depiction of the offer(s), how visual components are to be rendered and the level of interaction with user and social media options. Offer message (1319) may also include interactive games. An exemplary element offer message (1319) may be similar to exemplary element initial offer message (1227). User device (1302) may receive offer message (1319) and may display it.

User (1301) may provide a response to offer message (1319), e.g., in user response to offer (1320). Offer generation server (1303) may receive offer response message (1322) from user device (1302). Offer response message (1322) may comprise data such as: offer(s) response, user ID, offer(s) ID(s), timestamp, time to response, user position, speed and altitude, merchant generating the offer(s), and more.

Figure 26:
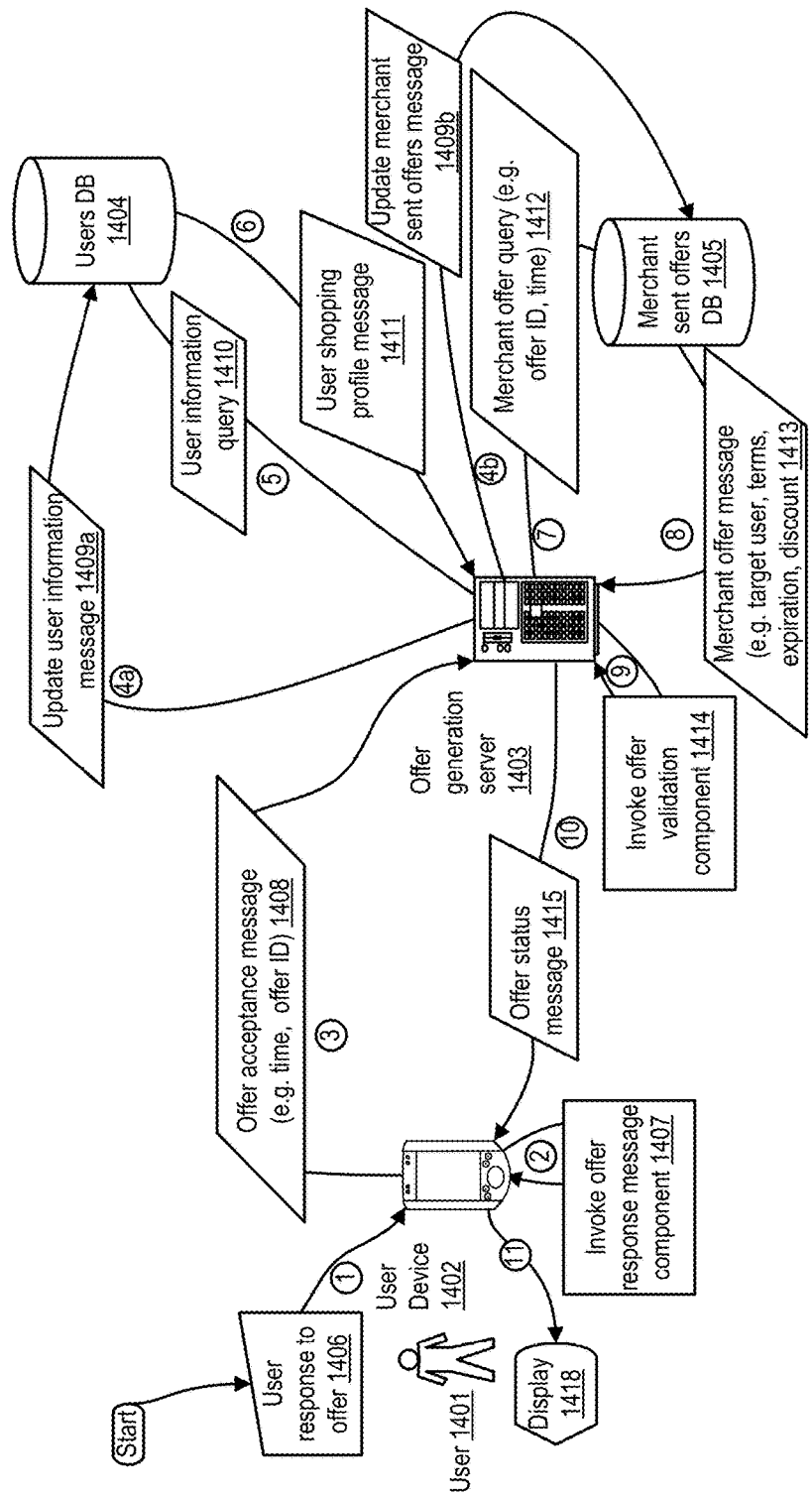
FIG. 26 shows a data flow diagram illustrating an example of the SHOPPING PROXIMITY REVISALS process for a user answering to an offer.

FIG. 26 shows a data flow diagram illustrating an example of the SHOPPING PROXIMITY REVISALS process after the acceptance of an offer(s) by a user. User (1401) may use user device (1402) to respond to an offer(s) message(s) by providing input user response to offer (1406).

User device (1402) may invoke offer response message component (1407). User response to offer (1406) may be used by user device (1402) to generate offer acceptance message (1408) which may comprise answer(s) to offer(s), user ID, offer(s) ID(s), timestamp(s), user location, seller, seller location, merchant that originated the offer(s), and more. Offer generation server (1403) may receive offer acceptance message (1408). Users database (1404) may be updated with update user information message (1409a). Users database (1404) may store user shopping profiles, and more. Update user information message (1409a) may comprise data from offer acceptance message (1408), and more. An exemplary element update user information message (1409a) may be similar to exemplary element update user information (1220). For example, update user information message (1409a) may comprise offer(s) response(s), user ID, offer(s) ID(s), timestamp, time to response, user position, speed and altitude, merchant generating the offer(s), product or service data, list of purchased goods or services, and more. Merchant sent offers database (1405) may be updated with update merchant sent offers message (1409b). Merchant sent offers database (1405) may store details about the accepted offers, and more. Update merchant sent offers message (1409b) may comprise data from offer acceptance message (1408), and more. An exemplary element update merchant sent offers message (1409b) may be similar to exemplary element update user information (1409a). For example, update merchant sent offers message (1409b) may comprise offer(s) response(s), user ID, offer(s) ID(s), timestamp, time to response, user position, speed and altitude, merchant generating the offer(s), product or service data, list of purchased goods or services, and more. The data may be used by the merchant or other entities for analysis and to generate statistics about the offers.

User information query (1410) may be sent by Offer generation server (1403) to retrieve user shopping profile message (1411) from users database (1404). User information query may comprise a user ID and a timestamp. An exemplary element user information query (1410) may be similar to exemplary element user information query (1221). User shopping profile message (1411) may comprise all or part of the information associated to user present in users database (1404) and may comprise data from offer acceptance message (1408) and more. An exemplary element user shopping profile message (1411) may be similar to exemplary element user shopping profile message (1222). User shopping profile message (1411) may also comprise a list of offers made to user, and information relative to those offers, for example, offer(s) ID(s), offer(s) timestamp(s), offer(s) terms, and information relative to the relative user response(s).

Merchant offer query (1412) may include data such as user ID, offer(s) ID(s), timestamp. An exemplary element merchant offer query (1412) may be similar to exemplary element merchant offer query (1223). Merchant sent offers database (1405) may hold information as described in merchant sent offers database (1210). Merchant offer message (1413) may comprise details of the offer(s) accepted by user, for example, discount rate, validity terms, validity period, products or services included, possibility of sharing or distributing, incentives for publicizing the offer(s), and more. An exemplary element merchant offer message (1413) may be similar to exemplary element merchant offer message (1224). Offer generation server (1403) may then invoke offer validation component (1414). Offer generation server (1403) may compare the data in user shopping profile message (1411) with the information in merchant offer message (1413), and may determine if the acceptance of the offer(s) is valid. For example, if the user's acceptance was too late, or outside a limit distance from the merchant location, or violated any of the terms and conditions in the offer(s), the offer(s) validation may fail. If all the terms and conditions in the offer(s) are respected, then the offer(s) validation may succeed.

Offer status message (1415) may comprise the result of the offer validation component, data describing the reason for failure, if necessary, and details of the offer(s), but may also comprise text, images, sounds, videos, animations and effects to be displayed, and information relative to the graphical depiction of the offer(s) status message, how visual components are to be rendered and the level of interaction with user and social media options. Offer status message (1415) may also include interactive games. User device (1402) may receive offer status message (1415) and may display it.

Figure 27:
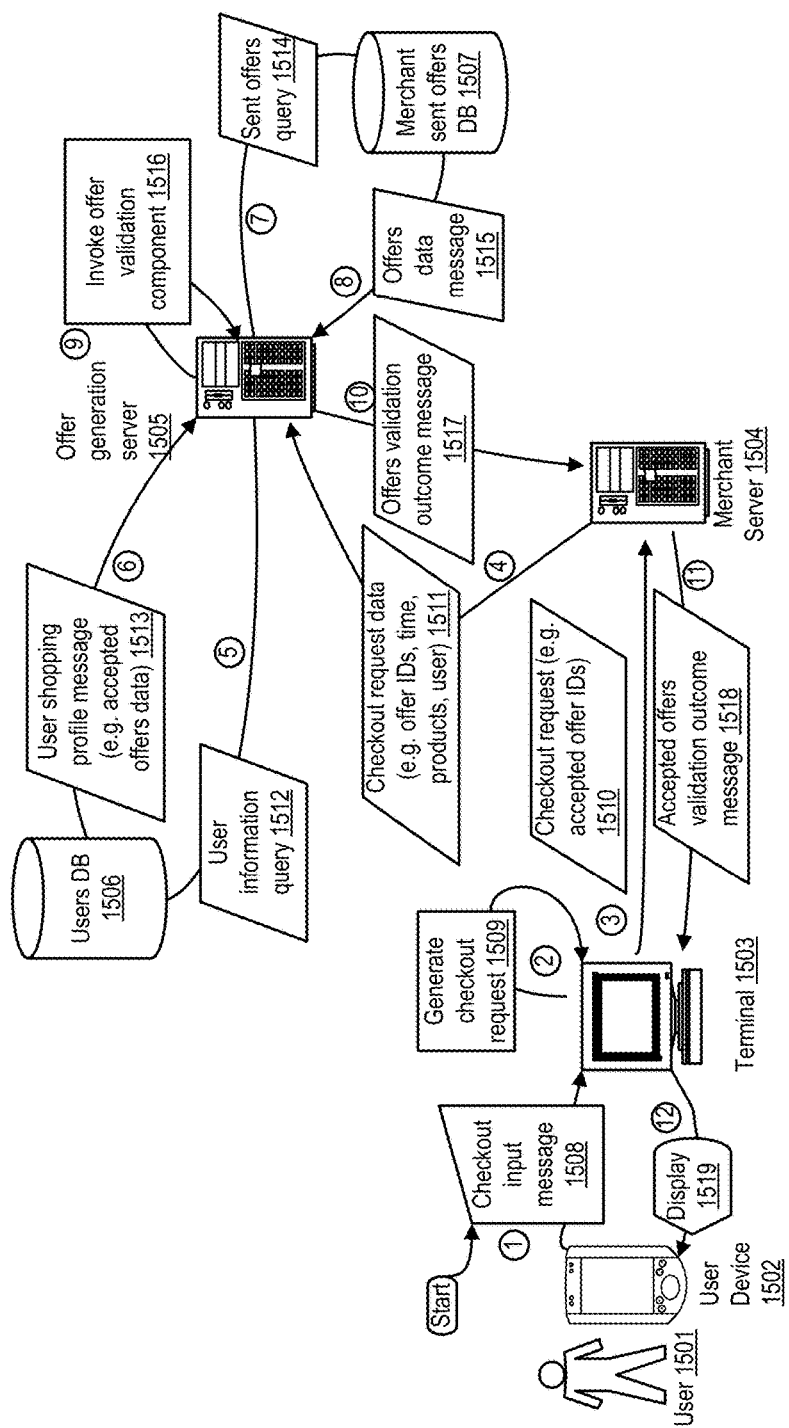
FIG. 27 shows a data flow diagram illustrating an example of SHOPPING PROXIMITY REVISALS checkout process for products or services with accepted offers.

FIG. 27 shows a data flow diagram illustrating an example of the SHOPPING PROXIMITY REVISALS check out process for items purchased accepting an offer. User (1501) may use user device (1502) to provide checkout input message (1508) to terminal (1503). Terminal (1503) may be a point of sale at a merchant location, a computer, or the equivalent. Checkout input message (1508) may comprise data describing a list of services and/or products, some of which may be associated to an offer(s) generated by SHOPPING PROXIMITY REVISALS. For example, the user device may provide a (Secure) Hypertext Transfer Protocol (HTTP(S)) POST message including the product and merchant details in the form of data formatted according to the eXtensible Markup Language (XML). Below is an example HTTP(S) POST checkout input message (1508) substantially in the form of an XML-formatted message:

```
GET /checkout.php HTTP/1.1
  Host: www.SPR.com
  Content-Type: Application/XML
```

-continued

```
Content-Length: 848
<?XML version = "1.0" encoding = "UTF-8"?>
<checkout_input_message>
    <order_ID>4NFU4RG94</order_ID>
    <timestamp>2023-02-22 15:22:43</timestamp>
    <user_ID>1234abc6789</user_ID>
    <account_name>John Q. Public</account_name>
    <merchant_name>BestBuy</merchant_name>
    <merchant_position>40.7692° N, 73.9733°
W</merchant_position>
    <password>supersecret</password>
    <digital_cert>456-873</digital_cert>
    <client_details>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
    </client_details>
    <purchase_details>
    <merchant>Best Buy</merchant>
    <num_products>1</num_products>
    <offer_ID>123563</offer_ID>
    <offer_accep_time>2023-02-22
15:22:32</offer_accep_time>
    <offer_accep_position>40.7691° N, 73.9734°
W</offer_accep_position>
    <product>
    <product_type>book</product_type>
    <product_params>
    <product_title>XML for dummies</product_title>
    <ISBN>938-2-14-168710-0</ISBN>
    <edition>2nd ed.</edition>
    <cover>hardbound</cover>
    </product_params>
    <quantity>1</quantity>
    </product>
    </purchase_details>
</checkout_input_message>
```

Terminal (1503) may invoke generate checkout request (1509) to generate checkout request (1510). Checkout request (1510) may comprise a list of products or services identified for example by SKU label data, serial numbers, unique IDs or more, and also may comprise a list of offers and associated data, for example answer(s) to offer(s), user ID, offer(s) ID(s), timestamp(s), merchant that originated the offer(s), or more. Merchant server (1504) may receive checkout request (1510).

Merchant server (1504) may send checkout request data (1511) to offer generation server (1505). Checkout request data (1511) may comprise, for example, for each offer listed in checkout request (1510), offer(s) ID(s), user ID, timestamp(s), merchant, merchant location, and may also comprise a list of the products or services to check out. Checkout request data (1511) may also comprise data from checkout input message (1508), for example a timestamp. User information query (1512) may be sent to retrieve user shopping profile message (1513) from users database (1506). User information query (1512) may comprise a user ID, a timestamp, and a list of offer(s) ID(s). An exemplary element user information query (1512) may be similar to exemplary element user information query (1221). User shopping profile message (1513) may comprise all or part of the information associated to user stored in users database (1506) and may also comprise data associated with the offer(s) ID(s) in user information query (1512), for example offer timestamp, offer terms, and information relative to the associated user response. An exemplary element user shopping profile message (1513) may be similar to exemplary element user shopping profile message (1222).

In some embodiments, offer generation server (1505) may send sent offers query (1514) to element merchant sent offers database (1507) to obtain element offers data message (1515). Sent offers query (1514) may comprise data from checkout request data (1511), such as offer(s) ID(s), user ID, timestamp, merchant, merchant location, and may also comprise a list of the products or services to check out. Merchant sent offers database (1507) may store offers generated by merchant(s). Offers data message (1515) may comprise data describing the offers in checkout request data (1511), for example offer(s) ID(s), target user ID, time, validity terms, products or services offered, discount, and more. An exemplary element offers data message (1515) may be similar to exemplary element merchant offer message (1224).

Offer generation server (1505) may invoke offer validation component (1516). Offer generation server (1505) may compare data in user shopping profile message (1513) with data in offers data message (1515) to determine for each offer if the terms and conditions are met. For example, a comparison may be done between the timestamp of the offer acceptance or of checkout input message (1508) and a time limit for accepting the offer. In another example, a comparison may be done on minimum quantities requirements in an offer and the list of items or services for checkout. Offer generation server (1505) may send offer validation outcome message (1517) to merchant server (1504). Offer validation outcome message (1517) may comprise data representing the outcome of offer validation component (1516), for example, offer(s) ID(s), validation outcome, discount, user ID, and more. Below is an example HTTP(S) POST offer validation outcome message (1517) message substantially in the form of an XML-formatted message:

```
POST /offer_validation_outcome.php HTTP/1.1
Host: www.SPR.com
Content-Type: Application/XML
Content-Length: 1034
<?XML version = "1.0" encoding = "UTF-8"?>
<offers_validation_outcome_message>
<general_info>
<timestamp> 2032-05-25 19:13:23 <timestamp>
    <checkout_request_data_ID> 35HFT35879SHDT <
checkout_request_data_ID>
    <offers_validation_outcome_ID> DHFT57382EHS
<offer_validation_outcome_ID>
    <user_ID> WHE3754IDS <user_ID>
    </general_info>
    <offers_validation_outcome_message_details>
    <outcome_offer_1>
    <validated_offer_ID> EJDY385701 </validated_offer_ID>
    <validation_outcome> Valid </validation_outcome>
    <Invalidation_code> n.a. </Invalidation_code>
    <Invalidation_short_explanation> n.a.
</Invalidation_short_explanation>
    <second_chance_offer> n.a. </second_chance_offer>
    </outcome_offer_1>
    <outcome_offer_2>
    <validated_offer_ID> EJK3856AGST </validated_offer_ID>
    <validation_outcome> Invalid </validation_outcome>
    <Invalidation_code> ND3753 </Invalidation_code>
    <Invalidation_short_explanation> Offer expired
</Invalidation_short_explanation>
    <second_chance_offer> No </second_chance_offer>
    </outcome_offer_2>
    <outcome_offer_3>
    <validated_offer_ID> UEGD375463 </validated_offer_ID>
    <validation_outcome> Invalid </validation_outcome>
    <Invalidation_code> SHD4786 </Invalidation_code>
    <Invalidation_short_explanation> Minimum quantity not
reached </Invalidation_short_explanation>
```

-continued

```
   <second_chance_offer> Yes </second_chance_offer>
   </outcome_offer_3>
  </offer_validation_outcome_message_details>
 </offers_validation_outcome_message>
```

Merchant server (1504) may generate accepted offers validation outcome message (1518), which may comprise data from offers validation outcome message (1517), details of the offer(s), and more, for example text, images, sounds, videos, animations and effects to be displayed, and information relative to the graphical depiction of the offer(s), how visual components are to be rendered and the level of interaction with user and social media options. Terminal (1503) may receive accepted offers validation outcome message (1518) and may transmit it to user device for display to user, e.g. display element (1519).

Figure 28:
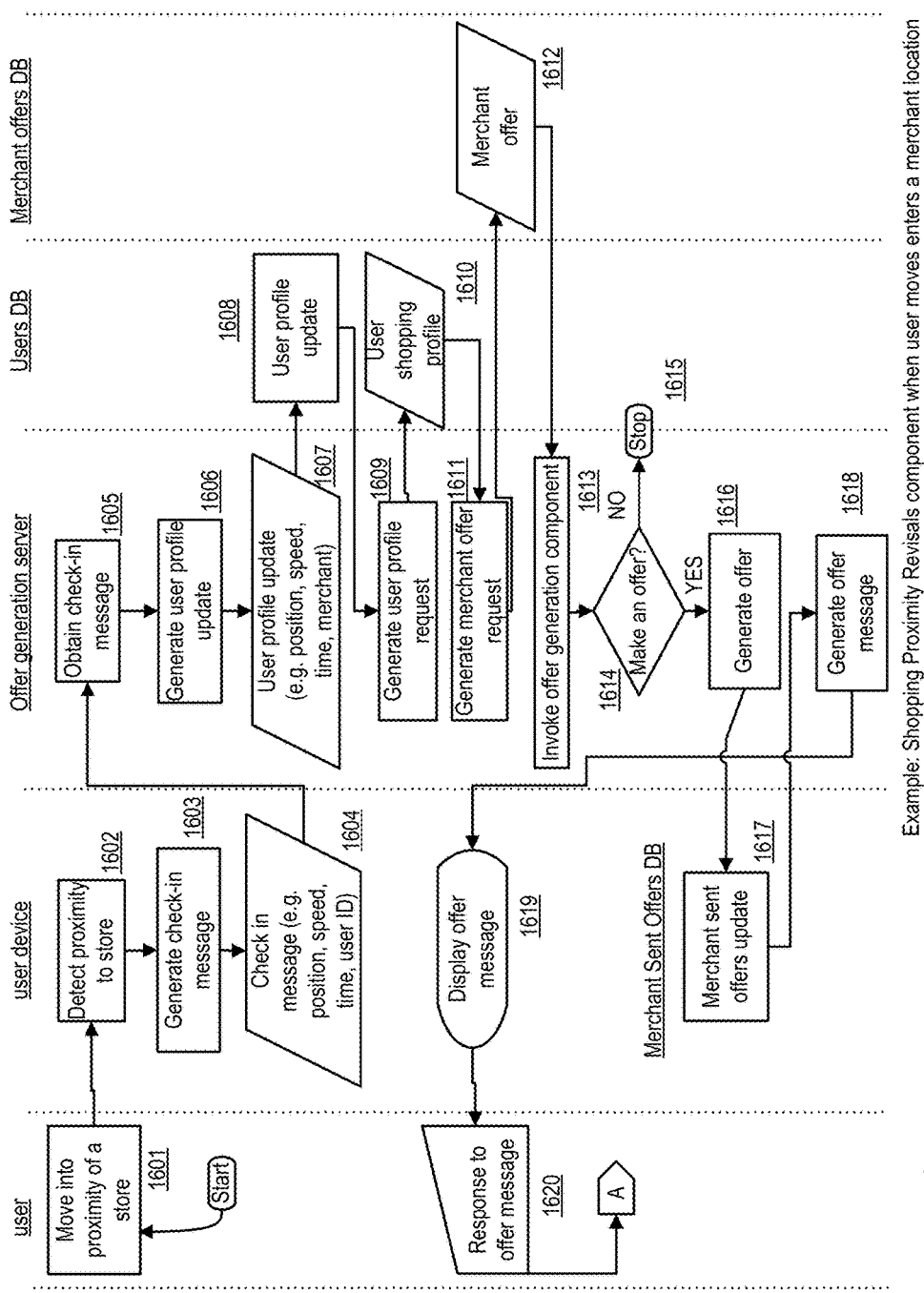
FIG. 28 shows a logic flow diagram illustrating an example of SHOPPING PROXIMITY REVISALS component (SPR) when a user enters a merchant location proximity.

FIG. 28 shows a logic flow diagram illustrating an example of the SHOPPING PROXIMITY REVISALS reacting to a user entrance into a merchant location proximity. A user may move into proximity of a store in (1601), and in some embodiments a user device may detect the proximity to the store, e.g., (1602). The user device may then generate a check-in message, e.g., (1603), and in some embodiments check-in message (1604) may include data such as user ID, user position, speed and altitude, timestamp, recent shopping activity, and more, and may also include data on the merchants the user is in proximity of, or a selection of merchants by the user.

In some embodiments an offer generation server may receive the check-in message, e.g., (1605), and may generate a user profile update, e.g., (1606). In some embodiments user profile update (1607) may contain data from check in message (1604), for example user's position, speed, selected merchants, check-in timestamp, or more. Users database may update the user shopping profile, e.g., (1608), with information from user profile update (1607). In some embodiments users database may store user shopping profiles and more information. In some embodiments offer generation server may generate a user profile request (1609) for obtaining user shopping profile (1610) from users database. A user profile request may comprise a user ID, a timestamp, or more. User shopping profile (1610) may comprise all or part of the information associated to user stored in users database, and may also include data from check-in message (1604).

Offer generation server may generate a merchant offer request, e.g., (1611), which may include data such as user's position, distance, speed and more from user shopping profile (1610). Merchant offers database may return merchant offer (1612), which may comprise details of the offer(s) to be made to user, for example, discount rate, validity terms, validity period, products or services included, possibility of sharing or distributing, incentives for publicizing the offer(s), and more.

Offer generation server may invoke offer generation component (1613), and may determine if an offer(s) is to be made to user, e.g., (1614). In some embodiments offer generation server may also determine a true interest value, which may be used for defining the details of an offer.

In some embodiments, if offer generation server determines that an offer is not to be made, for example because the true interest value is lower than a threshold, or because the target user is not in a group of interest for the merchant, offer generation server might stop, e.g. (1615), and wait for new information to arrive.

In some embodiments, if offer generation server determines that an offer(s) is to be made, it may generate the offer(s), e.g., (1616). The generated offer(s) may comprise, for example, user ID, offer(s) ID(s), discount rate, validity terms, validity period, products or services included, possibility of sharing or distributing, incentives for publicizing the offer(s), and more. The details of the offer(s) may be sent to merchant sent offers database. Details may include, for example, the offer(s) ID(s), the target user ID, the time, the validity terms, the products or services offered, the discount, and more. Merchant sent offers database may be updated with the information on the new offer(s), e.g., (1617).

Offer generation server may generate the offer message, e.g., (1618). In some embodiments, the offer message may include details of the offer(s), but may also comprise text, images, sounds, videos, animations and effects to be displayed, and information relative to the graphical depiction of the offer(s), how visual components are to be rendered and the level of interaction with user and social media options. The offer(s) message may also include interactive games. User device may receive the offer(s) message and may display it to user, e.g., (1619). User may respond to the displayed offer(s) message, e.g., (1620).

Figure 29:
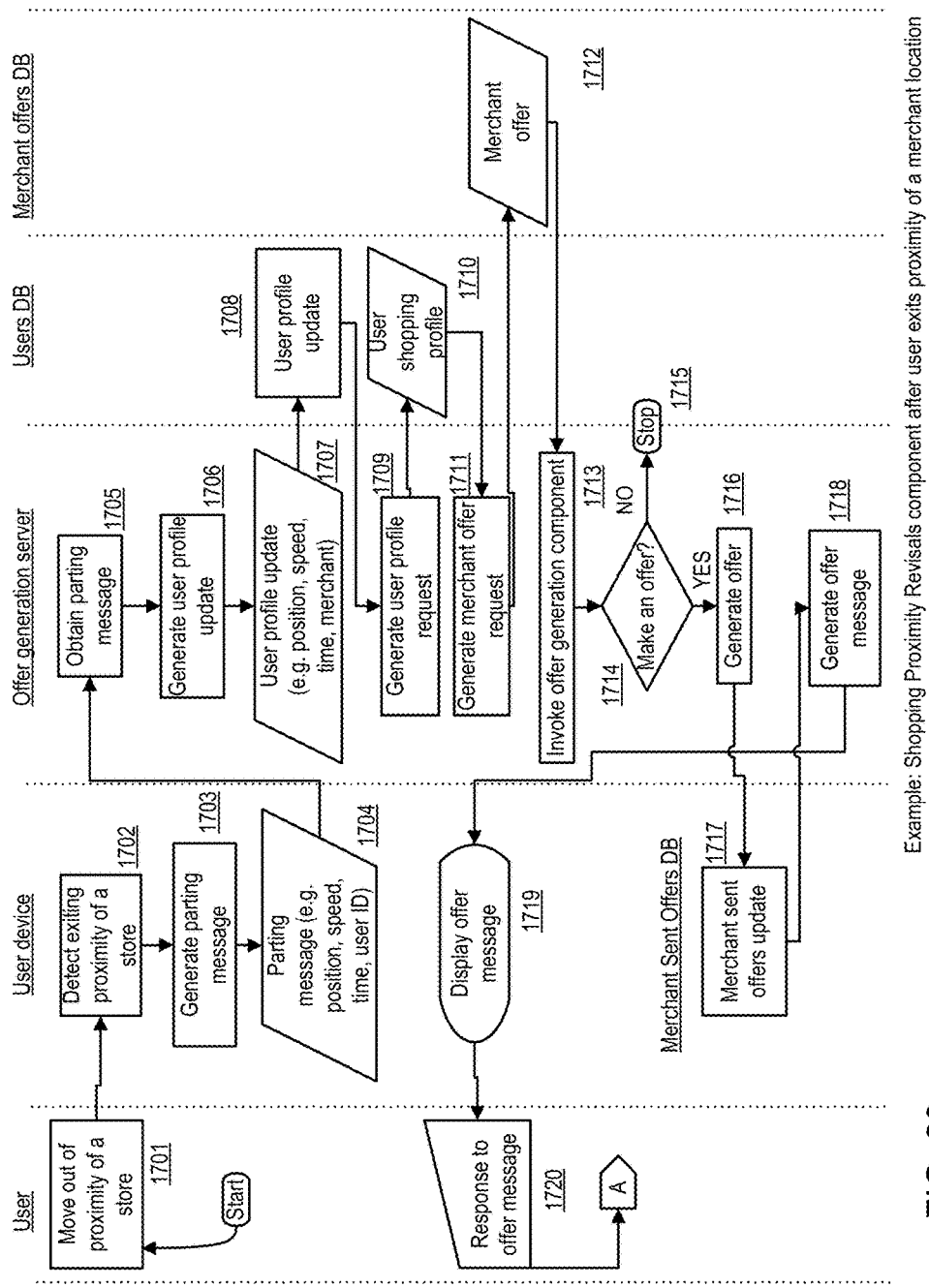
FIG. 29 shows a logic flow diagram illustrating an example of SHOPPING PROXIMITY REVISALS component when a user leaves a merchant location proximity.

FIG. 29 shows a logic flow diagram illustrating an example of the SHOPPING PROXIMITY REVISALS responding to a user departure from a merchant location proximity. A user may move out of the proximity of a store in (1701), and in some embodiments a user device may determine the departure, e.g., (1702). The user device may then generate a parting message, e.g., (1703), and in some embodiments parting message (1704) may include data such as user ID, user position, speed and altitude, a timestamp, user's recent shopping activity, and more, and may also comprise a list of merchants the user has exited the proximity of, is currently in the proximity of, or a selection of merchants by user.

In some embodiments offer generation server may receive the parting message, e.g., (1705), and may generate a user profile update, e.g., (1706). In some embodiments user profile update (1707) may contain data from parting message (1704), for example user's position, speed, exited merchant location proximity, selected merchants, parting timestamp, or more. Users database may update the user profile, e.g., (1708), with information from user profile update (1707). In some embodiments users database may hold the user shopping profile and more information. In some embodiments offer generation server may generate a user profile request (1709) for obtaining user shopping profile (1710) from users database. A user profile request may comprise a user ID, a timestamp, or more. User shopping profile (1710) may comprise all or part of the information associated to user stored in users database, and may also include data from parting message (1704).

Offer generation server may generate a merchant offer request, e.g., (1711), which may include data such as user's position, distance, speed and more from user shopping profile (1710). Merchant offers database may return merchant offer (1712), which may comprise details of the offer(s) to be made to user, for example, discount rate, validity terms, validity period, products or services included, possibility of sharing or distributing, incentives for publicizing the offer(s), and more.

Offer generation server may invoke offer generation component (1713), and may determine if an offer(s) is to be made to user, e.g., (1714). In some embodiments offer generation server may determine a true interest value.

In some embodiments, if offer generation server determines that an offer is not to be made, offer generation server might stop and wait for new information to arrive, e.g. (1715).

In some embodiments, if offer generation server determines that an offer(s) is to be made, it may generate the offer(s), e.g., (1716). The generated offer(s) may comprise, for example, user ID, offer(s) ID(s), discount rate, validity terms, validity period, products or services included, possibility of sharing or distributing, incentives for publicizing the offer(s), and more. The details of the offer(s) may be sent to merchant sent offers database, for example the offer(s) ID(s), the target user ID, the time, the validity terms, the products or services offered, the discount, and more. Merchant sent offers database may be updated with the information on the new offer(s), e.g., (1717). Offer generation server may generate the offer message, e.g., (1718). In some embodiments, the offer message may include details of the offer(s), but may also comprise text, images, sounds, videos, animations and effects to be displayed, and information relative to the graphical depiction of the offer(s), how visual components are to be rendered and the level of interaction with user and social media options. The offer message may also include interactive games. User device may receive the offer message and may display it to user, e.g., (1719). User may respond to the displayed offer message, e.g., (1720).

Figure 30:
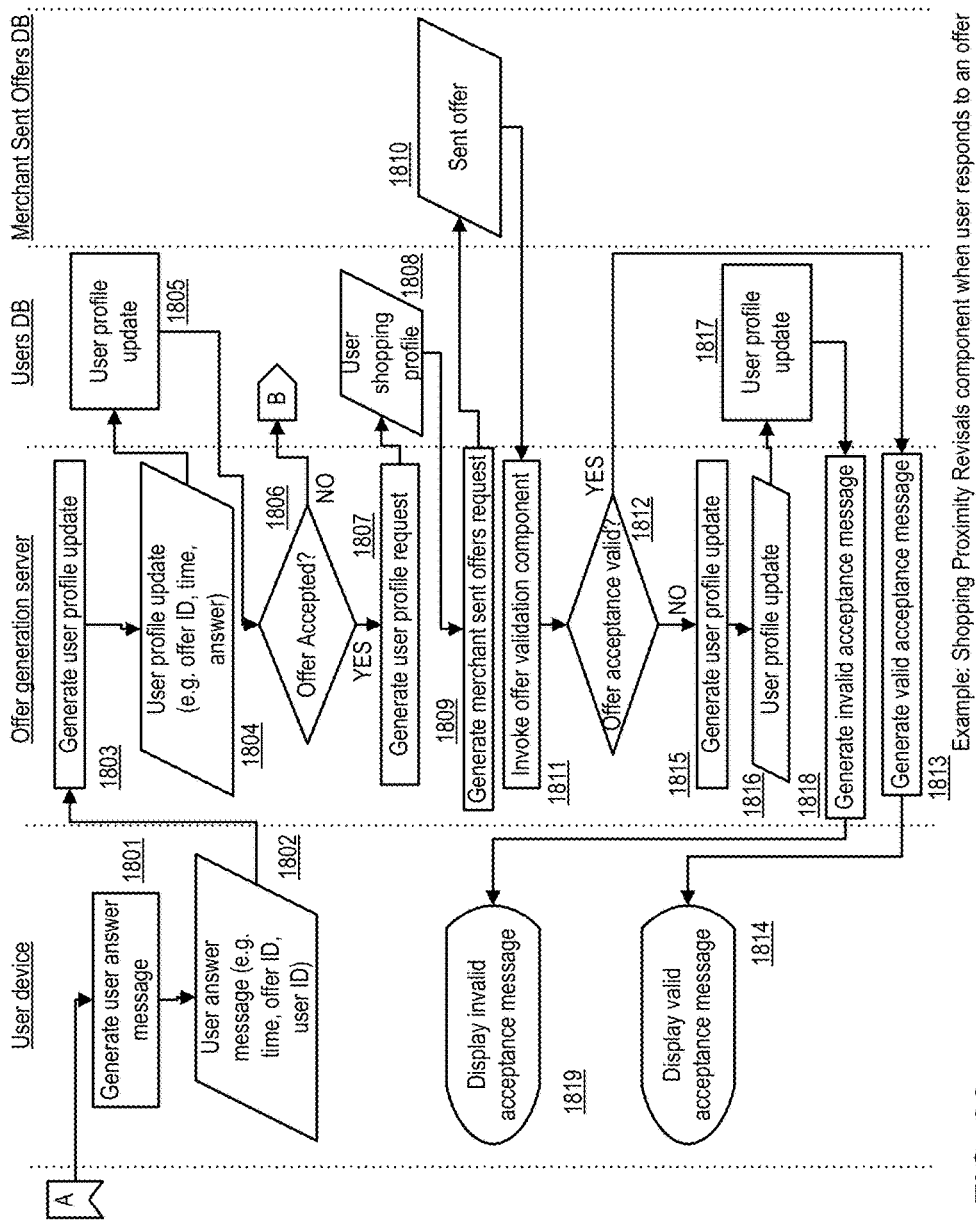
FIG. 30 shows a logic flow diagram illustrating an example of SHOPPING PROXIMITY REVISALS component when a user responds to an offer.

FIG. 30 shows a logic flow diagram illustrating an example of the SHOPPING PROXIMITY REVISALS responding to a user answer to an offer(s). A user may have responded to an offer(s) from SHOPPING PROXIMITY REVISALS. In some embodiments the user might have the options to accept, refuse or negotiate the offer(s). User device may generate a user answer message (1802) including the user input. User answer message (1802) may comprise the user answer to an offer(s), user ID, offer(s) ID(s), timestamp, user location, seller, seller location, merchant that originated the offer(s), and more.

User device may generate user answer message, e.g. (1801). Offer generation server may receive user answer message (1802) and may generate a user profile update, e.g., (1803). User profile update (1804) may comprise data from user answer message (1802), and more. Users database may update the user profile, e.g., (1805), with information from user profile update (1804). In some embodiments users database may store user shopping profiles and more information.

Offer generation server may determine if the offer(s) has been accepted, e.g., (1806). If the offer has been refused, offer generation server may continue as showed in FIG. 31. In some embodiments, if the offer has been accepted, offer generation server may generate a user profile request, e.g., (1807), for obtaining user shopping profile (1808) from users database. A user profile request may comprise a user ID, a timestamp, or more. User shopping profile (1808) may comprise all or part of the information associated to user stored in users database, and may also include data from user answer message (1802).

Offer generation server may generate a merchant sent offer request, e.g., (1809), which may include data such as accepted offer(s) ID(s), user ID, merchant that generated the offer(s), and more. Merchant sent offers database may return merchant sent offer (1810), which may comprise details of the offer(s) sent to user, for example, discount rate, validity terms, validity period, products or services included, possibility of sharing or distributing, incentives for publicizing the offer(s), and more.

In some embodiments offer generation server may invoke offer validation component (1811), and may determine if the acceptance of the offer is valid, e.g., (1812), by comparing the data in user shopping profile (1808) with the information in element sent offer (1810). For example, if the terms and conditions of the offer(s) are met, the offer(s) acceptance may be valid, if some terms or conditions are breached, the offer(s) acceptance may be invalid. As non limiting examples of invalidity, it may be that user replied to the offer(s) past the offer(s)'s expiration time, or that user failed to add to a virtual cart a required minimum quantity of a product, or that user did not share the offer(s) with a required minimum number of friends on a social media. In some embodiments, if the offer(s) acceptance is determined to be invalid, offer generation server may generate a user profile update, e.g., (1815). User profile update (1816) may comprise data from the determination of acceptance validity (1812), and more. Users database may update the user profile, e.g., (1817), with information from user profile update (1816). Offer generation server may generate a message to report the invalidity of the offer(s) acceptance, e.g., (1818). The invalid acceptance message may comprise user ID, offer(s) ID(s), merchant originating the offer(s), a timestamp, and more data, comprising information describing the outcome and reason(s) for failing offer acceptance validity check (1812). Invalid acceptance message may also comprise options for the user to remedy the deficiency or alternative offers. User device receives and displays invalid acceptance message, e.g., (1819).

In some embodiments, if the offer acceptance is determined to be valid, offer generation server may generate a message to report the validity of the offer acceptance, e.g., (1813). The valid acceptance message may comprise user ID, offer(s) ID(s), merchant originating the offer(s), a timestamp, options to publicize the offer(s), and more data, comprising information describing the outcome of acceptance validity check (1812). User device receives and displays valid acceptance message, e.g., (1814).

Figure 31:
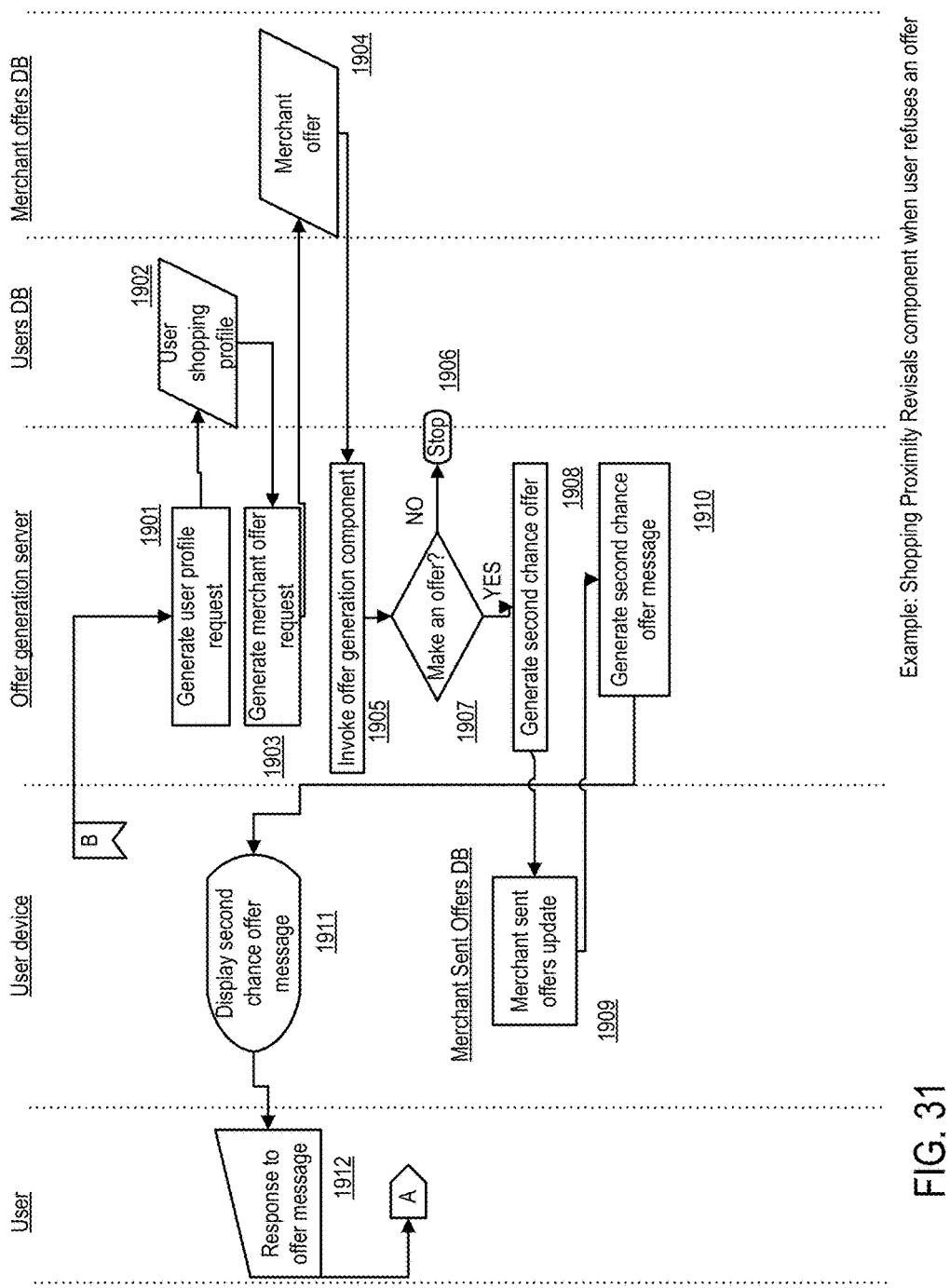
FIG. 31 shows a logic flow diagram illustrating an example of SHOPPING PROXIMITY REVISALS component when a user refuses an offer.

FIG. 31 shows a logic flow diagram illustrating an example of the SHOPPING PROXIMITY REVISALS process reacting to a user refusing an offer. A user may have refused an offer from SHOPPING PROXIMITY REVISALS. Offer generation server may determine if the offer has been refused, e.g., (1806). If the offer has been refused, offer generation server may generate a user profile request, e.g., (1901), for obtaining user shopping profile (1902) from users database. A user profile request may comprise a user ID, a timestamp, or more. User shopping profile (1902) may comprise all or part of the information associated to user present in users database, and may also include data from user answer message (1802).

In some embodiments, offer generation server may generate a merchant offer request, e.g., (1903), which may include data such as user's position, distance, speed, refused offers IDs and more from user shopping profile (1902). Merchant offers database may return merchant offer (1904), which may comprise details of a second chance offer to be made to user, for example, discount rate, validity terms, validity period, products or services included, possibility of sharing or distributing, incentives for publicizing the offer, and more.

Offer generation server may invoke offer generation component (1905), and may determine if an offer is to be made to user, e.g., (1907). In some embodiments offer generation server may determine a true interest value, and the value may be compared to a threshold for determining if an offer should be made.

In some embodiments, if offer generation server determines that an offer is not to be made, offer generation server might stop and wait for new information to arrive, e.g. (1906).

In some embodiments, if offer generation server determines that an offer(s) is to be made, it may generate a second chance offer(s), e.g., (1908). The generated offer(s) may comprise, for example, user ID, offer(s) ID(s), discount rate, validity terms, validity period, products or services included, possibility of sharing or distributing, incentives for publicizing the offer(s), and more. The details of the offer(s) may be sent to merchant sent offers database. Details may comprise, for example, offer(s) ID(s), target user ID, time, validity terms, products or services offered, discount, and more. Merchant sent offers database may be updated with information on second chance offer(s), e.g., (1909).

Offer generation server may generate a second chance offer message, e.g., (1910). In some embodiments, the offer message may include details of the offer(s), but may also comprise text, images, sounds, videos, animations and effects to be displayed, and information relative to the graphical depiction of the offer(s), how visual components are to be rendered and the level of interaction with user and social media options. The offer message may also include interactive games. User device may receive the offer message and may display it to user, e.g., (1911). User may respond to the displayed second chance offer message, e.g., (1912).

Figure 32:
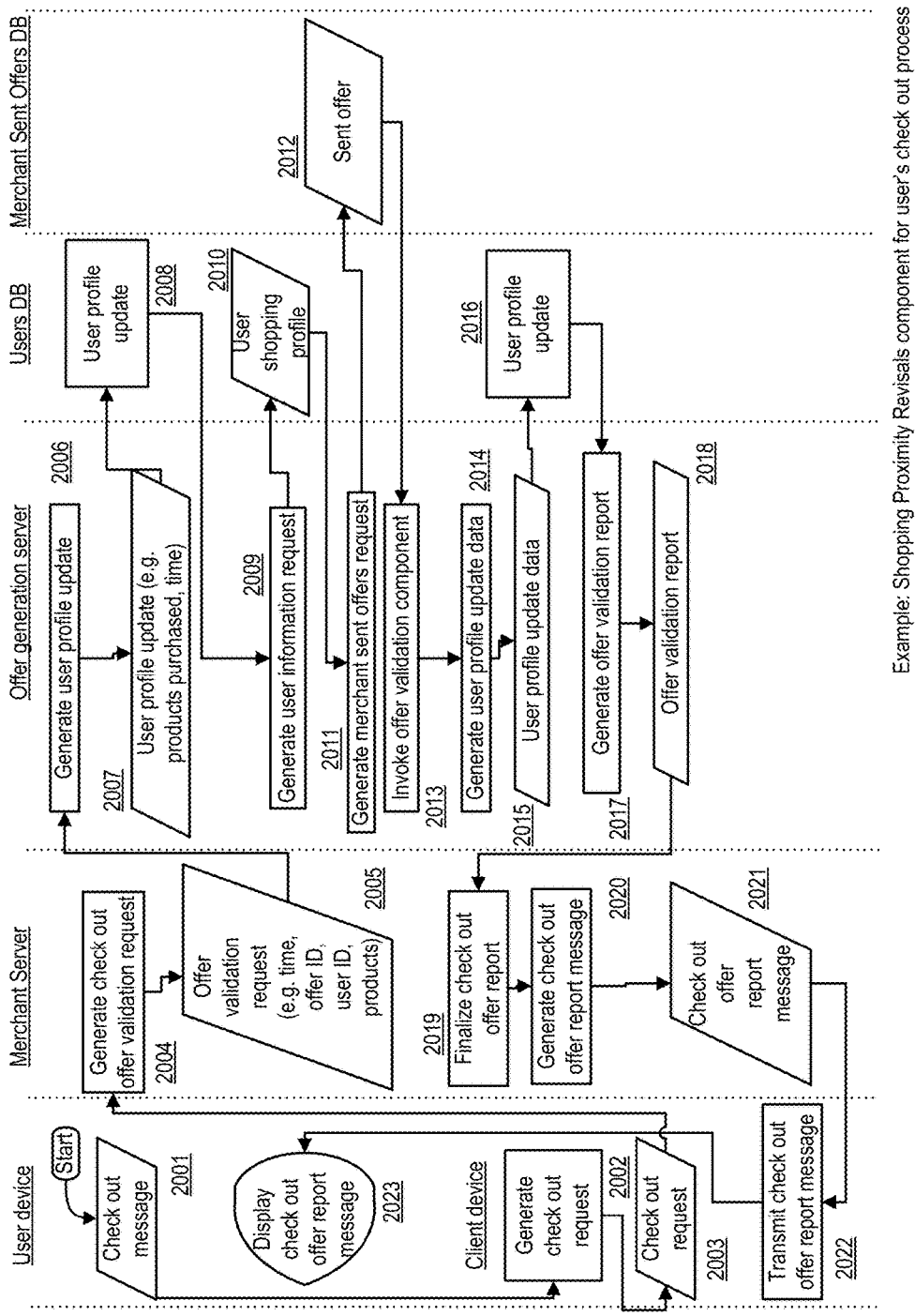
FIG. 32 shows a logic flow diagram illustrating an example of SHOPPING PROXIMITY REVISALS component when a user checks out at a merchant.

FIG. 32 shows a logic flow diagram illustrating an example of the SHOPPING PROXIMITY REVISALS check out process when there is at least one offer associated with the transaction. In some embodiments, user device may send a checkout message, e.g., (2001), to a client device, for example, a POS at a merchant location, a terminal or more. Check out message may comprise data such as user ID, timestamp, data describing the goods or services to be purchased, received offers IDs, and more. Client device may receive check out message (2001), and may generate a check out request, e.g., (2002). Check out request (2003) may comprise data from check out message (2001) and more data. For example, check out request (2003) may comprise a list of products or services identified, for example, by SKU label data, serial numbers, unique IDs or more, and may also comprise a list of offers and associated data, for example, answers to offers, user ID, offer(s) ID(s), timestamp, merchant that originated the offer(s), or more. Merchant server may receive checkout request (2003).

Merchant server might generate a checkout offer validation request, e.g., (2004). Offer validation request (2005) may comprise, for example, for each offer associated to checkout request (2003), offer ID, user ID, timestamp, merchant, merchant location, and may also comprise a list of the products or services to check out. Offer generation server may receive offer validation request (2005). In some embodiments, offer generation server may generate a user profile update, e.g., (2006). User profile update (2007) may include information from offer validation request (2005) and more, for example offer(s) ID(s), user ID, answers to offers, timestamp, merchant, merchant location, and may also comprise a list of the products or services to check out. Users database may be updated with information in user profile update (2007), e.g., (2008).

User information request (2009) may be generated by offer generation server to retrieve user shopping profile (2010) from users database. User shopping profile (2010) may comprise all or part of the information associated to user stored in users database and may comprise data associated with the offer(s) ID(s) in offer validation request (2005), for example offered product, offer(s) timestamp(s), offer(s) terms, and information relative to the associated user response(s).

In some embodiments, offer generation server may generate a merchant sent offers request, e.g., (2011), to obtain sent offer data, e.g., (2012). A merchant sent offers request may include information from offer validation request, from user shopping profile, such as user ID, offer(s) ID(s), timestamp(s), and more. Sent offer (2012) may comprise details of the offer(s) to user, for example, discount rate, validity terms, validity period, products or services included, possibility of sharing or distributing, incentives for publicizing the offer(s), and more.

In some embodiments, offer generation server may invoke offer validation component (2013). Offer validation component (2013) may compare data from user shopping profile (2010) and sent offer (2012) to determine if offers are valid or invalid, which may be done, for example, by verifying that the terms and conditions of the offers have been respected by user. User profile update data (2015) may be generated by offer generation server through element generate user profile update data (2014). User profile update data may contain information from sent offer (2012), user shopping profile (2010), and the outcome of the analysis in offer validation component (2013), for example, user ID, offer(s) ID(s), timestamp, outcome of offer(s) validation, and more.

Users database may be updated with information in user profile update data, e.g., (2016). Offer generation server may generate an offer validation report, e.g., (2017), and offer validation report may comprise information from user profile update data (2015), for example, user ID, offer(s) ID(s), timestamp, outcome of offer(s) validation, details and terms of the offer(s), and more.

In some embodiments merchant server may receive offer validation report (2018), then finalize check out offer report, e.g., (2019), for example, by calculating the discounted price(s) according to the validation report and the total amount to be paid by user, and then generate a check out offer report message, e.g., (2020). Check out offer report message (2021) may comprise data such as user ID, offer(s) ID(s), the discount for each valid offer, the total amount of the transaction, and more. Merchant server may transmit check out offer report message to client device, which sends the check out offer report message to user device, e.g., (2023). Client device may transmit the check out offer report message to the user device, e.g. (2022). User device may display the check out offer report message to user.

In one embodiment, SHOPPING PROXIMITY REVISALS Controller is implemented using a data processing system as illustrated in FIG. 7. For example, the memory (167) of the data processing system as illustrated in FIG. 7 can be configured with instructions programmed to aggregate, process, store, search, serve, identify, instruct, generate, match, and/or facilitate interactions with a computer through various technologies, and/or other related data. SHOPPING PROXIMITY REVISALS Controller can be implemented in the portal (143) in one embodiment.

Variations

Some embodiments use more or fewer components than those illustrated in FIGS. 1 and 4-7. For example, in one embodiment, the user specific profile (131) is used by a search engine to prioritize search results. In one embodiment, the correlator (117) is to correlate transactions with online activities, such as searching, web browsing, and social networking, instead of or in addition to the user specific advertisement data (119). In one embodiment, the correlator (117) is to correlate transactions and/or spending patterns with news announcements, market changes, events, natural disasters, etc. In one embodiment, the data to be correlated by the correlator with the transaction data (109) may not be personalized via the user specific profile (131) and may not be user specific. In one embodiment, multiple different devices are used at the point of interaction (107) for interaction with the user (101); and some of the devices may not be capable of receiving input from the user (101). In one embodiment, there are transaction terminals (105) to initiate transactions for a plurality of users (101) with a plurality of different merchants. In one embodiment, the account information (142) is provided to the transaction terminal (105) directly (e.g., via phone or Internet) without the use of the account identification device (141).

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

For example, in one embodiment, the entity operating the transaction handler (103) provides the intelligence (e.g., transaction profiles (127) or the user specific profile (131)) for the selection of the advertisement; and a third party (e.g., a web search engine, a publisher, or a retailer) may present the advertisement in a context outside a transaction involving the transaction handler (103) before the advertisement results in a purchase.

For example, in one embodiment, the customer may interact with the third party at the point of interaction (107); and the entity controlling the transaction handler (103) may allow the third party to query for intelligence information (e.g., transaction profiles (127), or the user specific profile (131)) about the customer using the user data (125), thus informing the third party of the intelligence information for targeting the advertisements, which can be more useful, effective and compelling to the user (101). For example, the entity operating the transaction handler (103) may provide the intelligence information without generating, identifying or selecting advertisements; and the third party receiving the intelligence information may identify, select and/or present advertisements.

Through the use of the transaction data (109), account data (111), correlation results (123), the context at the point of interaction, and/or other data, relevant and compelling messages or advertisements can be selected for the customer at the points of interaction (e.g., 107) for targeted advertising. The messages or advertisements are thus delivered at the optimal time for influencing or reinforcing brand perceptions and revenue-generating behavior. The customers receive the advertisements in the media channels that they like and/or use most frequently.

In one embodiment, the transaction data (109) includes transaction amounts, the identities of the payees (e.g., merchants), and the date and time of the transactions. The identities of the payees can be correlated to the businesses, services, products and/or locations of the payees. For example, the transaction handler (103) maintains a database of merchant data, including the merchant locations, businesses, services, products, etc. Thus, the transaction data (109) can be used to determine the purchase behavior, pattern, preference, tendency, frequency, trend, budget and/or propensity of the customers in relation to various types of businesses, services and/or products and in relation to time.

In one embodiment, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

The profile generator (121) may consolidate transaction data for a person having multiple accounts to derive intelligence information about the person to generate a profile for the person (e.g., transaction profiles (127), or the user specific profile (131)).

The profile generator (121) may consolidate transaction data for a family having multiple accounts held by family members to derive intelligence information about the family to generate a profile for the family (e.g., transaction profiles (127), or the user specific profile (131)).

Similarly, the profile generator (121) may consolidate transaction data for a group of persons, after the group is identified by certain characteristics, such as gender, income level, geographical location or region, preference, characteristics of past purchases (e.g., merchant categories, purchase types), cluster, propensity, demographics, social networking characteristics (e.g., relationships, preferences, activities on social networking websites), etc. The consolidated transaction data can be used to derive intelligence information about the group to generate a profile for the group (e.g., transaction profiles (127), or the user specific profile (131)).

In one embodiment, the profile generator (121) may consolidate transaction data according to the user data (125) to generate a profile specific to the user data (125).

Since the transaction data (109) are records and history of past purchases, the profile generator (121) can derive intelligence information about a customer using an account, a customer using multiple accounts, a family, a company, or other groups of customers, about what the targeted audience is likely to purchase in the future, how frequently, and their likely budgets for such future purchases. Intelligence information is useful in selecting the advertisements that are most useful, effective and compelling to the customer, thus increasing the efficiency and effectiveness of the advertising process.

In one embodiment, the transaction data (109) are enhanced with correlation results (123) correlating past advertisements and purchases resulting at least in part from the advertisements. Thus, the intelligence information can be more accurate in assisting with the selection of the advertisements. The intelligence information may not only indicate what the audience is likely to purchase, but also how likely the audience is to be influenced by advertisements for certain purchases, and the relative effectiveness of different forms of advertisements for the audience. Thus, the advertisement selector (133) can select the advertisements to best use the opportunity to communicate with the audience. Further, the transaction data (109) can be enhanced via other data elements, such as program enrollment, affinity programs, redemption of reward points (or other types of offers), online activities, such as web searches and web browsing, social networking information, etc., based on the account data (111) and/or other data, such as non-transactional data discussed in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the entity operating the transaction handler (103) provides the intelligence information in real-time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. patent application Ser. No. 12/683,802, filed Jan. 7, 2010 and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In one embodiment, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

In one embodiment, a "card-present" transaction involves physically presenting the account identification device (141), such as a financial transaction card, to the merchant (e.g., via swiping a credit card at a POS terminal of a merchant); and a "card-not-present" transaction involves presenting the account information (142) of the consumer account (146) to the merchant to identify the consumer account (146) without physically presenting the account identification device (141) to the merchant or the transaction terminal (105).

In one embodiment, certain information about the transaction can be looked up in a separate database based on other information recorded for the transaction. For example, a database may be used to store information about merchants, such as the geographical locations of the merchants, categories of the merchants, etc. Thus, the corresponding merchant information related to a transaction can be determined using the merchant ID (305) recorded for the transaction.

In one embodiment, the transaction records (301) may further include details about the products and/or services involved in the purchase. For example, a list of items purchased in the transaction may be recorded together with the respective purchase prices of the items and/or the respective quantities of the purchased items. The products and/or services can be identified via stock-keeping unit (SKU) numbers, or product category IDs. The purchase details may be stored in a separate database and be looked up based on an identifier of the transaction.

When there is voluminous data representing the transaction records (301), the spending patterns reflected in the transaction records (301) can be difficult to recognize by an ordinary person.

In one embodiment, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAICS) code, or a similarly standardized category code). In other embodiments, an area may be identified by a product category, a SKU number, etc.

In one embodiment, a variable of a same category (e.g., frequency (313) or amount (315)) is defined to be aggregated over a set of mutually exclusive areas. A transaction is classified in only one of the mutually exclusive areas. For example, in one embodiment, the spending frequency variables (313) are defined for a set of mutually exclusive merchants or merchant categories. Transactions falling with the same category are aggregated.

Examples of the spending frequency variables (313) and spending amount variables (315) defined for various merchant categories (e.g., 306) in one embodiment are provided in U.S. patent application Ser. No. 12/537,566, filed Aug. 7, 2009 and entitled "Cardholder Clusters," and in Prov. U.S. Pat. App. Ser. No. 61/182,806, filed Jun. 1, 2009 and entitled "Cardholder Clusters," the disclosures of which applications are hereby incorporated herein by reference.

In one embodiment, super categories (311) are defined to group the categories (e.g., 306) used in transaction records (301). The super categories (311) can be mutually exclusive. For example, each merchant category (306) is classified under only one super merchant category but not any other super merchant categories. Since the generation of the list of super categories typically requires deep domain knowledge about the businesses of the merchants in various categories, super categories (311) are not used in one embodiment.

In one embodiment, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

In one embodiment, the transaction records (301) are aggregated according to a buying entity. The aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular account (e.g., presented by the account number (302)) can be aggregated for an account level analysis. To aggregate the transaction records (301) in account level, the transactions with a specific merchant or merchants in a specific category are counted according to the variable definitions (309) for a particular account to generate a frequency measure (e.g., 313) for the account relative to the specific merchant or merchant category; and the transaction amounts (e.g., 304) with the specific merchant or the specific category of merchants are summed for the particular account to generate an average spending amount for the account relative to the specific merchant or merchant category. For example, the transaction records (301) for a particular person having multiple accounts can be aggregated for a person level analysis, the transaction records (301) aggregated for a particular family for a family level analysis, and the transaction records (301) for a particular business aggregated for a business level analysis.

The aggregation (317) can be performed for a predetermined time period, such as for the transactions occurring in the past month, in the past three months, in the past twelve months, etc.

In another embodiment, the transaction records (301) are aggregated according to a selling entity. The spending patterns at the selling entity across various buyers, products or services can be analyzed. For example, the transaction records (301) for a particular merchant having transactions with multiple accounts can be aggregated for a merchant level analysis. For example, the transaction records (301) for a particular merchant group can be aggregated for a merchant group level analysis.

In one embodiment, the aggregation (317) is formed separately for different types of transactions, such as transactions made online, offline, via phone, and/or "card-present" transactions vs. "card-not-present" transactions, which can be used to identify the spending pattern differences among different types of transactions.

In one embodiment, the variable values (e.g., 323, 324, . . . , 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

For example, a cluster analysis (329) can identify a set of clusters and thus cluster definitions (333) (e.g., the locations of the centroids of the clusters). In one embodiment, each entity ID (322) is represented as a point in a mathematical space defined by the set of variables; and the variable values (323, 324, . . . , 325) of the entity ID (322) determine the coordinates of the point in the space and thus the location of the point in the space. Various points may be concentrated in various regions; and the cluster analysis (329) is configured to formulate the positioning of the points to drive the clustering of the points. In other embodiments, the cluster analysis (329) can also be performed using the techniques of Self Organizing Maps (SOM), which can identify and show clusters of multi-dimensional data using a representation on a two-dimensional map.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

Similarities and differences among the entities, such as accounts, individuals, families, etc., as represented by the entity ID (e.g., 322) and characterized by the variable values (e.g., 323, 324, . . . , 325) can be identified via the cluster analysis (329). In one embodiment, after a number of clusters of entity IDs are identified based on the patterns of the aggregated measurements, a set of profiles can be generated for the clusters to represent the characteristics of the clusters. Once the clusters are identified, each of the entity IDs (e.g., corresponding to an account, individual, family) can be assigned to one cluster; and the profile for the corresponding cluster may be used to represent, at least in part, the entity (e.g., account, individual, family). Alternatively, the relationship between an entity (e.g., an account, individual, family) and one or more clusters can be determined (e.g., based on a measurement of closeness to each cluster). Thus, the cluster related data can be used in a transaction profile (127 or 341) to provide information about the behavior of the entity (e.g., an account, an individual, a family).

In one embodiment, more than one set of cluster definitions (333) is generated from cluster analyses (329). For example, cluster analyses (329) may generate different sets of cluster solutions corresponding to different numbers of identified clusters. A set of cluster IDs (e.g., 343) can be used to summarize (335) the spending behavior of the entity represented by the entity ID (322), based on the typical spending behavior of the respective clusters. In one example, two cluster solutions are obtained; one of the cluster solutions has 17 clusters, which classify the entities in a relatively coarse manner; and the other cluster solution has 55 clusters, which classify the entities in a relative fine manner. A cardholder can be identified by the spending behavior of one of the 17 clusters and one of the 55 clusters in which the cardholder is located. Thus, the set of cluster IDs corresponding to the set of cluster solutions provides a hierarchical identification of an entity among clusters of different levels of resolution. The spending behavior of the clusters is represented by the cluster definitions (333), such as the parameters (e.g., variable values) that define the centroids of the clusters.

In one embodiment, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In one embodiment, a factor analysis (327) is performed to reduce the redundancy and/or correlation among the variables (e.g., 313, 315). The factor analysis (327) identifies the definitions (331) for factors, each of which represents a combination of the variables (e.g., 313, 315).

In one embodiment, a factor is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In one example, hundreds or thousands of transaction records (301) of a cardholder are converted into hundreds or thousands of variable values (321) for various merchant categories, which are summarized (335) via the factor definitions (331) and cluster definitions (333) into twelve factor values (344) and one or two cluster IDs (e.g., 343). The summarized data can be readily interpreted by a human to ascertain the spending behavior of the cardholder. A user (101) may easily specify a spending behavior requirement formulated based on the factor values (344) and the cluster IDs (e.g., to query for a segment of customers, or to request the targeting of a segment of customers). The reduced size of the summarized data reduces the need for data communication bandwidth for communicating the spending behavior of the cardholder over a network connection and allows simplified processing and utilization of the data representing the spending behavior of the cardholder.

In one embodiment, the behavior and characteristics of the clusters are studied to identify a description of a type of representative entities that are found in each of the clusters. The clusters can be named based on the type of representative entities to allow an ordinary person to easily understand the typical behavior of the clusters.

In one embodiment, the behavior and characteristics of the factors are also studied to identify dominant aspects of each factor. The clusters can be named based on the dominant aspects to allow an ordinary person to easily understand the meaning of a factor value.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In one embodiment, the diversity index (342) may include an entropy value and/or a Gini coefficient, to represent the diversity of the spending by the entity represented by the entity ID (322) across different areas (e.g., different merchant categories (e.g., 306)). When the diversity index (342) indicates that the diversity of the spending data is under a predetermined threshold level, the variable values (e.g., 323, 324, . . . , 325) for the corresponding entity ID (322) may be excluded from the cluster analysis (329) and/or the factor analysis (327) due to the lack of diversity. When the diversity index (342) of the aggregated spending profile (341) is lower than a predetermined threshold, the factor values (344) and the cluster ID (343) may not accurately represent the spending behavior of the corresponding entity.

In one embodiment, the channel distribution (345) includes a set of percentage values that indicate the percentages of amounts spent in different purchase channels, such as online, via phone, in a retail store, etc.

In one embodiment, the category distribution (346) includes a set of percentage values that indicate the percentages of spending amounts in different super categories (311). In one embodiment, thousands of different merchant categories (e.g., 306) are represented by Merchant Category Codes (MCC), or North American Industry Classification System (NAICS) codes in transaction records (301). These merchant categories (e.g., 306) are classified or combined into less than one hundred super categories (or less than twenty). In one example, fourteen super categories are defined based on domain knowledge.

In one embodiment, the aggregated spending profile (341) includes the aggregated measurements (e.g., frequency, average spending amount) determined for a set of predefined, mutually exclusive merchant categories (e.g., super categories (311)). Each of the super merchant categories represents a type of products or services a customer may purchase. A transaction profile (127 or 341) may include the aggregated measurements for each of the set of mutually exclusive merchant categories. The aggregated measurements determined for the predefined, mutually exclusive merchant categories can be used in transaction profiles (127 or 341) to provide information on the behavior of a respective entity (e.g., an account, an individual, or a family).

In one embodiment, the zip code (347) in the aggregated spending profile (341) represents the dominant geographic area in which the spending associated with the entity ID (322) occurred. Alternatively or in combination, the aggregated spending profile (341) may include a distribution of transaction amounts over a set of zip codes that account for a majority of the transactions or transaction amounts (e.g., 90%).

In one embodiment, the factor analysis (327) and cluster analysis (329) are used to summarize the spending behavior across various areas, such as different merchants characterized by merchant category (306), different products and/or services, different consumers, etc. The aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters. The distance measures may be defined based on the variable values (323, 324, . . . , 325), or based on the factor values (344). The factor values of the centroids of the clusters may be estimated based on the entity ID (e.g., 322) that is closest to the centroid in the respective cluster.

Other variables can be used in place of, or in additional to, the variables (311, 313, 315) illustrated in FIG. 2. For example, the aggregated spending profile (341) can be generated using variables measuring shopping radius/distance from the primary address of the account holder to the merchant site for offline purchases. When such variables are used, the transaction patterns can be identified based at least in part on clustering according to shopping radius/distance and geographic regions. Similarly, the factor definition (331) may include the consideration of the shopping radius/distance. For example, the transaction records (301) may be aggregated based on the ranges of shopping radius/distance and/or geographic regions. For example, the factor analysis can be used to determine factors that naturally combine geographical areas based on the correlations in the spending patterns in various geographical areas.

In one embodiment, the aggregation (317) may involve the determination of a deviation from a trend or pattern. For example, an account makes a certain number of purchases a week at a merchant over the past 6 months. However, in the past 2 weeks the number of purchases is less than the average number per week. A measurement of the deviation from the trend or pattern can be used (e.g., in a transaction profile (127 or 341) as a parameter, or in variable definitions (309) for the factor analysis (327) and/or the cluster analysis) to define the behavior of an account, an individual, a family, etc.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353). For example, when an account number change has occurred for a cardholder in the time period under analysis, the transaction records (301) under the different account numbers of the same cardholder are combined under one account number that represents the cardholder. For example, when the analysis is performed at a person level (or family level, business level, social group level, city level, or region level), the transaction records (301) in different accounts of the person (or family, business, social group, city or region) can be combined under one entity ID (322) that represents the person (or family, business, social group, city or region).

In one embodiment, recurrent/installment transactions are combined (355). For example, multiple monthly payments may be combined and considered as one single purchase.

In FIG. 3, account data are selected (357) according to a set of criteria related to activity, consistency, diversity, etc.

For example, when a cardholder uses a credit card solely to purchase gas, the diversity of the transactions by the cardholder is low. In such a case, the transactions in the account of the cardholder may not be statistically meaningful to represent the spending pattern of the cardholder in various merchant categories. Thus, in one embodiment, if the diversity of the transactions associated with an entity ID (322) is below a threshold, the variable values (e.g., 323, 324, . . . , 325) corresponding to the entity ID (322) are not used in the cluster analysis (329) and/or the factor analysis (327). The diversity can be examined based on the diversity index (342) (e.g., entropy or Gini coefficient), or based on counting the different merchant categories in the transactions associated with the entity ID (322); and when the count of different merchant categories is fewer than a threshold (e.g., 5), the transactions associated with the entity ID (322) are not used in the cluster analysis (329) and/or the factor analysis (327) due to the lack of diversity.

For example, when a cardholder uses a credit card only sporadically (e.g., when running out of cash), the limited transactions by the cardholder may not be statistically meaningful in representing the spending behavior of the cardholder. Thus, in one embodiment, when the numbers of transactions associated with an entity ID (322) is below a threshold, the variable values (e.g., 323, 324, . . . , 325) corresponding to the entity ID (322) are not used in the cluster analysis (329) and/or the factor analysis (327).

For example, when a cardholder has only used a credit card during a portion of the time period under analysis, the transaction records (301) during the time period may not reflect the consistent behavior of the cardholder for the entire time period. Consistency can be checked in various ways. In one example, if the total number of transactions during the first and last months of the time period under analysis is zero, the transactions associated with the entity ID (322) are inconsistent in the time period and thus are not used in the cluster analysis (329) and/or the factor analysis (327). Other criteria can be formulated to detect inconsistency in the transactions.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109). For example, factor definitions (331) can be applied to the transactions in the time period under analysis (e.g., the past twelve months) and be applied separately to the transactions in a prior time period (e.g., the twelve months before the past twelve months) to obtain two sets of factor values. The factor definitions (331) can be adjusted to improve the correlation between the two set of factor values.

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

In one embodiment, the number of clusters is determined from clustering analysis. For example, a set of cluster seeds can be initially identified and used to run a known clustering algorithm. The sizes of data points in the clusters are then examined. When a cluster contains less than a predetermined number of data points, the cluster may be eliminated to rerun the clustering analysis.

In one embodiment, standardizing entropy is added to the cluster solution to obtain improved results.

In one embodiment, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Various tweaks and adjustments can be made for the variables (e.g., 313, 315) used for the factor analysis (327) and the cluster analysis (329). For example, the transaction records (301) may be filtered, weighted or constrained, according to different rules to improve the capabilities of the aggregated measurements in indicating certain aspects of the spending behavior of the customers.

For example, in one embodiment, the variables (e.g., 313, 315) are normalized and/or standardized (e.g., using statistical average, mean, and/or variance).

For example, the variables (e.g., 313, 315) for the aggregated measurements can be tuned, via filtering and weighting, to predict the future trend of spending behavior (e.g., for advertisement selection), to identify abnormal behavior (e.g., for fraud prevention), or to identify a change in spending pattern (e.g., for advertisement audience measurement), etc. The aggregated measurements, the factor values (344), and/or the cluster ID (343) generated from the aggregated measurements can be used in a transaction profile (127 or 341) to define the behavior of an account, an individual, a family, etc.

In embodiment, the transaction data (109) are aged to provide more weight to recent data than older data. In other embodiments, the transaction data (109) are reverse aged. In further embodiments, the transaction data (109) are seasonally adjusted.

In one embodiment, the variables (e.g., 313, 315) are constrained to eliminate extreme outliers. For example, the minimum values and the maximum values of the spending amounts (315) may be constrained based on values at certain percentiles (e.g., the value at one percentile as the minimum and the value at 99 percentile as the maximum) and/or certain predetermined values. In one embodiment, the spending frequency variables (313) are constrained based on values at certain percentiles and median values. For example, the minimum value for a spending frequency variable (313) may be constrained at $P_1-k\times(M-P_1)$, where $P_1$ is the one percentile value, M the median value, and k a predetermined constant (e.g., 0.1). For example, the maximum value for a spending frequency variable (313) may be constrained at $P_{99}+a\times(P_{99}-M)$, where $P_{99}$ is the 99 percentile value, M the median value, and k a predetermined constant (e.g., 0.1).

In one embodiment, variable pruning is performed to reduce the number of variables (e.g., 313, 315) that have less impact on cluster solutions and/or factor solutions. For example, variables with standard variation less than a predetermined threshold (e.g., 0.1) may be discarded for the purpose of cluster analysis (329). For example, analysis of variance (ANOVA) can be performed to identify and remove variables that are no more significant than a predetermined threshold.

The aggregated spending profile (341) can provide information on spending behavior for various application areas, such as marketing, fraud detection and prevention, creditworthiness assessment, loyalty analytics, targeting of offers, etc.

For example, clusters can be used to optimize offers for various groups within an advertisement campaign. The use of factors and clusters to target advertisement can improve the speed of producing targeting models. For example, using variables based on factors and clusters (and thus eliminating the need to use a large number of convention variables) can improve predictive models and increase efficiency of targeting by reducing the number of variables examined. The variables formulated based on factors and/or clusters can be used with other variables to build predictive models based on spending behaviors.

In one embodiment, the aggregated spending profile (341) can be used to monitor risks in transactions. Factor values are typically consistent over time for each entity. An abrupt change in some of the factor values may indicate a change in financial conditions, or a fraudulent use of the account. Models formulated using factors and clusters can be used to identify a series of transactions that do not follow a normal pattern specified by the factor values (344) and/or the cluster ID (343). Potential bankruptcies can be predicted by analyzing the change of factor values over time; and significant changes in spending behavior may be detected to stop and/or prevent fraudulent activities.

For example, the factor values (344) can be used in regression models and/or neural network models for the detection of certain behaviors or patterns. Since factors are relatively non-collinear, the factors can work well as independent variables. For example, factors and clusters can be used as independent variables in tree models.

For example, surrogate accounts can be selected for the construction of a quasi-control group. For example, for a given account A that is in one cluster, the account B that is closest to the account A in the same cluster can be selected as a surrogate account of the account B. The closeness can be determined by certain values in the aggregated spending profile (341), such as factor values (344), category distribution (346), etc. For example, a Euclidian distance defined based on the set of values from the aggregated spending profile (341) can be used to compare the distances between the accounts. Once identified, the surrogate account can be used to reduce or eliminate bias in measurements. For example, to determine the effect of an advertisement, the spending pattern response of the account A that is exposed to the advertisement can be compared to the spending pattern response of the account B that is not exposed to the advertisement.

For example, the aggregated spending profile (341) can be used in segmentation and/or filtering analysis, such as selecting cardholders having similar spending behaviors identified via factors and/or clusters for targeted advertisement campaigns, and selecting and determining a group of merchants that could be potentially marketed towards cardholders originating in a given cluster (e.g., for bundled offers). For example, a query interface can be provided to allow the query to identify a targeted population based on a set of criteria formulated using the values of clusters and factors.

For example, the aggregated spending profile (341) can be used in a spending comparison report, such as comparing a sub-population of interest against the overall population, determining how cluster distributions and mean factor values differ, and building reports for merchants and/or issuers for benchmarking purposes. For example, reports can be generated according to clusters in an automated way for the merchants. For example, the aggregated spending profile (341) can be used in geographic reports by identifying geographic areas where cardholders shop most frequently and comparing predominant spending locations with cardholder residence locations.

In one embodiment, the profile generator (121) provides affinity relationship data in the transaction profiles (127) so that the transaction profiles (127) can be shared with business partners without compromising the privacy of the users (101) and the transaction details.

For example, in one embodiment, the profile generator (121) is to identify clusters of entities (e.g., accounts, cardholders, families, businesses, cities, regions, etc.) based on the spending patterns of the entities. The clusters represent entity segments identified based on the spending patterns of the entities reflected in the transaction data (109) or the transaction records (301).

In one embodiment, the clusters correspond to cells or regions in the mathematical space that contain the respective groups of entities. For example, the mathematical space representing the characteristics of users (101) may be divided into clusters (cells or regions). For example, the cluster analysis (329) may identify one cluster in the cell or region that contains a cluster of entity IDs (e.g., 322) in the space having a plurality of dimensions corresponding to the variables (e.g., 313 and 315). For example, a cluster can also be identified as a cell or region in a space defined by the factors using the factor definitions (331) generated from the factor analysis (327).

In one embodiment, the parameters used in the aggregated spending profile (341) can be used to define a segment or a cluster of entities. For example, a value for the cluster ID (343) and a set of ranges for the factor values (344) and/or other values can be used to define a segment.

In one embodiment, a set of clusters are standardized to represent the predilection of entities in various groups for certain products or services. For example, a set of standardized clusters can be formulated for people who have shopped, for example, at home improvement stores. The cardholders in the same cluster have similar spending behavior.

In one embodiment, the tendency or likelihood of a user (101) being in a particular cluster (i.e. the user's affinity to the cell) can be characterized using a value, based on past purchases. The same user (101) may have different affinity values for different clusters.

For example, a set of affinity values can be computed for an entity, based on the transaction records (301), to indicate the closeness or predilection of the entity to the set of standardized clusters. For example, a cardholder who has a first value representing affinity of the cardholder to a first cluster may have a second value representing affinity of the cardholder to a second cluster. For example, if a consumer buys a lot of electronics, the affinity value of the consumer to the electronics cluster is high.

In one embodiment, other indicators are formulated across the merchant community and cardholder behavior and provided in the profile (e.g., 127 or 341) to indicate the risk of a transaction.

In one embodiment, the relationship of a pair of values from two different clusters provides an indication of the likelihood that the user (101) is in one of the two cells, if the user (101) is shown to be in the other cell. For example, if the likelihood of the user (101) to purchase each of two types of products is known, the scores can be used to determine the likelihood of the user (101) buying one of the two types of products if the user (101) is known to be interested in the other type of products. In one embodiment, a map of the values for the clusters is used in a profile (e.g., 127 or 341) to characterize the spending behavior of the user (101) (or other types of entities, such as a family, company, neighborhood, city, or other types of groups defined by other aggregate parameters, such as time of day, etc.).

In one embodiment, the clusters and affinity information are standardized to allow sharing between business partners, such as transaction processing organizations, search providers, and marketers. Purchase statistics and search statistics are generally described in different ways. For example, purchase statistics are based on merchants, merchant categories, SKU numbers, product descriptions, etc.; and search statistics are based on search terms. Once the clusters are standardized, the clusters can be used to link purchase information based merchant categories (and/or SKU numbers, product descriptions) with search information based on search terms. Thus, search predilection and purchase predilection can be mapped to each other.

In one embodiment, the purchase data and the search data (or other third party data) are correlated based on mapping to the standardized clusters (cells or segments). The purchase data and the search data (or other third party data) can be used together to provide benefits or offers (e.g., coupons) to consumers. For example, standardized clusters can be used as a marketing tool to provide relevant benefits, including coupons, statement credits, or the like to consumers who are within or are associated with common clusters. For example, a data exchange apparatus may obtain cluster data based on consumer search engine data and actual payment transaction data to identify like groups of individuals who may respond favorably to particular types of benefits, such as coupons and statement credits.

Details about aggregated spending profile (341) in one embodiment are provided in U.S. patent application Ser. No. 12/777,173, filed May 10, 2010 and entitled "Systems and Methods to Summarize Transaction Data," the disclosure of which is hereby incorporated herein by reference.

Transaction Data Based Portal

In FIG. 1, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

Over a period of time, the transaction handler (103) accumulates the transaction data (109) from transactions initiated at different transaction terminals (e.g., 105) for different users (e.g., 101). The transaction data (109) thus includes information on purchases made by various users (e.g., 101) at various times via different purchases options (e.g., online purchase, offline purchase from a retail store, mail order, order via phone, etc.)

In one embodiment, the accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

FIG. 4 shows a system to provide information based on transaction data (109) according to one embodiment. In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127) or aggregated spending profile (341). The portal (143) may be implemented as a web portal, a telephone gateway, a file/data server, etc.

In one embodiment, the portal (143) is configured to provide information, such as transaction profiles (127) to third parties. Further, the portal (143) may register certain users (101) for various programs, such as a loyalty program to provide rewards and/or offers to the users (101).

In one embodiment, the portal (143) is to register the interest of users (101), or to obtain permissions from the users (101) to gather further information about the users (101), such as data capturing purchase details, online activities, etc.

In one embodiment, the user (101) may register via the issuer; and the registration data in the consumer account (146) may propagate to the data warehouse (149) upon approval from the user (101).

In one embodiment, the portal (143) is to register merchants and provide services and/or information to merchants.

In one embodiment, the portal (143) is to receive information from third parties, such as search engines, merchants, web sites, etc. The third party data can be correlated with the transaction data (109) to identify the relationships between purchases and other events, such as searches, news announcements, conferences, meetings, etc., and improve the prediction capability and accuracy.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction records (301) or transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

In one embodiment, the portal (143) provides a user interface to allow the user (101) to organize the transactions in one or more consumer accounts (145) of the user with one or more issuers. The user (101) may organize the transactions using information and/or categories identified in the transaction records (301), such as merchant category (306), transaction date (303), amount (304), etc. Examples and techniques in one embodiment are provided in U.S. patent application Ser. No. 11/378,215, filed Mar. 16, 2006, assigned Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned Pub. No. 2009/0048884, and entitled "Merchant Benchmarking Tool," U.S. patent application Ser. No. 12/940,562, filed Nov. 5, 2010, and U.S. patent application Ser. No. 12/940, 664, filed Nov. 5, 2010, the disclosures of which applications are hereby incorporated herein by reference.

Transaction Terminal

FIG. 5 illustrates a transaction terminal according to one embodiment. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with the transaction terminal (105), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, etc., which may be in an electronic form, or in a printed or painted form). The advertisements may be presented on paper, on websites, on billboards, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the modules or components illustrated in FIGS. 1 and 4, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the modules or components illustrated in FIGS. 1 and 4, such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system illustrated in FIG. 7, with more or fewer components. Some of the modules may share hardware or be combined on a computer system. In one embodiment, a network of computers can be used to implement one or more of the modules.

Further, the data illustrated in FIG. 1, such as transaction data (109), account data (111), transaction profiles (127), and advertisement data (135), can be stored in storage devices of one or more computers accessible to the corresponding modules illustrated in FIG. 1. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The foregoing description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
providing a computing apparatus having:
a data warehouse storing information about products available from merchants and transaction data of users;
an artificial intelligence engine; and
a portal;
receiving, via the portal over a communication connection from a mobile device positioned in a retail location, identification information of a product disposed in the retail location;
determining, by the computing apparatus, a list of retail prices at a plurality of merchants for the product based on the information about products stored in the data warehouse;
communicating, by the computing apparatus via the portal to the mobile device, the list of retail prices to cause the mobile device to present the list to a user of the mobile device;
determining, by the computing apparatus based on the transaction data stored in the data warehouse, whether the mobile device is used to purchase the product from the retail location;
in response to a determination that the mobile device is not used to purchase the product from the retail location and a determination that the mobile device is leaving the retail location,
generating, by the computing apparatus, an offer according to the identification information of the product;
communicating, by the computing apparatus, the offer to the mobile device to cause the mobile device to present the offer to the user of the mobile device; and
virtually representing, by the artificial intelligence engine, a merchant of the retail location in negotiating with the user of the mobile device according to best practices of deal negotiation and iteratively identifying, by the artificial intelligence engine according to rules specified for the offer, increases of the benefit of the offer provided to the user, wherein each iteration of the iteratively identifying of the increases includes:
- receiving data indicating further actions of the user detected via the mobile device, the data comprising a number or type of products scanned by the user that are related to the product;
- calculating intensity of interest of the user in the product;
- calculating, under a condition that the offer is improved, a confidence level of the user of the mobile device purchasing the product from the retail location based on the data indicating further actions of the user detected via the mobile device; and
- computing a corresponding one of the further increases in response to the further actions of the user and based on:
  - the intensity of interest of the user in the product; and
  - the likelihood confidence level of the user of the mobile device purchasing the product from the retail location;
- communicating, by the portal, the increases of the benefit to the mobile device;
- storing, in the data warehouse coupled with a transaction handler of an electronic payment processing network, the offer in association with a payment account of the user; and
- transmitting to the mobile device a real-time message about the offer, in response to authorization of a transaction, to which the offer is applicable, being processed by the transaction handler, wherein the real-time message is configured to arrive at the mobile device substantially at a same time when an authorization response for the transaction arrives at a transaction terminal at the retail location.

2. The method of claim 1, wherein the offer is generated based on transaction data of a user of the mobile device and prior identification information of products captured via the mobile device.

3. The method of claim 1, wherein the offer is generated in response to a retail price at a competitor of the retail location, as presented in the list, being lower than a retail price of the product at the retail location.

4. The method of claim 1, wherein the offer is generated in response to the mobile device being used to make a purchase from a competitor of the retail location in accordance with the list of retail prices.

5. The method of claim 1, wherein the offer is generated in response to the mobile device leaving the retail location after the presentation of the list of retail prices.

6. A computing system, comprising:
- at least a processor; and
- memory storing instructions configured to instruct the at least one processor to perform operations;
- a data warehouse configured to store information about products available from merchants and transaction data of users;
- a portal configured to communicate with a mobile device to determine identification information of a product disposed in a retail location, wherein the mobile device is positioned in the retail location of a first merchant and the portal is further configured to provide, based on the stored information about products available from the merchants, a list of retail prices at a plurality of merchants for the product to the mobile device and an offer from the first merchant; and
- an artificial intelligence engine configured to:
  - receive information indicating actions of a user detected via the mobile device, the information comprising a number or type of products scanned by the user that are related to the product,
  - calculate intensity of interest of the user in the product;
  - calculate, under a condition that the offer is improved, a confidence level of the user of the mobile device purchasing the product from the retail location based on the information indicating actions of the user,
  - virtually represent, by the artificial intelligence engine, a merchant of the retail location in negotiating with the user of the mobile device according to best practices of deal negotiation and iteratively identify adjustments to a benefit of the offer from the first merchant, wherein each iteration of the adjustments is based on:
    - the intensity of interest of the user in the product;
    - the confidence level of the user purchasing the product from the retail location identified based on the actions of the user detected via the mobile device,
    - transaction data of the user, and
    - in response to the information collected by the mobile device about the actions of the user at the retail location, and
  - instruct the portal to communicate the adjustments to mobile device of the user in response to the actions of the user;
- wherein redemption of the benefit of the offer requires the user purchasing the product from the first merchant;
- wherein the data warehouse is coupled with a transaction handler of an electronic payment processing network and further configured to store the offer in association with a payment account of the user; and
- wherein the portal is configured to transmit to the mobile device a real-time message about the offer, in response to authorization of a transaction, to which the offer is applicable, being processed by the transaction handler, wherein the real-time message is configured to arrive at the mobile device substantially at a same time when an authorization response for the transaction arrives at a transaction terminal at the retail location.

7. A non-transitory computer storage medium storing instructions configured to instruct a computing device to perform a method, the method comprising:
- receiving, via a portal of the computing apparatus over a communication connection from a mobile device positioned in a retail location, identification information of a product disposed in the retail location, wherein the computing apparatus includes:
  - a data warehouse storing information about products available from merchants and transaction data of users;
  - an artificial intelligence engine; and
  - the portal;
- determining, by the computing apparatus, a list of retail prices at a plurality of merchants for the product based on the information about products stored in the data warehouse;
- communicating, by the computing apparatus via the portal to the mobile device, the list of retail prices to cause the mobile device to present the list to a user of the mobile device;
- determining, by the computing apparatus based on the transaction data stored in the data warehouse, whether the mobile device is used to purchase the product from the retail location;

in response to a determination that the mobile device is not used to purchase the product from the retail location and a determination that the mobile device is leaving the retail location,
  generating, by the computing apparatus, an offer according to the identification information of the product;
  communicating, by the computing apparatus, the offer to the mobile device to cause the mobile device to present the offer to the user of the mobile device; and
  virtually representing, by the artificial intelligence engine, a merchant of the retail location in negotiating with the user of the mobile device according to best practices of deal negotiation and iteratively identifying, by the artificial intelligence engine according to rules specified for the offer, increases of the benefit of the offer provided to the user, wherein each iteration of the iteratively identifying of the increases includes:
    receiving data indicating further actions of the user detected via the mobile device, the data comprising a number or type of products scanned by the user that are related to the product;
    calculating intensity of interest of the user in the product;
    calculating, under a condition that the offer is improved, a confidence level of the user of the mobile device purchasing the product from the retail location based on the data indicating further actions of the user detected via the mobile device; and
    computing a corresponding one of the further increases in response to the further actions of the user and based on:
      the intensity of interest of the user in the product; and
      the likelihood confidence level of the user of the mobile device purchasing the product from the retail location;
  communicating, by the portal, the increases of the benefit to the mobile device;
  storing, in the data warehouse coupled with a transaction handler of an electronic payment processing network, the offer in association with a payment account of the user; and
  transmitting to the mobile device a real-time message about the offer, in response to authorization of a transaction, to which the offer is applicable, being processed by the transaction handler, wherein the real-time message is configured to arrive at the mobile device substantially at a same time when an authorization response for the transaction arrives at a transaction terminal at the retail location.

8. The method of claim 1, wherein the product and the products related to the product are in the same product category.

9. The computing system of claim 6, wherein the product and the products related to the product are in the same product category.

10. The non-transitory computer storage medium of claim 7, wherein the product and the products related to the product are in the same product category.

* * * * *